US009361135B2

(12) United States Patent
Doi et al.

(10) Patent No.: US 9,361,135 B2
(45) Date of Patent: Jun. 7, 2016

(54) SYSTEM AND METHOD FOR OUTPUTTING AND SELECTING PROCESSED CONTENT INFORMATION

(75) Inventors: Shouichi Doi, Tokyo (JP); Hideo Nagasaka, Tokyo (JP); Yoshinori Kurata, Tokyo (JP); Masahiro Morita, Tokyo (JP)

(73) Assignee: SONY CORPORATION, Tokyo (JP)

(*) Notice: Subject to any disclaimer, the term of this patent is extended or adjusted under 35 U.S.C. 154(b) by 735 days.

(21) Appl. No.: 12/901,229

(22) Filed: Oct. 8, 2010

(65) Prior Publication Data

US 2011/0131529 A1  Jun. 2, 2011

(30) Foreign Application Priority Data

Nov. 27, 2009  (JP) ................................. 2009-270587

(51) Int. Cl.
*G06F 3/0482* (2013.01)
*G06F 3/0483* (2013.01)
*G06F 9/44* (2006.01)
*G06F 9/445* (2006.01)
*G06F 17/30* (2006.01)

(52) U.S. Cl.
CPC .............. *G06F 9/445* (2013.01); *G06F 3/0482* (2013.01); *G06F 3/0483* (2013.01); *G06F 8/61* (2013.01); *G06F 8/64* (2013.01); *G06F 8/65* (2013.01); *G06F 8/67* (2013.01); *G06F 9/4443* (2013.01); *G06F 17/30244* (2013.01)

(58) Field of Classification Search
CPC ....... G06F 3/0482; G06F 3/0483; G06F 8/61; G06F 8/64; G06F 8/65; G06F 8/67; G06F 17/30244; G06F 9/4443

USPC ........................ 715/744–747, 716; 382/100; 707/913–916; 717/174–178
See application file for complete search history.

(56) References Cited

U.S. PATENT DOCUMENTS

| | | | | |
|---|---|---|---|---|
| 5,999,740 A | * | 12/1999 | Rowley | 717/173 |
| 6,202,073 B1 | * | 3/2001 | Takahashi | 715/204 |
| 6,754,896 B2 | * | 6/2004 | Mishra et al. | 717/176 |
| 6,813,621 B1 | * | 11/2004 | Taylor, III | G06F 17/30076 |
| 6,981,242 B2 | * | 12/2005 | Lehmeier et al. | 717/122 |
| 7,103,230 B1 | * | 9/2006 | Jam et al. | 382/276 |
| 7,262,778 B1 | * | 8/2007 | Edwards et al. | 345/589 |
| 7,322,013 B1 | * | 1/2008 | Benson | G06F 8/51 715/703 |
| 7,398,524 B2 | * | 7/2008 | Shapiro | 717/175 |
| 7,542,596 B2 | * | 6/2009 | Bacus et al. | 382/128 |
| 7,557,950 B2 | * | 7/2009 | Hatta et al. | 358/1.9 |
| 7,586,631 B2 | | 9/2009 | Omori | |

(Continued)

FOREIGN PATENT DOCUMENTS

JP  2002-229904  8/2002

*Primary Examiner* — Eric J Bycer
(74) *Attorney, Agent, or Firm* — Chip Law Group

(57) ABSTRACT

An information processing apparatus includes: an output unit outputting at least one of content information suitable for designated input and output and processed content information related to the content information in association therewith from a storage unit storing application IDs uniquely specifying applications, the content information, and the processed content information obtained by processing the content information by the applications in association therewith; and a selection unit selecting the content information or the processed content information output by the output unit and selecting the application ID based on the selected content information or the selected processed content information.

15 Claims, 39 Drawing Sheets

(56) References Cited

U.S. PATENT DOCUMENTS

| | | | |
|---|---|---|---|
| 7,715,586 B2* | 5/2010 | Issa et al. | 382/100 |
| 7,873,746 B2* | 1/2011 | Li | 709/246 |
| 8,201,096 B2* | 6/2012 | Robert et al. | 715/767 |
| 8,261,258 B1* | 9/2012 | Jianu et al. | 717/174 |
| 8,321,859 B2* | 11/2012 | Shapiro | 717/175 |
| 8,422,550 B2* | 4/2013 | Li | 375/240.01 |
| 2001/0041022 A1* | 11/2001 | Edwards et al. | 382/309 |
| 2003/0097491 A1* | 5/2003 | Burbidge | G06F 8/38 719/331 |
| 2003/0167447 A1* | 9/2003 | Hatta et al. | 715/517 |
| 2004/0133924 A1* | 7/2004 | Wilkins et al. | 725/135 |
| 2005/0019077 A1* | 1/2005 | Hatta et al. | 400/62 |
| 2007/0030506 A1* | 2/2007 | Takabayashi et al. | 358/1.9 |
| 2007/0064121 A1* | 3/2007 | Issa et al. | 348/231.2 |
| 2007/0121141 A1* | 5/2007 | Takabayashi et al. | 358/1.9 |
| 2007/0150886 A1* | 6/2007 | Shapiro | 717/174 |
| 2007/0240098 A1* | 10/2007 | Averett et al. | 717/104 |
| 2008/0007651 A1* | 1/2008 | Bennett | 348/443 |
| 2008/0032787 A1* | 2/2008 | Low et al. | 463/29 |
| 2008/0077944 A1* | 3/2008 | Seely | 719/329 |
| 2008/0172628 A1* | 7/2008 | Mehrotra et al. | 715/771 |
| 2008/0189627 A1* | 8/2008 | Nikitin et al. | 715/762 |
| 2009/0070675 A1* | 3/2009 | Li | 715/716 |
| 2009/0089710 A1* | 4/2009 | Wood et al. | 715/835 |
| 2009/0260004 A1* | 10/2009 | Datta et al. | 717/175 |
| 2010/0131868 A1* | 5/2010 | Chawla et al. | 715/759 |
| 2010/0138753 A1* | 6/2010 | Riggs et al. | 715/745 |
| 2010/0179991 A1* | 7/2010 | Lorch et al. | 709/206 |
| 2010/0257210 A1* | 10/2010 | Witkin et al. | 707/802 |
| 2013/0326377 A1* | 12/2013 | Yu | G11B 27/031 715/763 |

* cited by examiner

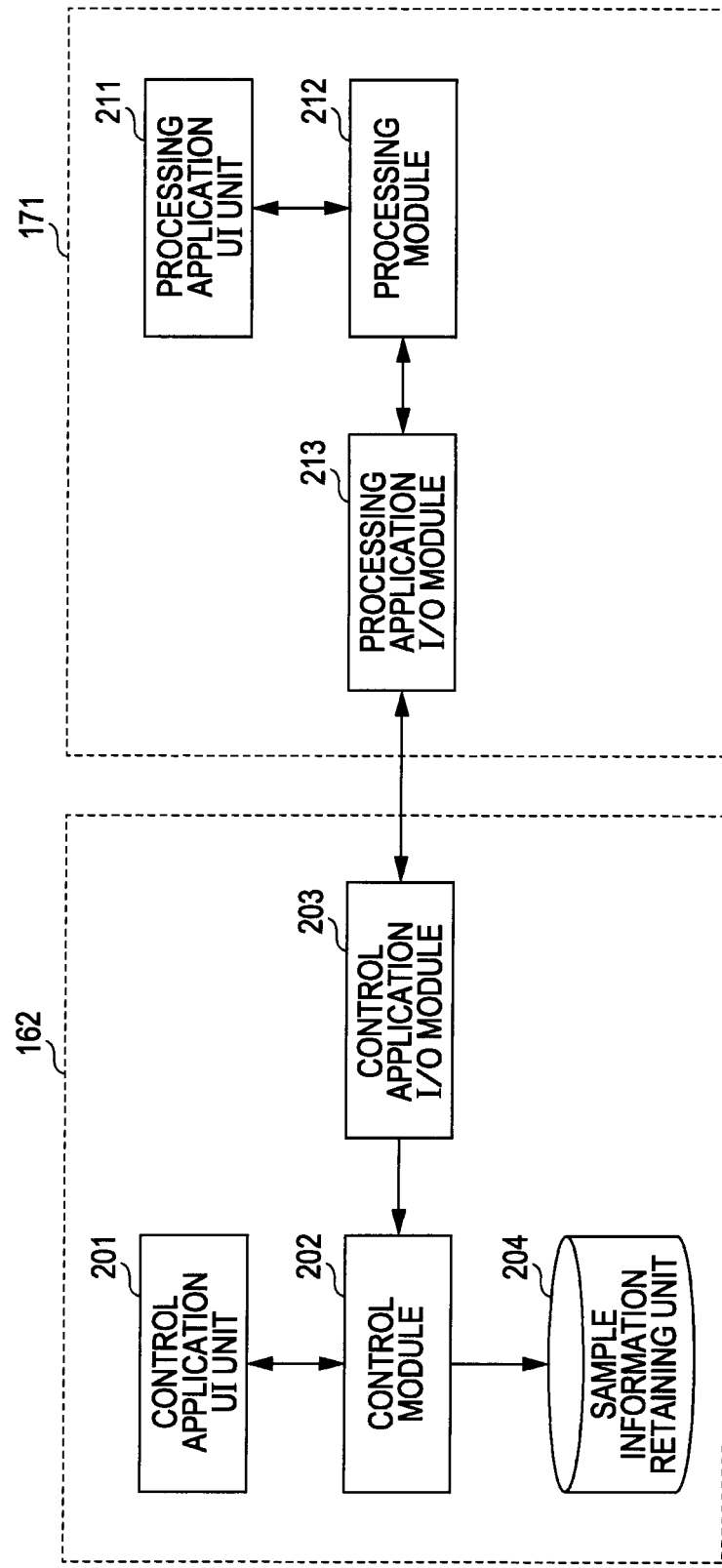

<GENERATOR COMMENT>
<ENVIRONMENT INFORMATION>
　<COMPATIBLE MODEL>
<INPUT CONTENT>
　<INPUT OVERVIEW DESCRIPTION (CHARACTER STRING)>
　<CONTENT TYPE>
　<SAMPLE DATA ADDRESS>
　<SIMILARITY COMPARABLE META>
<OUTPUT CONTENT>
　<INPUT OVERVIEW DESCRIPTION (CHARACTER STRING)>
　<CONTENT TYPE>
　<SAMPLE DATA ADDRESS>
<SAMPLE EVALUATION>
<GENERATION ORDER>
　<USE APPLICATION 1: PARAMETER>
　<USE APPLICATION 2: PARAMETER>
　<USE APPLICATION 3: PARAMETER>
...

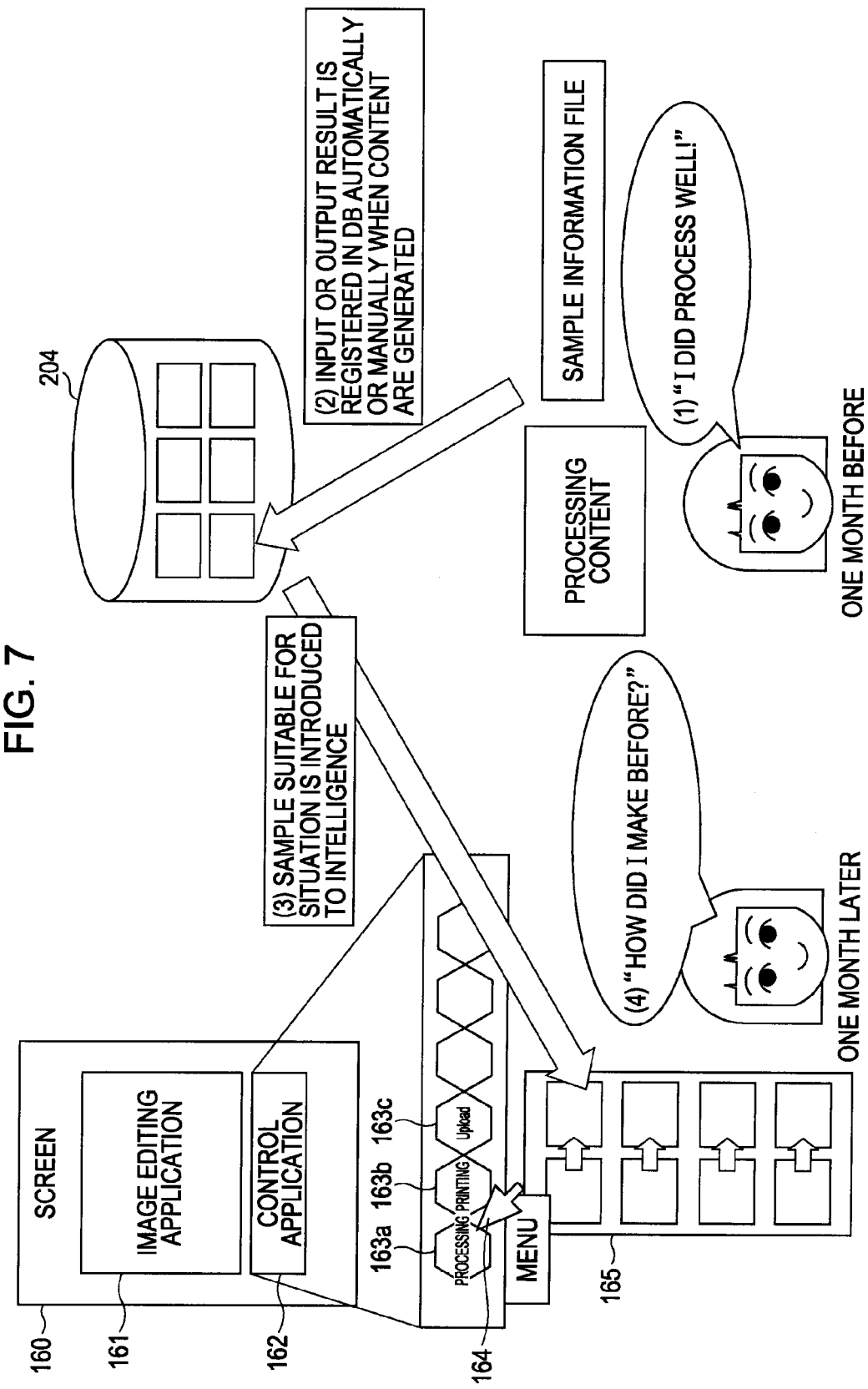

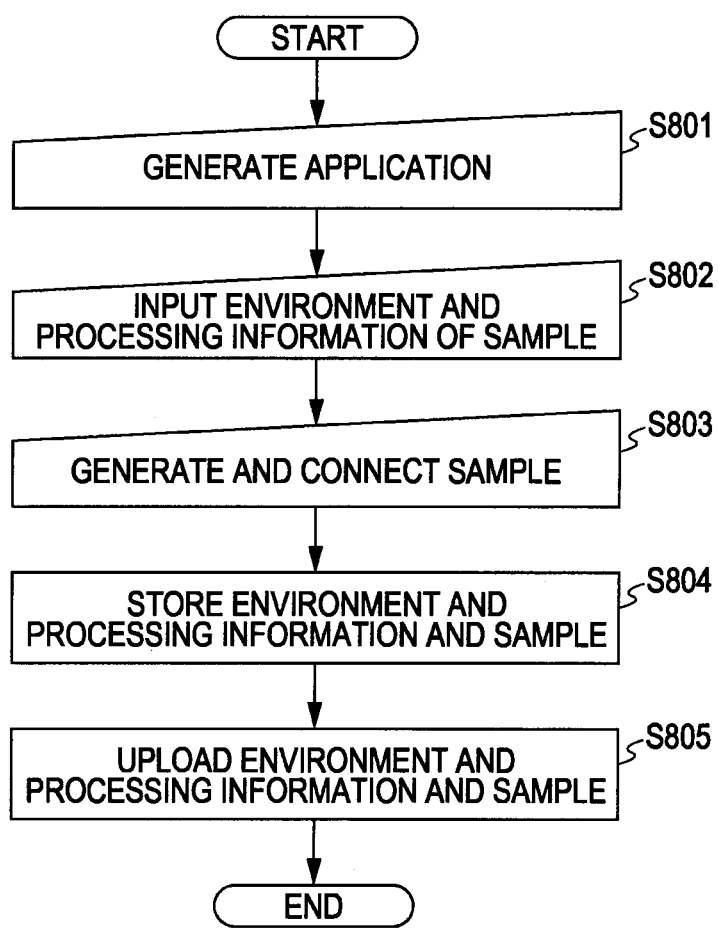

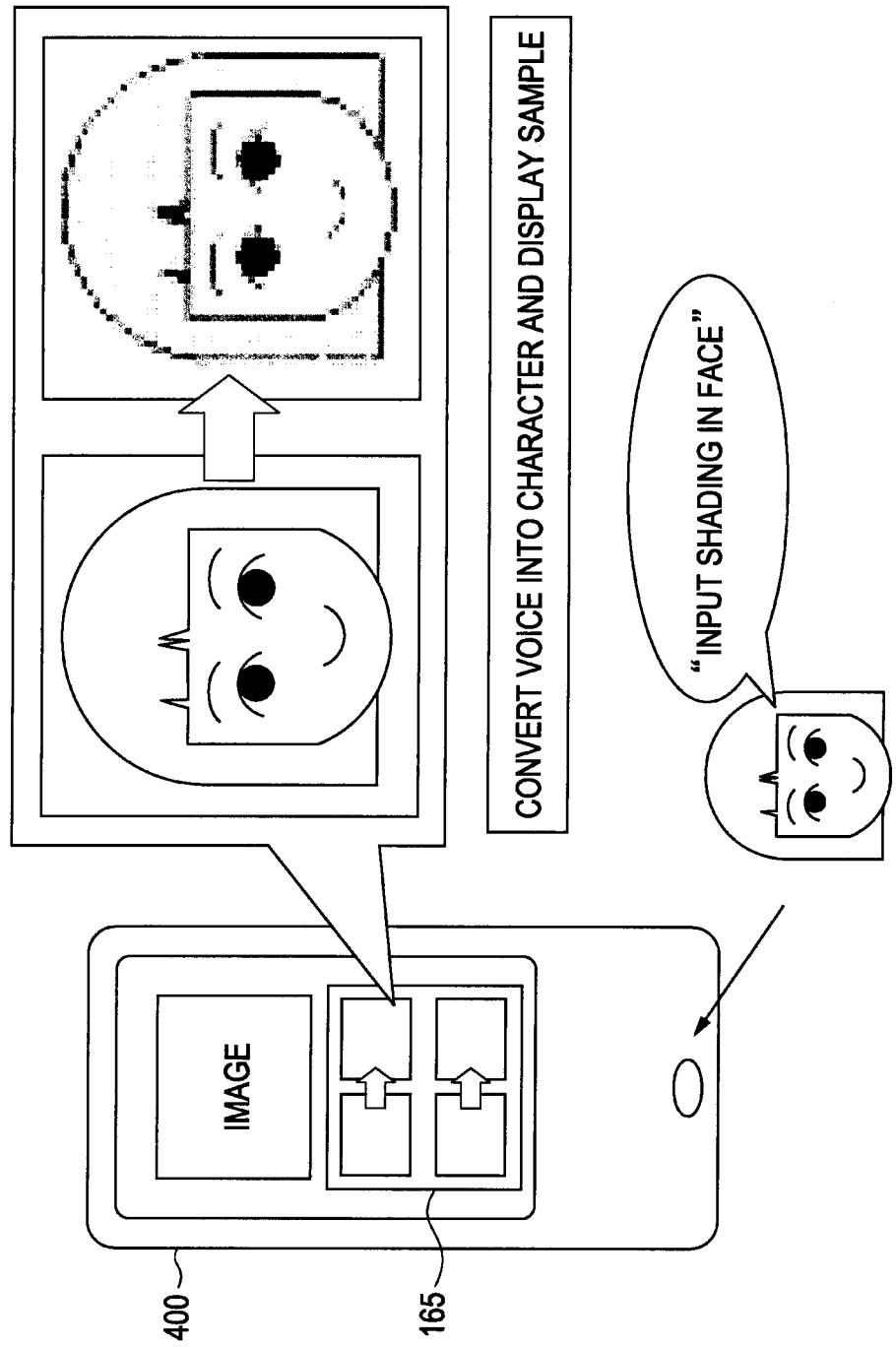

SYSTEM AND METHOD FOR OUTPUTTING AND SELECTING PROCESSED CONTENT INFORMATION

BACKGROUND OF THE INVENTION

1. Field of the Invention

The present invention relates to an information processing apparatus, an information processing method, a computer program, and an information processing server.

2. Description of the Related Art

Information processing apparatuses such as personal computers (PCs) or portable terminals (for example, portable telephones or portable game consoles) use various applications or programs to execute various information processes. For example, an application can be executed on a PC, when a user purchases a CD-ROM or the like storing the application in a store and installs the application from the purchased CD-ROM on the PC, or downloads the application from a server via a network and installs the application on the PC.

Applications that users can use have increased daily as the Internet comes into wide use. Although the applications are provided from many application providers, it is difficult for the users to exactly grasp the content or executable processes of the massive applications. Moreover, even when users purchase or download a new application and install the application on a PC or the like, it is not uncommon that the users may not execute the desired process.

Various techniques for appropriately structuring a process of introducing application programs executing various data processes or the execution environments of the applications to support the application operation of users have been suggested. In addition, various techniques for executing an application on a server without installing the application in a PC and executing a desired process of a user have been suggested. For example, Japanese Unexamined Patent Application Publication No. 2002-229904 discloses a technique for obtaining corrected image data on a web server by uploading image data prepared by a user to the web server and selecting a desired file to be corrected.

SUMMARY OF THE INVENTION

In the process of introducing application programs according to a related art, however, a problem may arise in that a user hardly knows why an application is selected and introduced from among numerous applications. For example, during execution of an application, an application associated with the application can be selected and introduced based on information regarding the application. However, when the title or the icon of the application is simply displayed on a screen, a problem may arise in that a user hardly knows which operations can be executed by the application or which advantages can be obtained upon executing the application.

It is desirable to provide an information processing apparatus, an information processing method, a computer program, and an information processing server which are novel and improved, and are capable of introducing samples executed by applications, when introducing the applications, so that user can understand why the applications are introduced.

According to an embodiment of the invention, there is provided an information processing apparatus including: an output unit outputting at least one of content information suitable for designated input and output and processed content information related to the content information in association therewith from a storage unit storing application IDs uniquely specifying applications, the content information, and the processed content information obtained by processing the content information by the applications in association therewith; and a selection unit selecting the content information or the processed content information output by the output unit and selecting the application ID based on the selected content information or the selected processed content information.

The information processing apparatus may further include an application recommendation unit recommending a plurality of recommended applications based on the content information selected by the selection unit. The output unit may output at least one of information indicating the recommended applications.

The output unit may display the applications by category. When the selection unit selects the category, the output unit may output content before and after processing.

The selection unit may confirm whether the application corresponding to the selected application ID is executable in the own information processing apparatus, and may request download from another information processing apparatus when the application is not executable.

The information processing apparatus may further include a content processing unit generating content before and after processing based on the content information selected by the selection unit.

The content information selected by the selection unit for the content processing unit to process the content may be a reduced image with a reduced size of an original image.

The output unit may output the content information and the processed content information related to the content information in association therewith based on environment information regarding environment under which content is generated.

The output unit may output at least one of the content information regarding a process performed before execution of the application and the processed content information related to the content information in association therewith.

The output unit may output at least one of the content information and the processed content information suitable for the designated input and output by linking the plurality of content information and processed content information.

When there is neither content information nor processed content information suitable for the designated input and output, the output unit may search the content information and the processed content information suitable for the designated input and output by linking the plurality of content information and processed content information.

The output unit may output all of the processed content information.

According to an embodiment of the invention, there is provided an information processing method including the steps of: outputting at least one of content information suitable for designated input and output and processed content information related to the content information in association therewith from a storage unit storing application IDs uniquely specifying applications, the content information, and the processed content information obtained by processing the content information by the applications in association therewith; and selecting the content information or the processed content information output by the outputting step and selecting the application ID based on the selected content information or the selected processed content information.

According to an embodiment of the invention, there is provided a computer program causing a computer to execute the steps of: outputting at least one of content information suitable for designated input and output and processed content information related to the content information in association therewith from a storage unit storing application IDs uniquely specifying applications, the content information, and the processed content information obtained by processing the content information by the applications in association therewith; and selecting the content information or the processed content information output by the outputting step and selecting the application ID based on the selected content information or the selected processed content information.

According to an embodiment of the invention, there is provided an information processing server including: a storage unit storing application IDs uniquely specifying applications, content information, and processed content information obtained by processing the content information by the applications in association therewith; an output unit outputting, to another apparatus, at least one of the content information suitable for designated input and output and stored in the storage unit and the processed content information related to the content information in association therewith; and a selection unit selecting the application ID based on one of the content information and the processed content information selected by the another apparatus from among the content information or the processed content information output by the output unit.

The output unit may output the content information and the processed content information related to the content information in association therewith based on environment information regarding environment under which content is generated.

According to the embodiments of the invention, as described above, there are provided the information processing apparatus, the information processing method, the computer program, and the information processing server which are novel and improved, and are capable of making a user understand why an application is introduced by providing an execution sample of the application, when introducing the application.

BRIEF DESCRIPTION OF THE DRAWINGS

FIG. 5 is an explanatory diagram illustrating function blocks of a control application and an image processing application.

FIG. 6 is an explanatory diagram illustrating an example of the tag structure of metadata (environment and processing information file) used by the control application.

FIG. 7 is an explanation diagram illustrating a case where the sample data is generated in the information processing apparatus and the generated sample data is displayed by the control application.

FIG. 8 is a flowchart illustrating a process of registering the sample data in a sample information retaining unit.

FIG. 39 is an explanatory diagram illustrating an example in which the sample data are extracted and displayed by inputting a voice.

DESCRIPTION OF THE PREFERRED EMBODIMENTS

Figure 1:
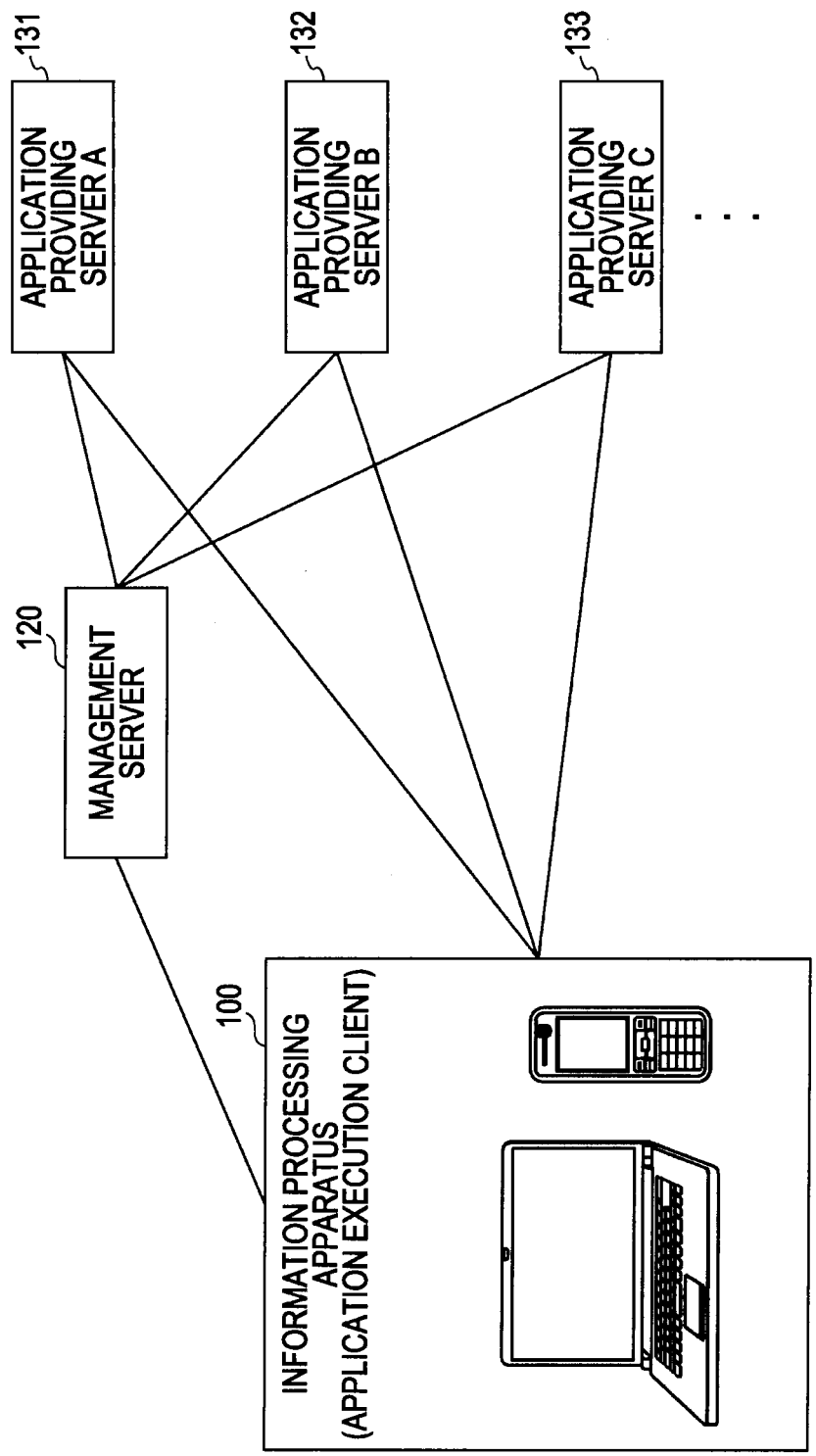
FIG. 1 is an explanatory diagram illustrating the configuration of an information processing system according to an embodiment of the invention.

Hereinafter, a preferred embodiment of the invention will be described in detail with reference to the accompanying drawings. In the specification and the drawings, the same reference numerals are given to constituent elements having substantially the same constituent function and the repeated description is omitted.

The description will be made in the following order.
1. Embodiment of the Invention
1-1. Configuration of Information Processing System
1-2. Configuration of Information Processing Apparatus
1-3. Basic Concept of Application Recommendation Process
1-4. Operation of Application Recommendation System
2. Overview 1. Embodiment of the Invention 1-1. Configuration of Information Processing System First, the configurations of an information processing apparatus and an information processing system using the information processing apparatus according to an embodiment of the invention will be described. FIG. 1 is an explanatory diagram illustrating the configuration of the information processing system according to the embodiment of the invention. Hereinafter, the configuration of the information processing system according to the embodiment of the invention will be described with reference to FIG. 1.

As shown in FIG. 1, an information processing system 1 according to the embodiment of the invention includes an information processing apparatus 100, a management server 120, and application providing servers A131, B132, C133, and so on.

The information processing apparatus 100 is an application execution client executing various applications and is an apparatus, such as a personal computer or a portable terminal, having a function of executing an application program. An application program is installed, for example, on an internal hard disk of the information processing apparatus 100 and is read from the hard disk in response to an activation instruction from a user for execution. Examples of the application program include an image browsing application, an image editing application, a music player application, a music editing application, a word processing application, a game application, a map route search application, an accounting process application, and a mail writing application. A user can activate and use an application with a desired function among various applications.

The information processing apparatus 100 includes a CPU with a program execution function and a memory (such as a hard disk, a RAM, or a ROM) having a program or data storing area. Examples of the program executed by the information processing apparatus 100 include an operating system (OS) and an application program. The information processing apparatus 100 may store applications installed from media such as a CD-ROM or downloaded via a network in the memory, and a user may appropriately select and execute the applications.

The application providing servers A131 to C133 shown in FIG. 1 are servers which provide various applications to the information processing apparatus 100. The applications provided by the application providing servers may be charged or free. The information processing apparatus 100 can download the applications provided by the application providing servers A131 to C133 via a network and can store the downloaded applications in the memory of the information processing apparatus 100 for execution.

The management server 120 shown in FIG. 1 acquires and manages information regarding the applications provided by the application providing servers A131 to C133 from the application providing servers A131 to C133. The management server 120 supplies such information to the information processing apparatus 100 used by the user.

Based on the information regarding the applications received from the management server 120, the information processing apparatus 100 performs a process of introducing an introduction screen of the applications used in the information processing apparatus 100 by the user or functions of the applications. For example, the information processing apparatus 100 generates recommendation information regarding another application associated with the application being executed on the information processing apparatus 100 or the function of the application, and performs a process of displaying the recommendation information on a display mounted on or connected to the information processing apparatus 100.

Specifically, for example, when an image browsing application is executed on the information processing apparatus 100, the management server 120 supplies information regarding an associated application, such as an image editing application or an image upload service application, executing an image editing process, an image management process, or the like.

In FIG. 1, the management server 120 serves as a server different from the application providing servers A131 to C133. However, the management server 120 may have the function of the application providing server.

The configuration of the information processing system 1 according to the embodiment of the invention has hitherto been described with reference to FIG. 1. Next, the configuration of the information processing apparatus 100 according to the embodiment of the invention will be described.

1-2. Configuration of Information Processing Apparatus

Figure 2:
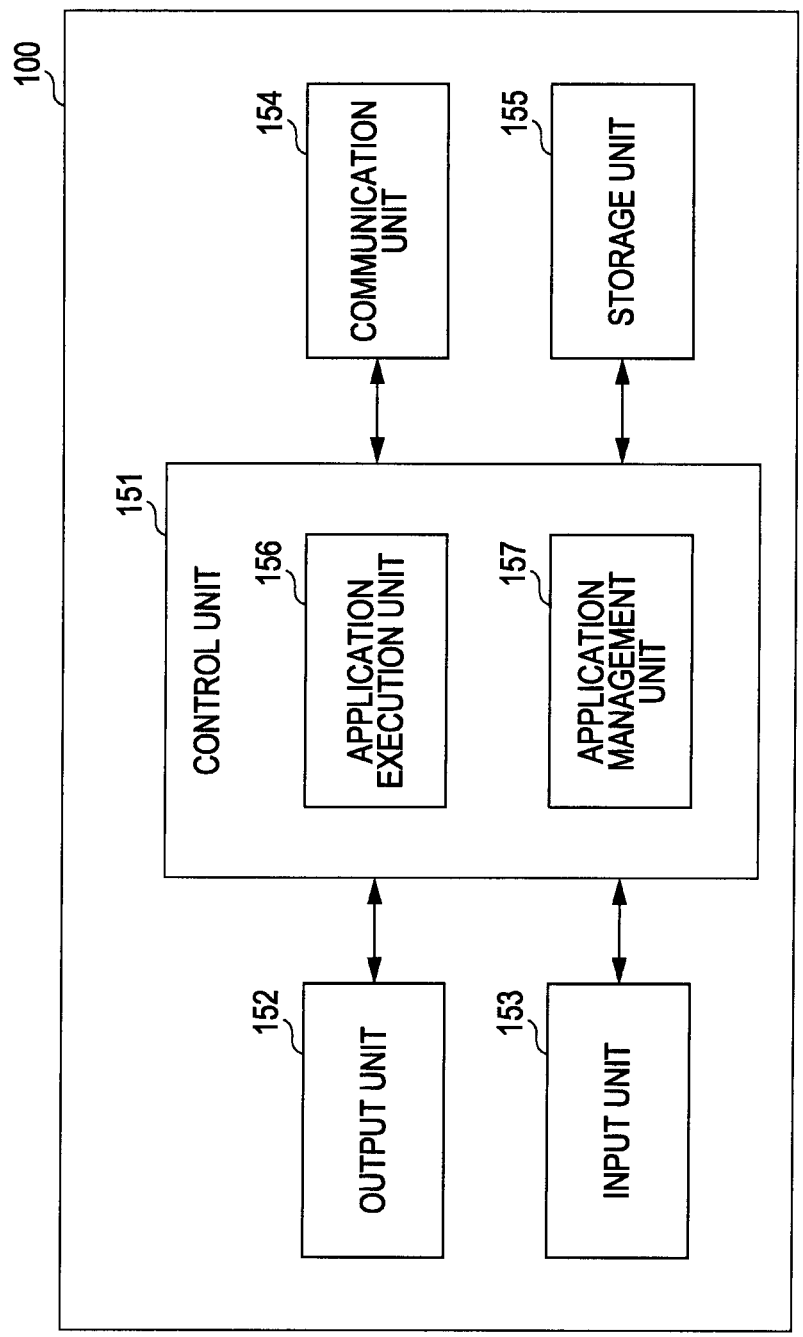
FIG. 2 is an explanatory diagram illustrating the configuration of the information processing apparatus according to the embodiment of the invention.

FIG. 2 is an explanatory diagram illustrating the configuration of the information processing apparatus 100 according to the embodiment of the invention. Hereinafter, the configuration of the information processing apparatus 100 according to the embodiment of the invention will be described with reference to FIG. 2.

As shown in FIG. 2, the information processing apparatus 100 according to the embodiment of the invention includes a control unit 151, an output unit 152, an input unit 153, a communication unit 154, and a storage unit 155.

The control unit 151 controls respective units of the information processing apparatus 100 and includes a CPU, for example. The output unit 152 includes a display device such as an LCD (Liquid Crystal Display) or an organic EL display and a speaker outputting sound. The input unit 153 is a keyboard unit which operates various kinds of input. The input unit 153 may have a configuration in which an output unit and an input unit such as a touch panel are integrally formed.

The communication unit 154 carries out communication via a network such as the Internet to communicate with the management server 120 and the application providing servers A131 to C133 shown in FIG. 1. The storage unit 155 stores applications or various data and includes various storage units such as a hard disk, a flash memory, a RAM (Random Access Memory), and a ROM (Read-Only Memory).

The control unit 151 includes an application execution unit 156 and an application management unit 157.

The application execution unit 156 executes application programs. The application programs executed by the application execution unit 156 are stored in the storage unit 155, for example. The storage unit 155 may be used as a storage area for parameters, data, or the like upon executing the applications.

The storage unit 155 records an application management program managing the applications stored in the storage unit 155 and application management information for managing the applications stored in the memory unit 155. The application management information includes information generated by the application management unit 157 of the control unit 151 and information supplied by the management server 120. As described above, the management server 120 shown in FIG. 1 supplies the information processing apparatus 100 with the information regarding the applications provided by the application providing servers A131 to C133.

The application management unit 157 executes the application management program stored in the storage unit 155 to execute a process of introducing an associated application recommended to a user or an associated function, for example, based on the information received from the management server 120.

The configuration of the information processing apparatus 100 according to the embodiment of the invention has hitherto been described. Next, a basic concept of an application recommendation process executed by the management server 120 or the information processing apparatus 100 according to the embodiment of the invention will be described.

1-3. Basic Concept of Application Recommendation Process

Figure 3:
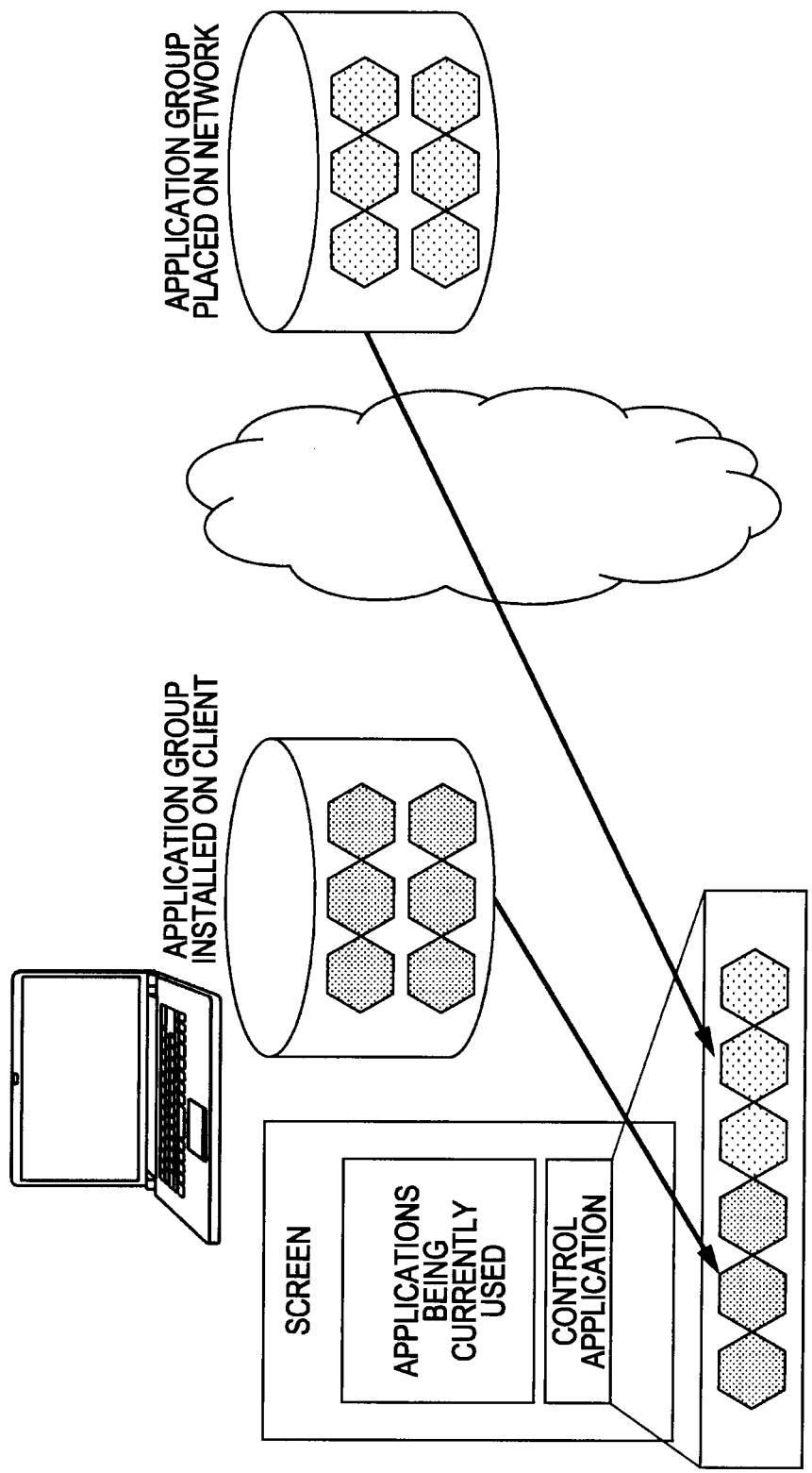
FIG. 3 is an explanatory diagram illustrating a basic concept of an application recommendation process of an application recommendation system according to the embodiment of the invention.

FIG. 3 is an explanatory diagram illustrating a basic concept of an application recommendation process of an application recommendation system 10 according to the embodiment of the invention. Hereinafter, the basic concept of the application recommendation process will be described with reference to FIG. 3.

The application recommendation process executed by the application recommendation system 10 is a process of filtering for only an application having a function appropriate for the situation and purpose from the applications being currently executed by the information processing apparatus 100 or from information regarding content being displayed and reproduced, and displaying the title or icon of the application on the screen of the information processing apparatus 100.

When an application is recommended, as in FIG. 3, not only the applications installed on the information processing apparatus 100 but also an application group placed on the network (the application providing servers A131, B132, C133, and so on) are filtering targets. The application recommended among the applications installed on the information processing apparatus 100 can be executed without change. On the other hand, when the application on the network is recommended, the application can be downloaded and executed on the information processing apparatus 100 or a processing target file can be uploaded to a server to be executed on the server.

The application is filtered out based on the kinds of applications being executed on the information processing apparatus 100, information (information regarding the kinds or the like of input or output files) regarding the applications, information regarding the execution history of the applications executed on the information processing apparatus 100 by the user, or the like.

In this way, the application can be executed on the information processing apparatus 100 (or on a server connected to the network) by filtering for the appropriate application and introducing the appropriate application to the information processing apparatus 100 irrespective of whether the application is installed on the information processing apparatus 100.

However, when the appropriate application is simply filtered out and introduced on the screen, the user of the information processing apparatus 100 can have difficulty understanding why the application is introduced on the screen. In order to solve this problem, the application recommendation system 10 according to the embodiment of the invention also introduces a sample indicating the execution result of the application, when introducing the application. Then, since the user can know the result obtained by executing the introduced application, an advantage whereby the user can readily picture the execution results of the introduced application is obtained.

Hereinafter, the operation of the application recommendation system 10 according to the embodiment of the invention will be described according to a plurality of embodiments.

1-4. Operation of Application Recommendation System

Figure 4:
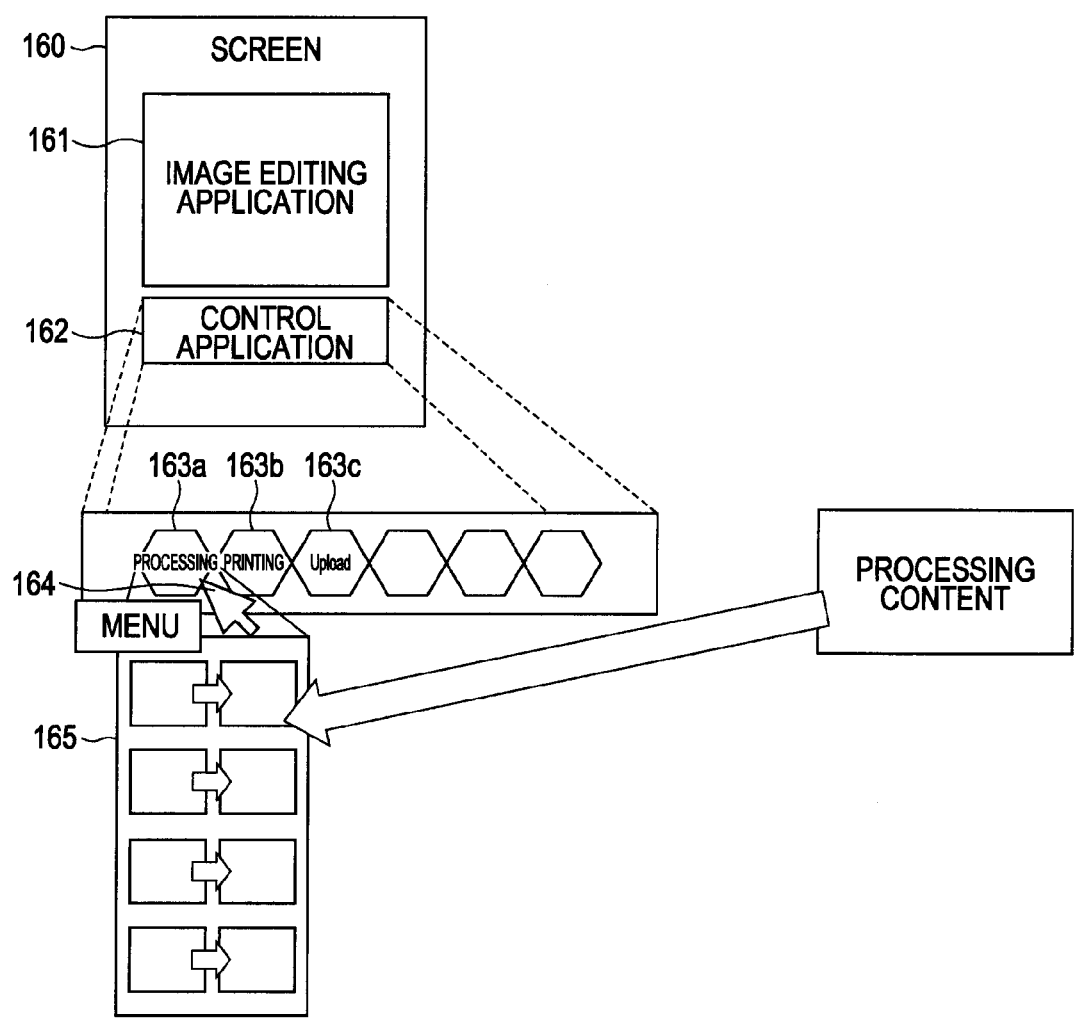
FIG. 4 is an explanatory diagram illustrating an introduction example of an application when an image editing application is executed in the information processing apparatus.

First, a case where an application is introduced when an image editing application is executed in the information processing apparatus 100 will be described. FIG. 4 is an explanatory diagram illustrating an introduction example of applications when the image editing application is executed in the information processing apparatus 100.

In FIG. 4, the image editing application 161 is displayed on a screen 160 of the information processing apparatus 100 (for example, the image editing application is installed on the information processing apparatus 100) and a control application 162 for introducing the applications associated with the image editing application 161 to a user is also displayed. The image editing application 161 and the control application 162 are executed by the application execution unit 156 shown in FIG. 2.

In FIG. 4, the enlarged control application 162 is also shown. In the control application 162, as shown in FIG. 4, icons 163a, 163b, 163c, and so on for activating the applications associated with the image editing application 161 being executed in the information processing apparatus 100 are displayed on the screen 160. These icons may be displayed on the screen 160 by category of application processing, as shown in FIG. 4. Alternatively, specific application names or unique icons of the respective applications may be displayed on the screen 160.

When the user places a mouse cursor 164 on the icon 163a, 163b, 163c, or the like displayed on the screen 160 or clicks the icon 163a, 163b, 163c, or the like with the mouse cursor 164, a sample display region 165 is displayed on the screen 160 and a sample obtained through the execution of an application corresponding to the icon is displayed in the sample display region 165. In the following description, placing the mouse cursor 164 on the icon 163a, 163b, 163c, or the like or clicking with the mouse cursor 164 by the user is called "selecting an icon".

In the example shown in FIG. 4, the icon 163a corresponding to an image processing application processing an image, the icon 163b corresponding to a printing application printing an image, and the icon 163c corresponding to an upload application uploading an image to a predetermined web server are displayed on the screen 160 by the control application 162.

Here, when the user selects the icon 163a from among the icons displayed on the screen 160 by the control application 162, the sample display region 165 is displayed on the screen 160 by the application execution unit 156. An execution sample of an application processing an image is displayed in the sample display region 165. The execution sample may be maintained, for example, in the information processing apparatus 100 or may be downloaded from the management server 120 or the application providing server A131, B132, C133, or the like.

FIG. 5 is an explanatory diagram illustrating function blocks of the respective applications. In FIG. 5, the function blocks of the control application 162 and the image processing application 171 are shown. Hereinafter, the function blocks of the control application 162 and the image processing application 171 will be described with reference to FIG. 5. The image processing application 171 may be installed on the information processing apparatus 100 or may be executed by the management server 120.

As shown in FIG. 5, the control application 162 includes a control application UI (User Interface) unit 201, a control module 202, a control application I/O module 203, and a sample information retaining unit 204. The image processing application 171 includes an image processing application UI unit 211, an image processing module 212, and an image processing application I/O module 213.

The control application UI unit 201 receives an operation from the user of the information processing apparatus 100 via the control application 162. For example, when the user gives an instruction to the control application UI unit 201 to process an image using the image processing application 171, the control application UI unit 201 gives an instruction to the control module 202 to process the image.

The control module 202 controls the operation of the control application 162 and the operation of the application operated in cooperation with the control application 162. The control application I/O module 203 interfaces input and output between the control application 162 and the application (that is, the image processing application 171) operated in cooperation with the control application 162.

The sample information retaining unit 204 retains sample data of the image processing process in the image processing application 171. The sample data retained in the sample information retaining unit 204 is displayed on the screen 160 together with the display of the application recommended by the control application 162.

The image processing application UI unit 211 receives an operation from the user of the image processing apparatus 100 on the image processing application 171. For example, when the user gives an instruction to the image processing application UI unit 211 to process an image, the image processing application UI unit 211 gives an instruction to the image processing module 212 to process the image.

The image processing module 212 executes a process of processing image data. Examples of the process executed by the image processing module 212 include resolution conversion of the image data, conversion of the image size, and conversion of a color. The image data processed by the image processing module 212 is sent to the image processing application I/O module 213, is sent to the control application 162 or the image processing application UI unit 211, and is displayed on the screen 160.

The image processing application I/O module 213 interfaces input and output between the image processing application 171 and the application (that is, the control application 162) operated in cooperation with the image processing application 171.

The control application 162 and the image processing application 171 have the configuration shown in FIG. 5. Therefore, the control application 162 can display the sample of the image processing process in the image processing application 171 on the screen 160.

The function blocks of the control application 162 and the image processing application 171 have hitherto been described with reference to FIG. 5. Next, the operations of the control application 162 and the image processing application 171 will be described.

FIG. 6 is an explanatory diagram illustrating an example of the tag structure of metadata (environment and processing information file) 210 used by the control application 162. Based on the metadata (environment and processing information file) 210 shown in FIG. 6, the control application 162 can know that a certain sample is generated by a certain process.

In a "<generator comment>" tag of the metadata (environment and processing information file) 210, a comment of a generator of the sample is stored. The storage of the comment may be arbitrary. In an "<environment information>" tag, information regarding the environment necessary for executing the same process as that on the sample displayed on the screen is stored. As shown in FIG. 6, a "<compatible model>" tag at the lower level of the "<environment information>" tag may be provided to describe the compatible model information of the application, the minimum memory necessary for executing the application, and information regarding the hardware specification such as a CPU, which are necessary to execute the same process as that on the sample displayed on the screen.

In an "<input content>" tag, information regarding the data to be input is described. In an "<output content>" tag, information regarding the sample data to be output is described. In these tags, information regarding a sample obtained by receiving certain input data from the sample data and converting the input data into certain output data is described. In the case of the same input type, the applications can be executed in the same order and the same result as that of the output data can be obtained. At the lower level of the "<input content>" tag, as show in FIG. 6, an "<input overview description>" tag, a "<content type>" tag, a "<sample data address>" tag, and a "<similarity comparable meta>" tag exist. At the lower level of the "<output content>" tag, as show in FIG. 6, an "<output overview description>" tag, a "<content type>" tag, and a "<sample data address>" tag exist. In the "<input overview description>" tag, for example, information regarding the explanatory sentence for a user to understand the receivable input of the application is described. The details described in the "<input overview description>" tag are displayed on the screen by the control application 162, as necessary. In the "<content type>" tag, the type of the data which can be input to the application, for example, the formats of still images, moving images, and voices such as JPEG, BMP, MPEG2, and WAV are written. In the "<sample data address>" tag, information regarding the address in which locations (on an apparatus or a server) at which thumbnails (images, moving images, voices, texts, and the like) of the input/output samples can be acquired are written is described. In the "<similarity comparable meta>" tag, for example, data for quantitatively comparing similarity between a selected image and the sample by scores obtained in a certain information process is described. In this tag, a face image used in the sample indicates one of a male, a female, an adult, and a child or expresses to which degree a face smiles (face smiling to the certain degree) or that a face wears glasses or no glasses by scores, and the scores are compared to the same score of the selected image to perform a process of filtering for an image similar to the state of the selected image.

In a "<sample evaluation>" tag, information regarding evaluation of a third person on the sample is described. In the "<sample evaluation>" tag, information regarding the registry and rank evaluation of the sample in favor of a generator or another user may be described. The details described in the tag may be displayed on the screen by the control application 162. In a "<generation order>" tag, information regarding the order of the generation of the sample data is described.

The control application 162 can execute the recommendation of the application or the introduction of the sample so as to be suitable for a situation by retaining the generation order of the processing on the content or the metadata (environment and processing information file) in which the information regarding the storage locations of the thumbnails of the input content and the output content is written in the information processing apparatus 100 or by acquiring the generation order or the metadata from the management server 120.

FIG. 7 is an explanation diagram illustrating a case where the sample data is generated in the information processing apparatus 100 and the generated sample data is displayed by the control application 162. When the user of the information processing apparatus 100 considers that the user can skillfully process the content using the image processing application 171, the user registers the input and output result of the sample data in the sample information retaining unit 204. The input and output results of the sample data may be registered in the sample information retaining unit 204 manually by the user or may be automatically registered by the image processing application 171.

By registering the information regarding the input and output results of the sample data in the sample information retaining unit 204, the sample data registered in the sample information retaining unit 204 is acquired and displayed on the screen 160 by the control application 162 for the user to execute the same process as the previous processing process in the information processing apparatus 100 even when the user of the information processing apparatus 100 forgets how the content is processed.

FIG. 8 is a flowchart illustrating the process of registering the sample data in the sample information retaining unit 204. In FIG. 8, an example of the process of registering the sample data by the generator of the image processing application 171 is shown. Hereinafter, the process of registering the sample data in the sample information retaining unit 204 will be described with reference to FIG. 8.

First, the generator of an application generates an application (step S801). The generator of an application inputs environment and processing information of the sample data generated using the generated application (step S802). The environment and processing information includes a condition for generating the sample data and is generated, for example, in the metadata format shown in FIG. 6. The generator of an application may input, for example, explanation of the generated application or information regarding a function in the environment and processing information.

When the generator of an application inputs the environment and processing information of the sample data, the generator of an application continues to generate the sample data and link the generated sample data to the environment and processing information input in step S802 (step S803). In step S803, when the sample data is generated and linked, the environment and processing information and the sample data are stored in database such as the sample information retaining unit 204 (step S804) and are uploaded to the management server 120 (step S805).

In this way, when the generator of the image processing application 171 registers a representative use of an application as the sample, a user viewing the sample can confirm the advantage of even an application which nobody has yet used.

Figure 9:
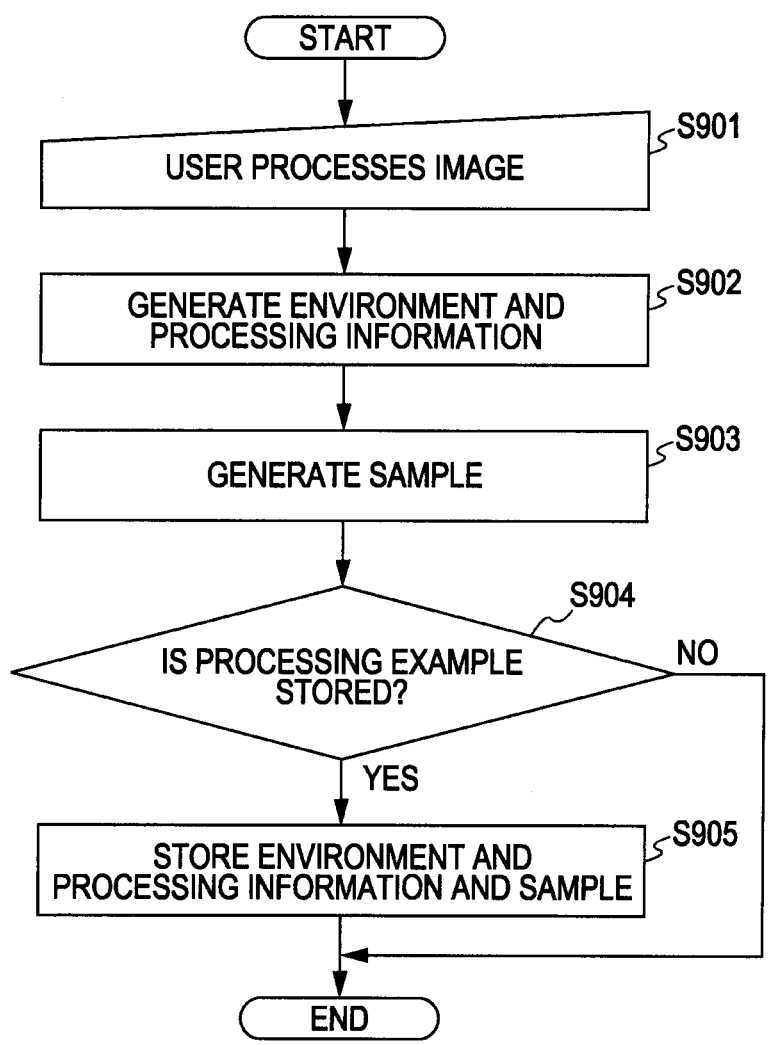
FIG. 9 is a flowchart illustrating a process of registering the sample data in the sample information retaining unit.

FIG. 9 is a flowchart illustrating a process of registering the sample data in the sample information retaining unit 204. In FIG. 9, an example of the registration of the data generated using the image processing application 171 by the user of the information processing apparatus 100 as sample data is shown. Hereinafter, the process of registering the sample data in the sample information retaining unit 204 will be described with reference to FIG. 9.

The user of the information processing apparatus 100 processes an image using the image processing application 171 (step S901). When the user of the information processing apparatus 100 processes the image using the image processing application 171, the information processing apparatus 100 generates the environment and processing information along with the processing of the image (step S902). The generation of the environment and processing information may be executed by, for example, the image processing module 212.

When the environment and processing information is generated, the image processing module 212 of the image processing application 171 generates the processed image based on the processing of the user (step S903). When the processed image is generated by the image processing module 212, the image processing application 171 displays a message indicating whether the processed image is stored as a sample of the processing example on the screen 160, and waits for the decision of the user of the information processing apparatus 100 (step S904).

When the user of the information processing apparatus 100 decides to store the processed image as the sample of the processing example, the image processing application 171 stores the environment and processing information generated in step S902 and the processed image generated in step S903 in the sample information retaining unit 204 (step S905), and then the process ends. Alternatively, when the user of the information processing apparatus 100 determines not to store the processed image as the sample of the processing example, the environment and processing information and the processed image are not stored, and then the process simply ends.

Figure 10:
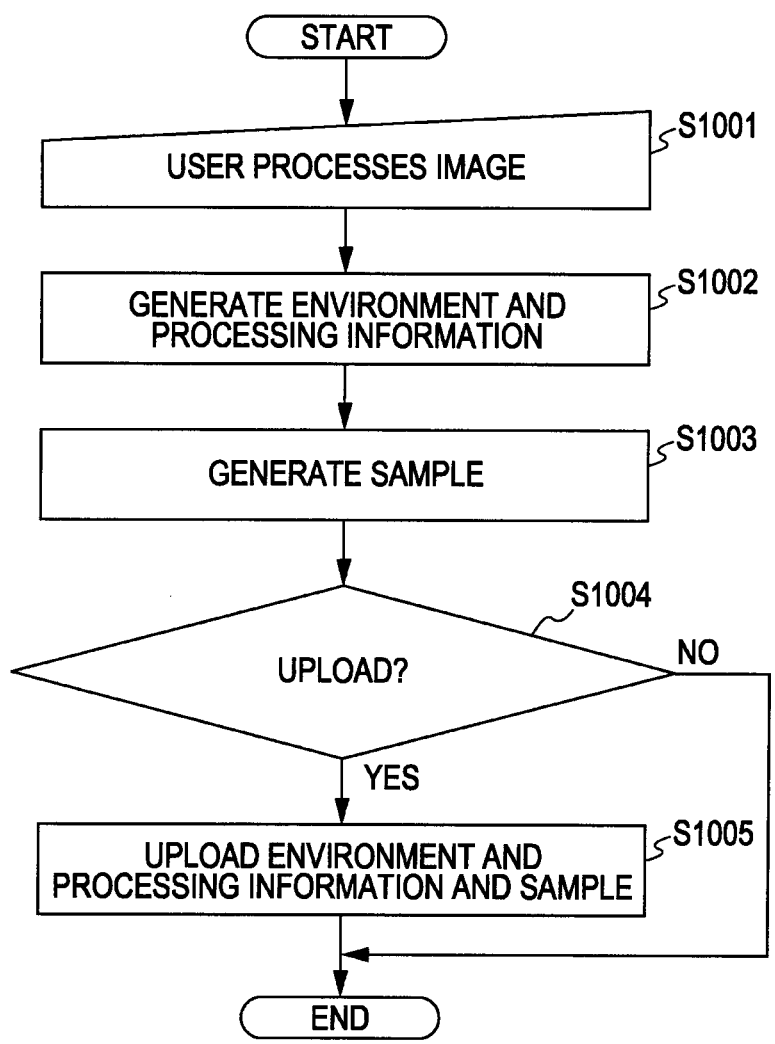
FIG. 10 is a flowchart illustrating a process of registering the sample data in the management server.

FIG. 10 is a flowchart illustrating a process of registering the sample data in the management server 120. In FIG. 10, an example in which the user of the information processing apparatus 100 registers data generated using the image processing application 171 as sample data in the management server 120 is shown. Hereinafter, the process of registering the sample data in the management server 120 will be described with reference to FIG. 10.

The user of the information processing apparatus 100 processes an image using the image processing application 171 (step S1001). When the user of the information processing apparatus 100 processes the image using the image processing application 171, the information processing apparatus 100 generates the environment and processing information along with the processing of the image (step S1002). The generation of the environment and processing information may be executed by, for example, the image processing module 212.

When the environment and processing information is generated, the image processing module 212 of the image processing application 171 generates the processed image based on the processing of the user (step S1003). When the processed image is generated by the image processing module 212, the image processing application 171 displays a message on the screen 160 to indicate whether the processed image is uploaded as a sample of the processing example to the management server 120, and waits for the decision of the user of the information processing apparatus 100 (step S1004).

When the user of the information processing apparatus 100 decides to upload the processed image as the sample of the processing example in the management server 120, the image processing application 171 stores the environment and processing information generated in step S1002 and the processed image generated in step S1003 in the sample information retaining unit 204 (step S1005), and then the process ends. Alternatively, when the user of the information processing apparatus 100 decides not to upload the processed image as the sample of the processing example in the management server 120, the environment and processing information and the processed image are not stored, and then the process ends.

By increasing numbers of processing examples by the actual applications of the user using the image processing application 171, it is easy to further confirm the advantage obtained by using the image processing application 171. In addition, since the user views another user's samples uploaded in the management server 120 during the execution of the image processing application 171, it is possible to obtain an advantage of discovering uses of the image processing application 171 which have not yet been considered.

Next, a display example of the samples on the screen 160 by the control application 162 will be described. FIGS. 11 to 15 are explanatory diagrams illustrating a series of display examples of the samples on the screen 160 by the control application 162.

Figure 11:
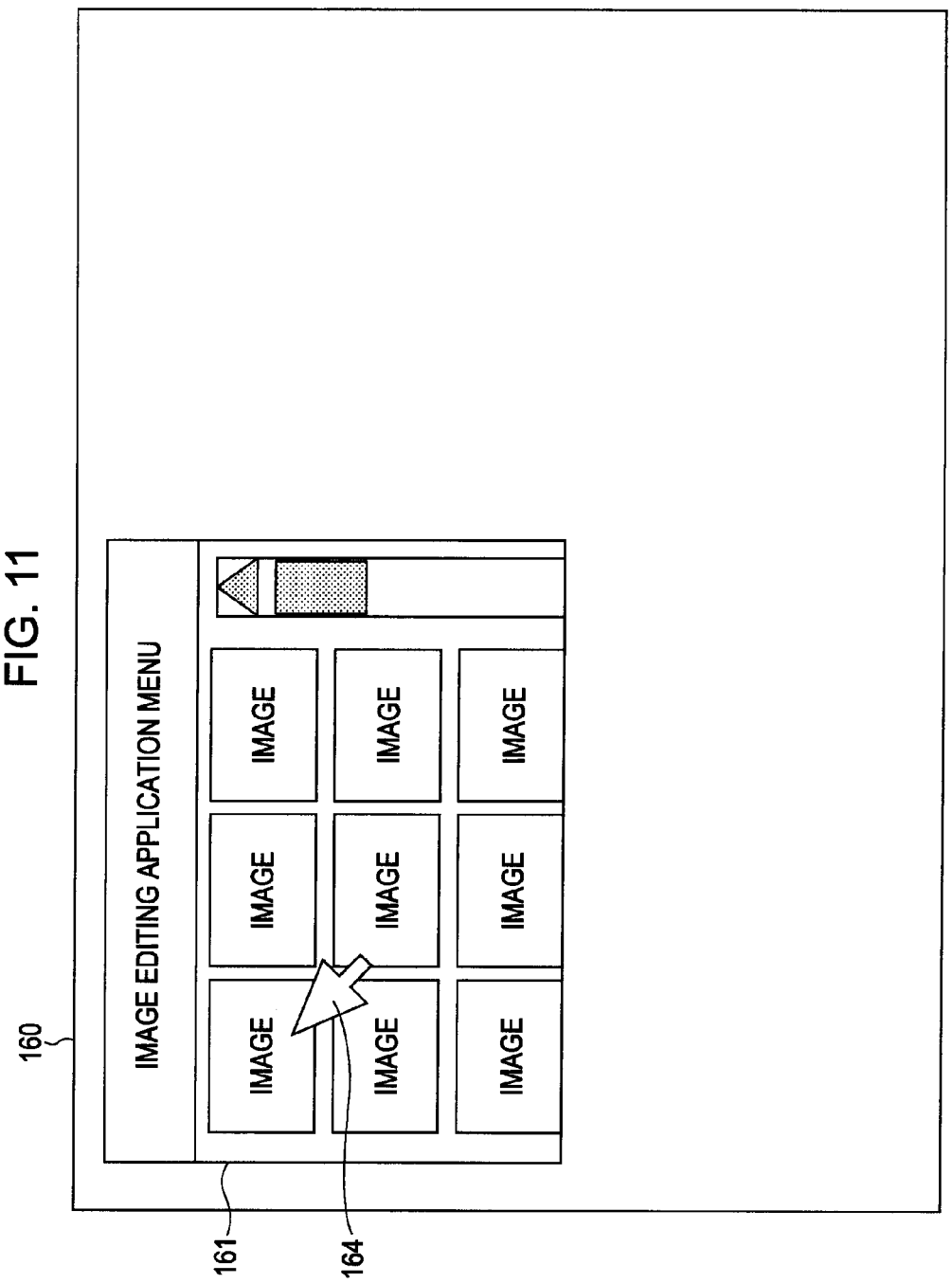
FIG. 11 is an explanatory diagram illustrating a series of display examples of samples on a screen by the control application.

In FIG. 11, the display example of the image editing application 161 on the screen 160 of the information processing apparatus 100 is shown. When the image editing application 161 is executed by the information processing apparatus 100, for example, an image data list picture shown in FIG. 11 is displayed on the screen 160. When the user selects any one of the items of image data from a list shown on the screen 160 by the image editing application 161, a process of editing the selected image starts.

Figure 12:
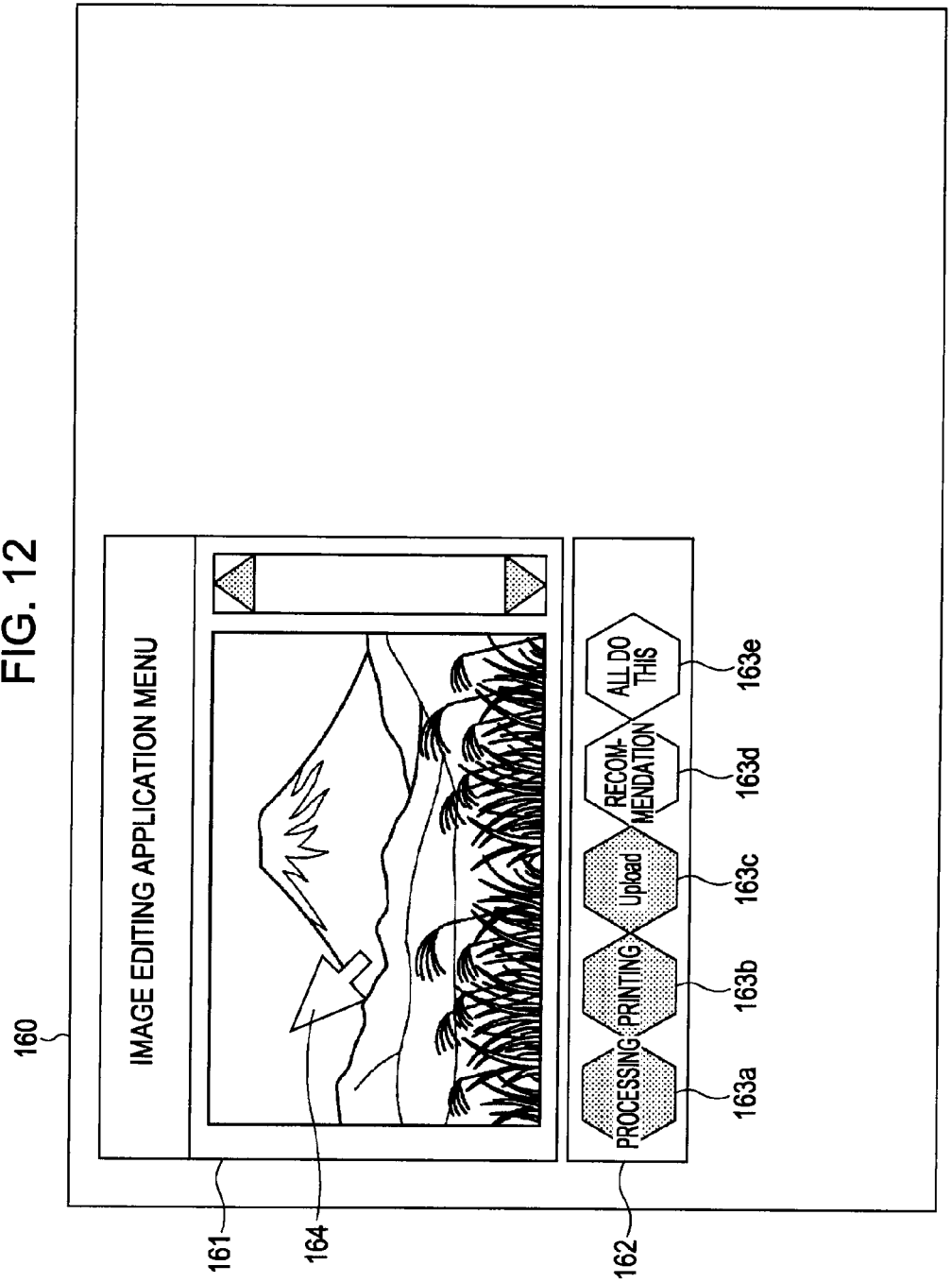
FIG. 12 is an explanatory diagram illustrating the series of display examples of samples on the screen by the control application.

In FIG. 12, a display example in which the user selects one image among the image data of the list in the image editing application 161 by the operation of the user is shown. When the user operates to select one image among the image data of the list in the image editing application 161, the selected image is displayed on the screen 160 and the control application 162 is simultaneously executed, so that a process list (for example, in the format of a context menu) is displayed on the screen 160 depending on the situation. In FIG. 12, the example in which icons 163a to 163e are displayed as the process list depending on a situation on the screen 160 is shown. The background colors of the icons 163a to 163e may be distinguished by an application installed on the information processing apparatus 100 and an application which is not installed on the information processing apparatus 100. In the example shown in FIG. 12, since the icons 163a to 163c are used for activating the application installed on the information processing apparatus 100, the backgrounds of the icons 163a to 163c may be displayed with, for example, a light purple color. Since the icons 163d and 163e are used for activating the application which is not installed on the information processing apparatus 100, the backgrounds of the icons 163d and 163e may be displayed with, for example, a light aqua color.

By allowing the user to select any image from the process list displayed by the control application 162, the information processing apparatus 100 selects the image editing application 161 to process the image displayed on the screen 160.

Figure 13:
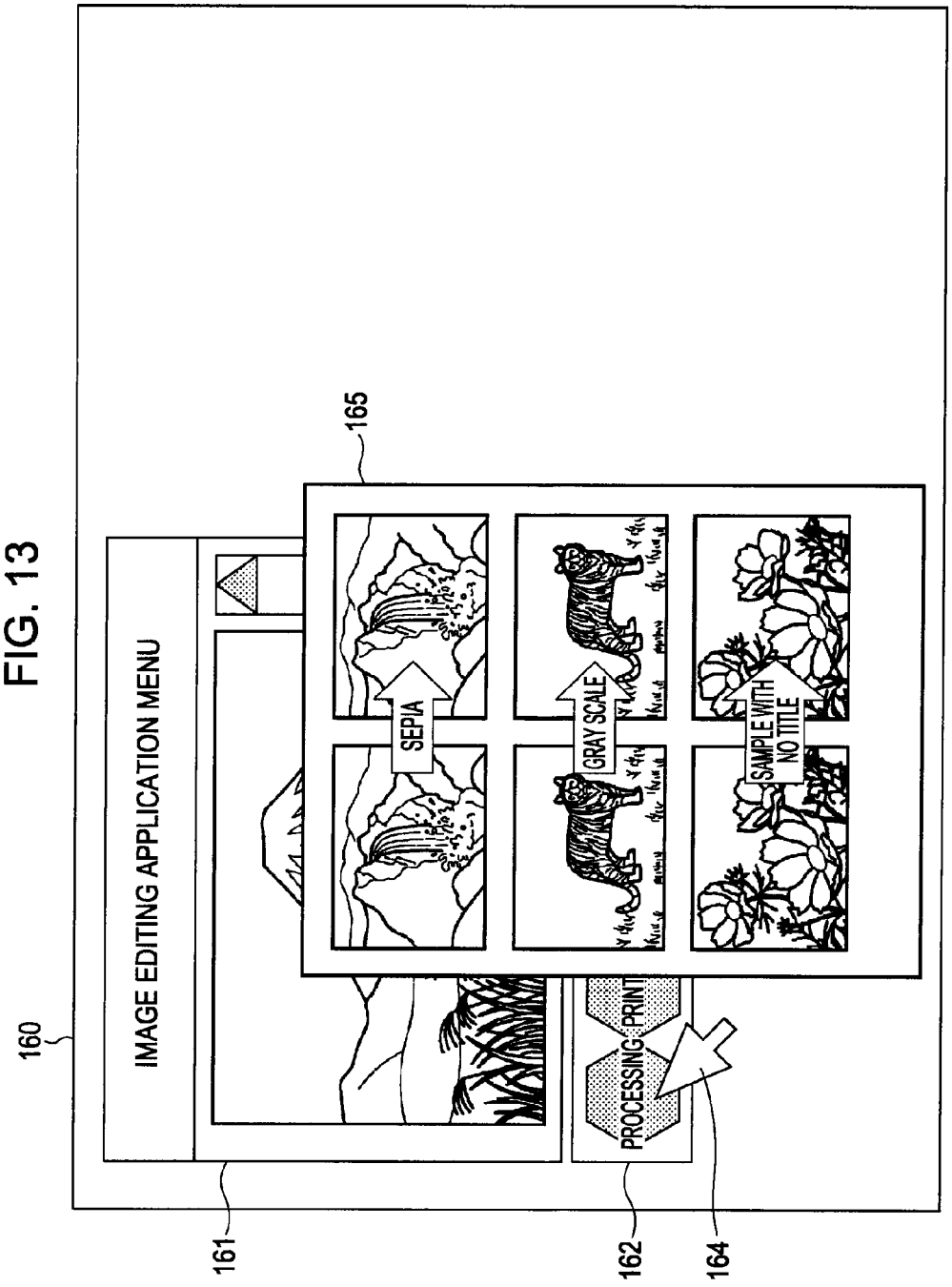
FIG. 13 is an explanatory diagram illustrating the series of display examples of samples on the screen by the control application.

Here, a display example in which the user of the information processing apparatus 100 selects the "processing" icon from the process list shown in FIG. 12 will be described. FIG. 13 is the explanatory diagram illustrating a screen display example when the user of the information processing apparatus 100 selects the "processing" icon from the process list shown in FIG. 12. In FIG. 13, a sample for converting the color of an image into a sepia color, a sample for converting the color of an image into a gray scale, and a sample (sample with no title) for converting the color of the image so as to be clearer are shown. When the user of the information processing apparatus 100 selects the "processing", as shown in FIG. 13, samples of the image before and after processing are displayed on a sample display area 165 of the screen 160 by the control application 162. The processed samples of the image displayed on the sample display area 165 may be generated by an application installed on the information processing apparatus 100 or may be generated by an application which is not installed on the information processing apparatus 100.

The user of the information processing apparatus 100 can grasp the processing executed on the image when viewing the samples displayed on the screen 160. Here, a case in which the user of the information processing apparatus 100 selects "sepia" among the samples displayed on the screen 160 to change the color to a sepia color will be described.

Figure 14:
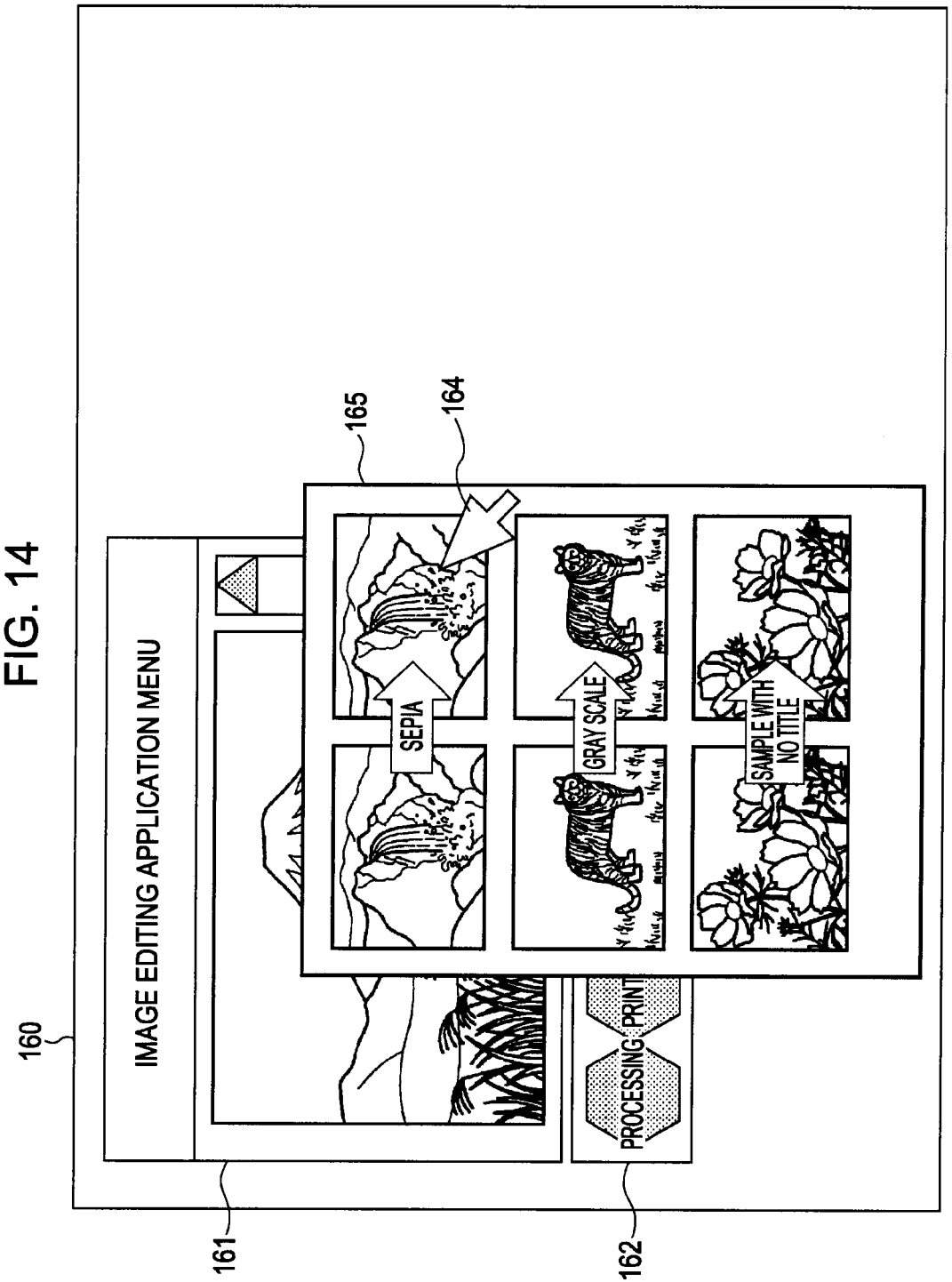
FIG. 14 is an explanatory diagram illustrating the series of display examples of samples on the screen by the control application.
Figure 15:
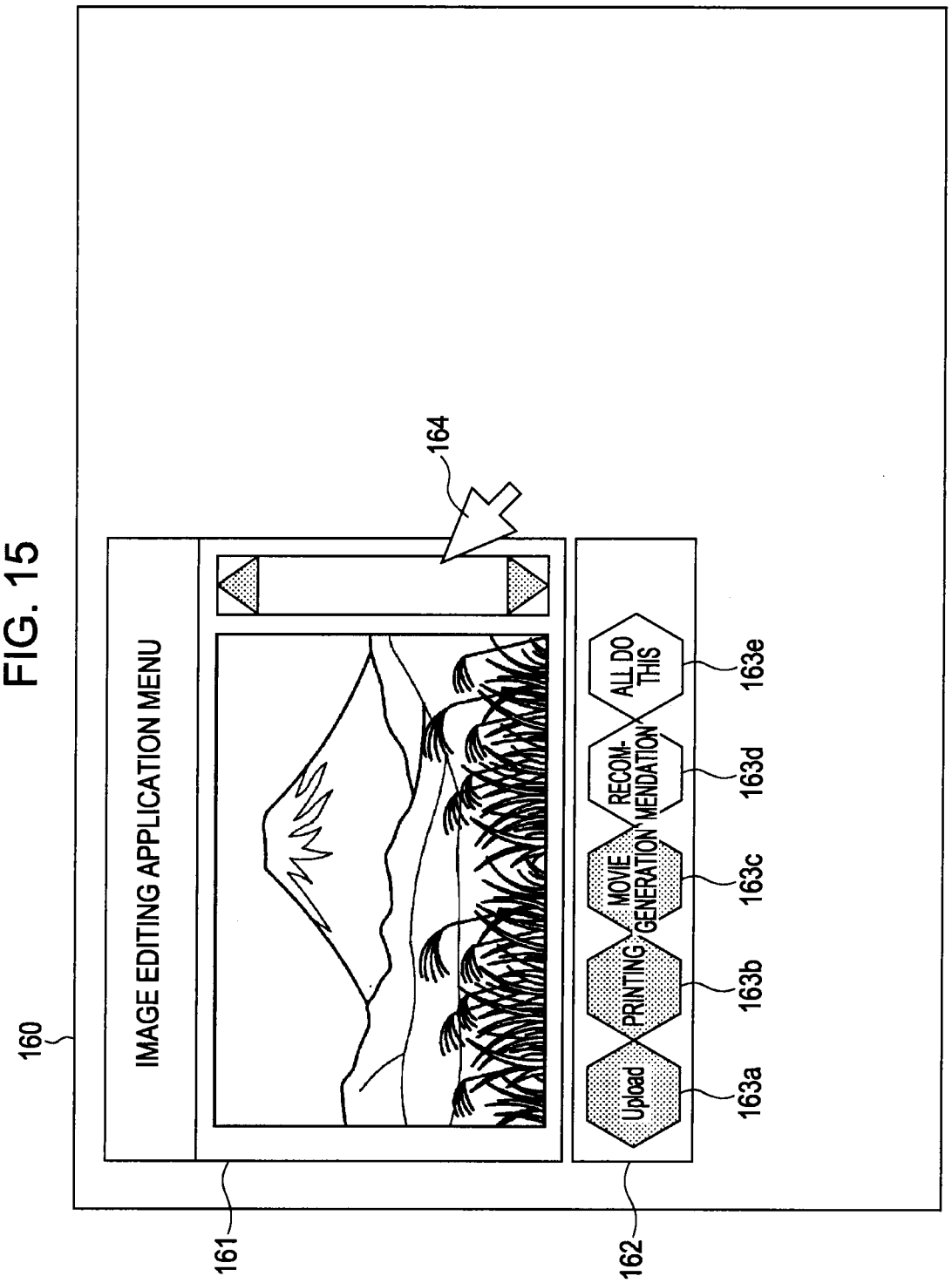
FIG. 15 is an explanatory diagram illustrating the series of display examples of samples on the screen by the control application.

When the user of the information processing apparatus 100 selects the sample for changing the color to a sepia color displayed on the sample display area 165 with the mouse cursor 164 or the like, as shown in FIG. 14, the information processing apparatus 100 executes the processing process of changing the color of the image selected by the image editing application 161 and displayed on the screen 160 to a sepia color. FIG. 15 is the explanatory diagram illustrating the display example in which the color of the image displayed on the screen 160 is changed to a sepia color by the image processing application 171.

In this way, by displaying the sample data subjected to the image processing process on the screen 160 by the control application 162, an advantage of enabling the user of the information processing apparatus 100 to understand which processing is performed can be obtained.

As shown in FIG. 15, the process list displayed on the screen 160 by the control application 162 may be changed after the image processing process. When FIGS. 12 and 15 are compared to each other, it can be known that the process list displayed on the screen 160 by the control application 162 has been changed. In this way, by changing the processes displayed on the screen 160 depending on a situation by the control application 162, an improvement in the processing efficiency of the user of the information processing apparatus 100 can be expected.

The display example of the samples on the screen 160 by the control application 162 has hitherto been described with reference to FIGS. 11 to 15. Next, a process of linking a "processing purpose" displayed on the screen 160 by the control application 162 to a "processed sample" of the application displayed in the sample display area 165 will be described.

Figure 16:
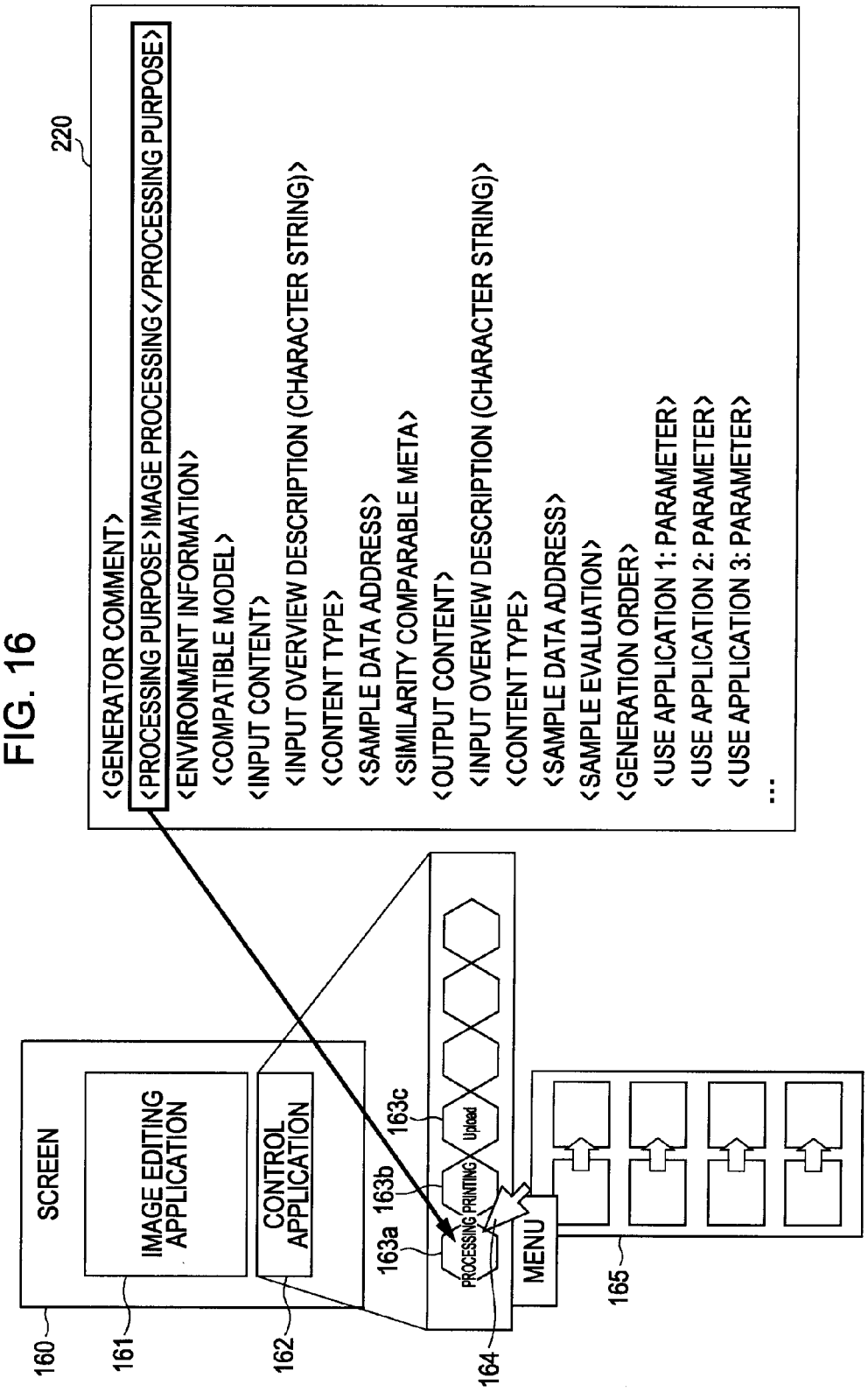
FIG. 16 is an explanatory diagram illustrating the link between a processing purpose displayed on the screen by the control application and a processed sample of an application displayed on a sample display area.

FIG. 16 is an explanatory diagram illustrating the link between the processing purpose displayed on the screen 160 by the control application 162 and the processed sample of the application displayed on the sample display area 165.

The link between the processing purpose and the processed sample can be achieved by describing information regarding the processing purpose in the environment and processing information file corresponding to each sample data. FIG. 16 shows an example in which the link between the processing purpose displayed on the screen 160 by the control application 162 and the processed sample of the application displayed in the sample display area 165 is achieved by describing data indicating a sample for the image processing purpose in an environment and processing information file 220.

By describing the information shown in FIG. 16 in the environment and processing information file 220, the control application 162 can determine the processing purpose of the generated sample prepared in advance and thus can display the sample on the screen 160 by linking with the details of the process.

Figure 17:
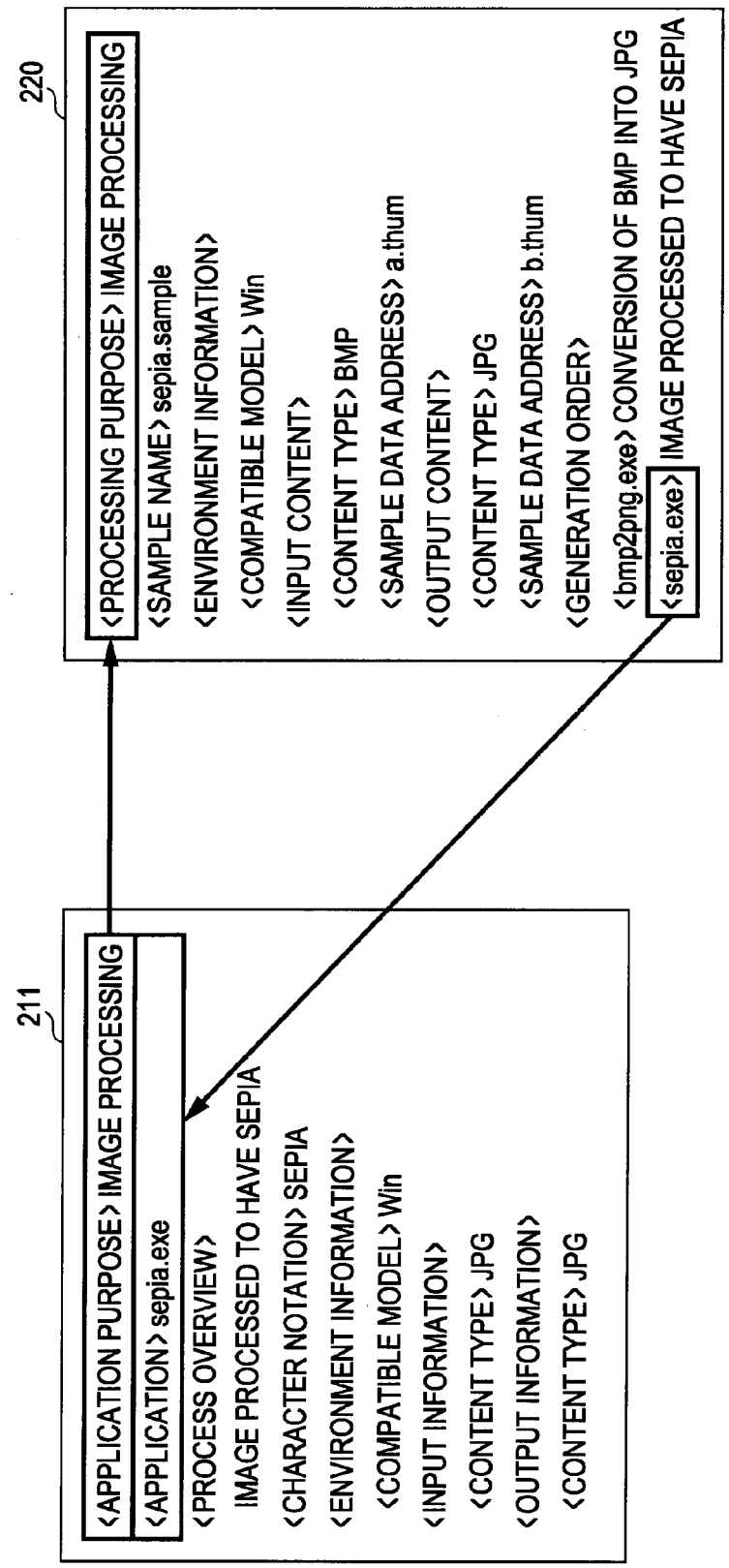
FIG. 17 is an explanatory diagram illustrating a corresponding example between an application information file generated to correspond to each application and an environment and processing information file generated to correspond to the sample generated using each application.

FIG. 17 is an explanatory diagram illustrating a corresponding example between an application information file 1701 generated to correspond to each application and an environment and processing information file 1702 generated to correspond to the sample generated using each application. FIG. 17 shows an example of the application information file 1701 of an application which processes an image stored in JPEG format to have a sepia color and outputs the image in JPEG format and an example of the environment and processing information file 1702 of a sample which converts an image stored in the bitmap format into an image of JPEG format, processes the image to have a sepia color, and outputs the processed image.

The application information file is generated by a generator of the application when the application is generated. The generator of the application processing an image so as to have a sepia color generates the application information file 1701 shown in FIG. 17 to describe information. The information regarding the purpose of an application and the file name of the application are described in the application information file 1701 by the generator of the application.

The environment and processing information file 1702 is generated by the generator of the sample data when the sample data is generated. The generator of the sample generating and outputting a file of JPEG format processed from the image of the bitmap format so as to have the sepia color generates the environment and processing information file 1702 shown in FIG. 17 to describe information. The information regarding the sample processing purpose and a generation order for executing the sample is described in the environment and processing information file 1702 by the generator of the sample.

As shown in FIG. 17, the link between the application and the sample data can be achieved by describing the information for linking the processing purpose of the application and the sample processing purpose in the application information file and the environment and processing information file.

Next, another example of the process of introducing samples on the screen will be described. First, a process of introducing samples when a user confirms the sample data uploaded in the management server 120 by another user and executes an application on a client will be described.

Figure 18:
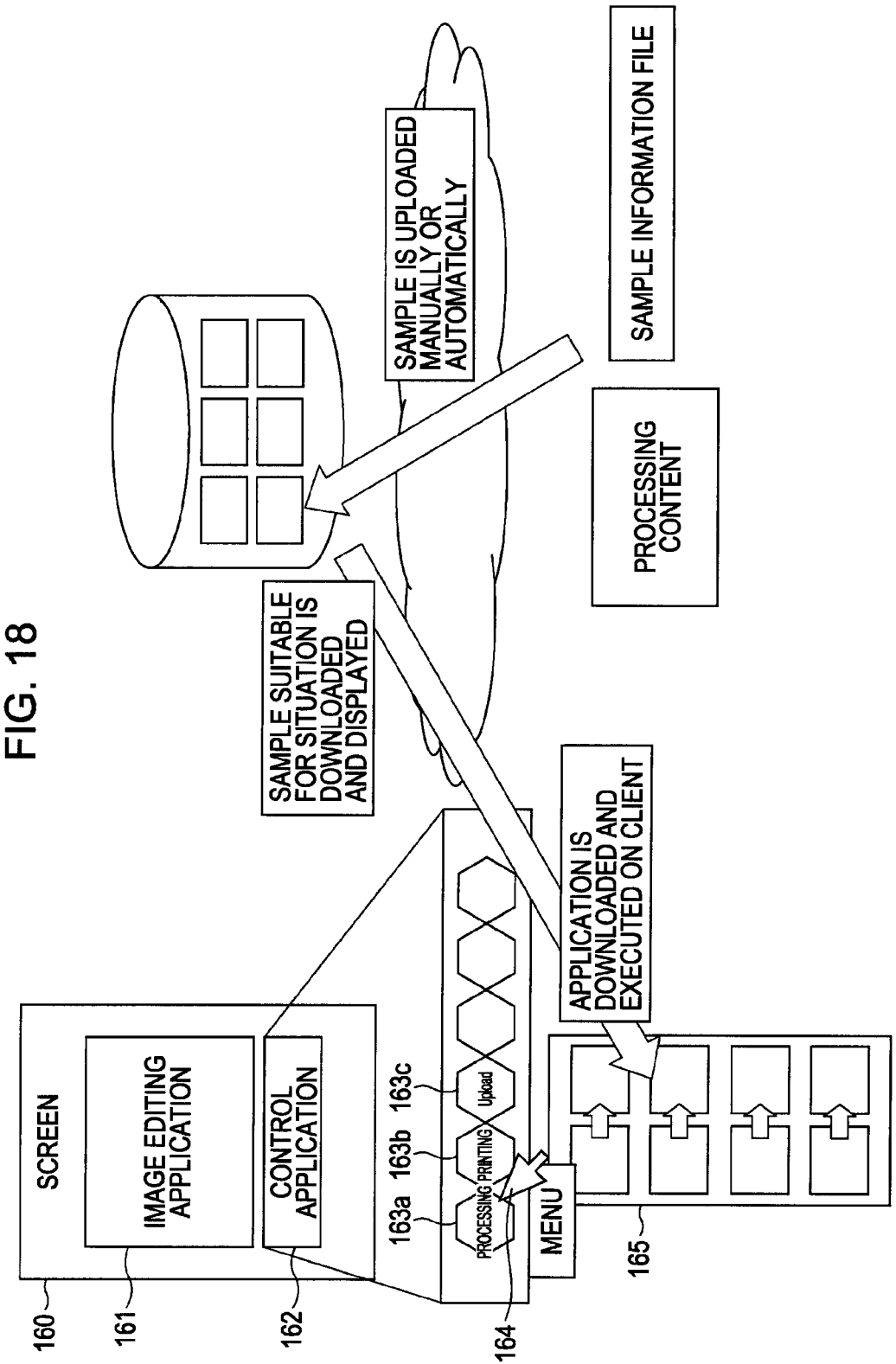
FIG. 18 is an explanatory diagram illustrating the exemplary process of introducing samples on the screen.

FIG. 18 is an explanatory diagram illustrating the exemplary process of introducing samples on the screen. It is assumed that a user processes image data using an application (for example, the above-described image processing application) processing image data, and since the user can skillfully process the image data, the user uploads samples to a server (the management server 120) so that another user can use the uploaded samples.

When the another user that may not skillfully use the image processing application activates the image editing application 161, for example, on the information processing apparatus 100, the control application 162 introduces applications associated with the image editing application 161 on the screen 160. When the user selects the icon or the like corresponding to an application, as described above, the control application 162 displays processes which can be executed by the application along with the sample data. The sample data may include samples generated using the image processing application by the above user.

Then, when viewing the samples displayed on the screen 160 by the control application 162, the user can confirm the specific details of the processes which can be executed by the image processing application. When the user does not install the image processing application on the information processing apparatus 100 used by the user, the information processing apparatus 100 can download and install the image processing application from an application providing server or the like under the operation of the control application 162.

Figure 19:
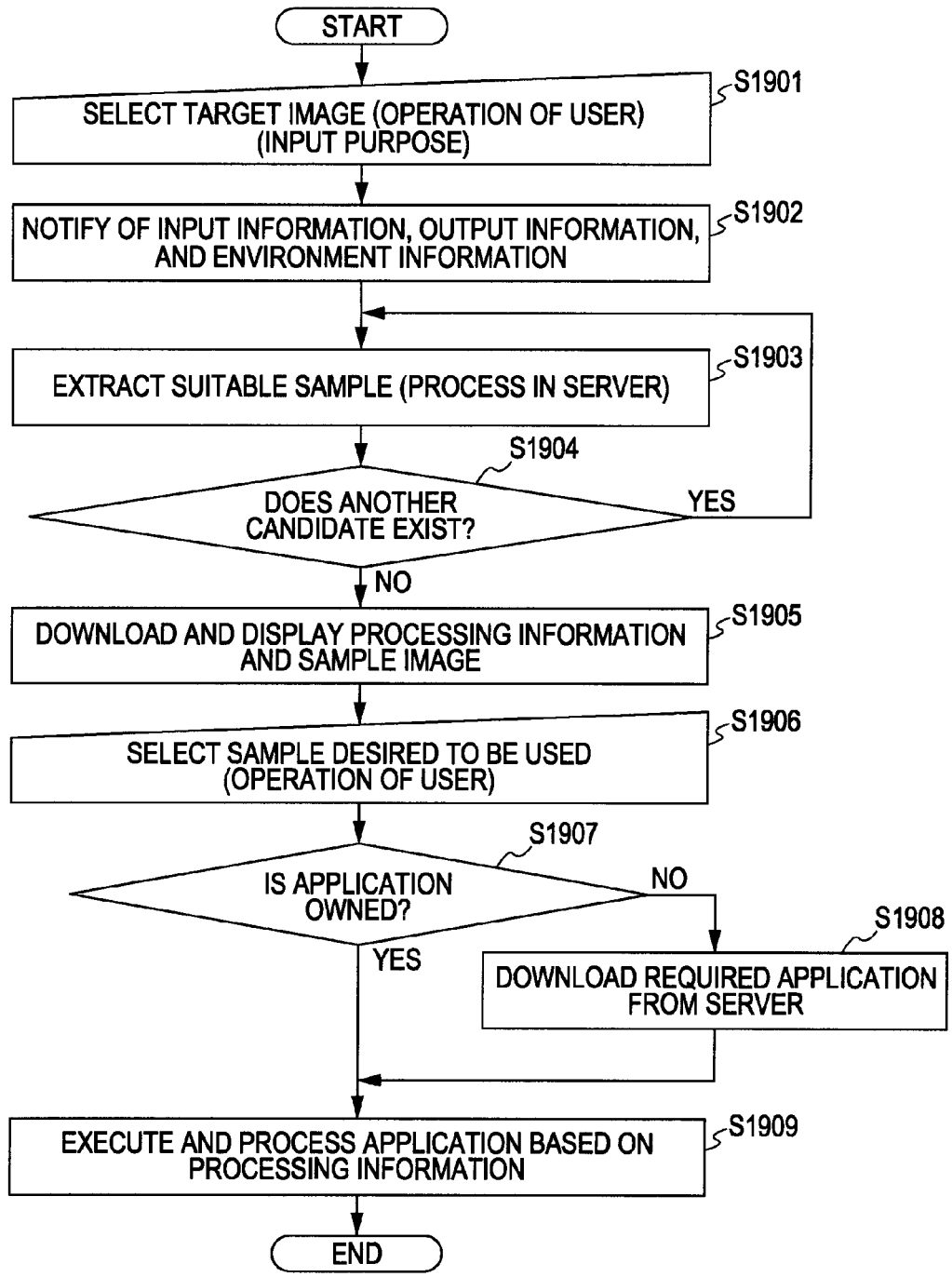
FIG. 19 is a flowchart illustrating the process of introducing the samples on the screen by the control application and an application executing process.

FIG. 19 is a flowchart illustrating the process of introducing the samples on the screen 160 by the control application 162 and an application executing process. In FIG. 19, the sample introducing process and the application executing process when the sample data registered in the server (the management server 120) is acquired and displayed in the information processing apparatus 100 are shown. Hereinafter, the process of introducing the samples on the screen and the application executing process will be described with reference to FIG. 19.

First, the user of the information processing apparatus 100 activates the image editing application 161 on the information processing apparatus 100 and selects an image to be edited among the images shown in the list (step S1901). When the user of the information processing apparatus 100 selects the image to be edited, the information processing apparatus 100 notifies the management server 120 of input information, output information, and environment information of the information processing apparatus 100 (step S1902). The notification of the information is executed by the control application 162. For example, the input information and the output information have the file format of the image data. For example, the environment information of the information processing apparatus 100 includes the type and model of the information processing apparatus 100, an OS (Operating System), and the version of the OS.

The management server 120 receiving the input information, the output information, and the environment information of the information processing apparatus 100 from the information processing apparatus 100 extracts the sample data suitable for the information (step S1903). After extracting the sample data, the management server 120 determines whether another candidate sample exists (step S1904). When another candidate sample exists, the process returns to step S1903 and the management server 120 continues extracting the sample data. Alternatively, when another candidate sample does not exist, the management server 120 allows the extracted sample to stay downloadable to the information processing apparatus 100. The control application 162 operated from the information processing apparatus 100 downloads the sample data from the management server 120 and displays the downloaded sample data on the screen 160 (step S1905).

When the sample data are displayed on the screen 160, the user of the information processing apparatus 100 selects any sample data which the user desires to use among the displayed sample data (step S1906). When the user of the information processing apparatus 100 selects the sample data, the control application 162 determines whether an application for processing an image, like the sample data selected by the user, is installed on the information processing apparatus 100 (step S1907).

When it is determined that the application is not installed on the information processing apparatus 100 in step S1907, the control application 162 downloads an application from the server (the application providing server 131A, 132B, 133C, and so on) to the information processing apparatus 100 (step S1908). When the application is completely downloaded to the information processing apparatus 100 and is completely installed, the control application 162 executes the application based on the processing information (described in the environment and processing information file) acquired along with the sample data, and processes the image data selected in step S1901 (step S1909). Alternatively, when it is determined that the application is installed on the information processing apparatus 100 in step S1907, the control application 162 executes the application based on the processing information and processes the image data selected in step S1901 (step S1909).

Next, an exemplary process of introducing samples when a user confirms the sample data uploaded to the management server 120 by another user and executes the application on the server will be described.

Figure 20:
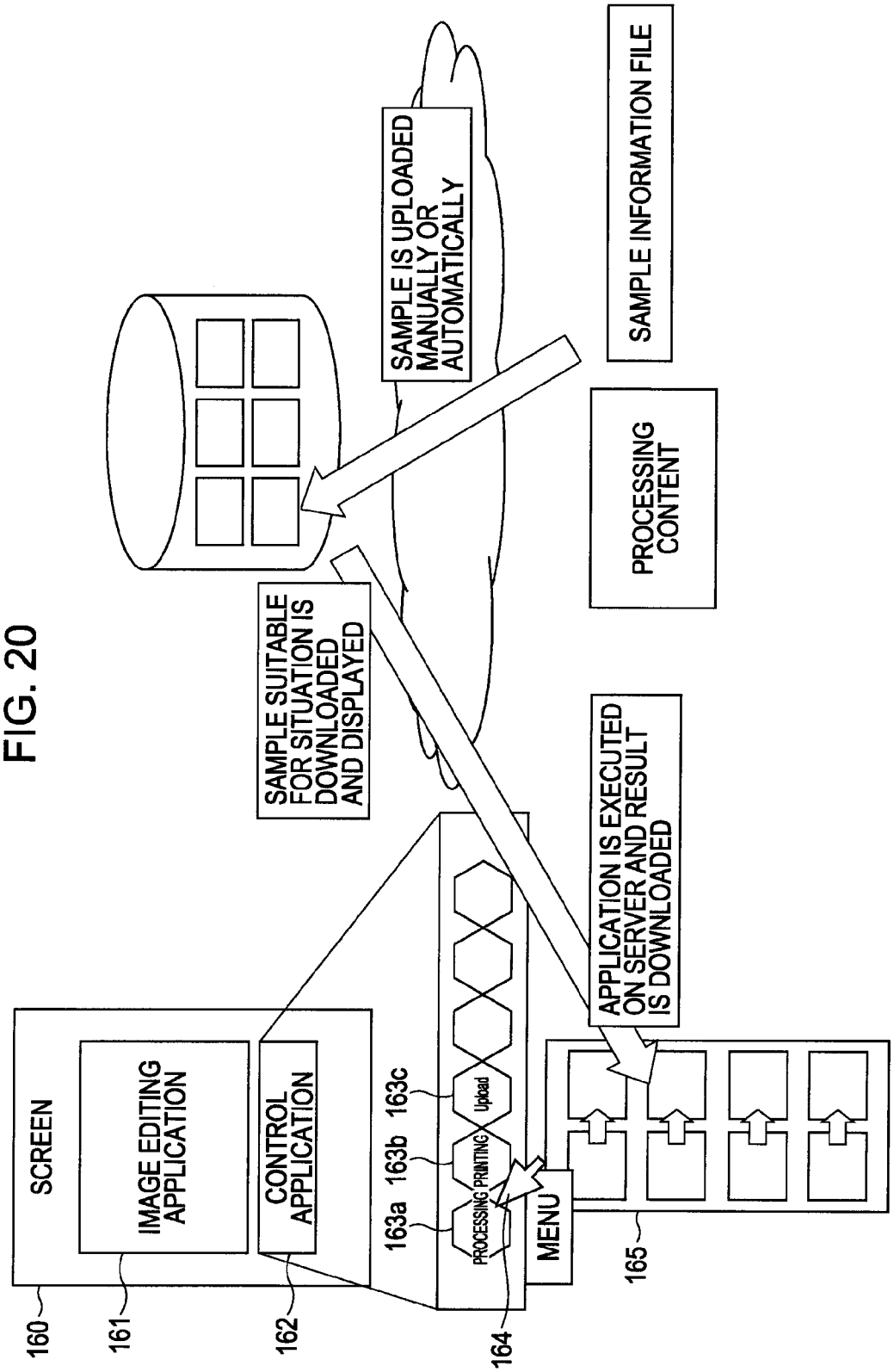
FIG. 20 is an explanatory diagram illustrating an exemplary process of introducing samples on the screen by the control application.

FIG. 20 is an explanatory diagram illustrating the exemplary process of introducing the samples on the screen 160 by the control application 162. In this case, as in the case shown in FIG. 18, it is assumed that a user processes image data using an application (for example, the above-described image processing application) processing image data, and since the user can skillfully process the image data, the user uploads samples to a server (the management server 120) so that another user can use the uploaded samples.

When the another user that may not skillfully use the image processing application activates the image editing application 161, for example, on the information processing apparatus 100, the control application 162 introduces applications associated with the image editing application 161 on the screen 160. When the user selects the icon or the like corresponding to an application, as described above, the control application 162 displays processes which can be executed by the application along with the sample data. The sample data may include samples generated using the image processing application by the above user.

Then, when viewing the samples displayed on the screen 160 by the control application 162, the user can confirm the specific details of the processes which can be executed by the image processing application. When the user does not install the image processing application on the information processing apparatus 100 used by the user, the user uploads the image file to the application providing server or the like, executes the image processing application on the server or the like to process the image file, and downloads the processed image file to the information processing apparatus 100. Accordingly, even when the application executing the same process as the process on the sample data is not installed on the information processing apparatus 100 used by the user, the same process as that executed when the information processing apparatus 100 executes the same process as the process on the sample data can be executed.

Figure 21:
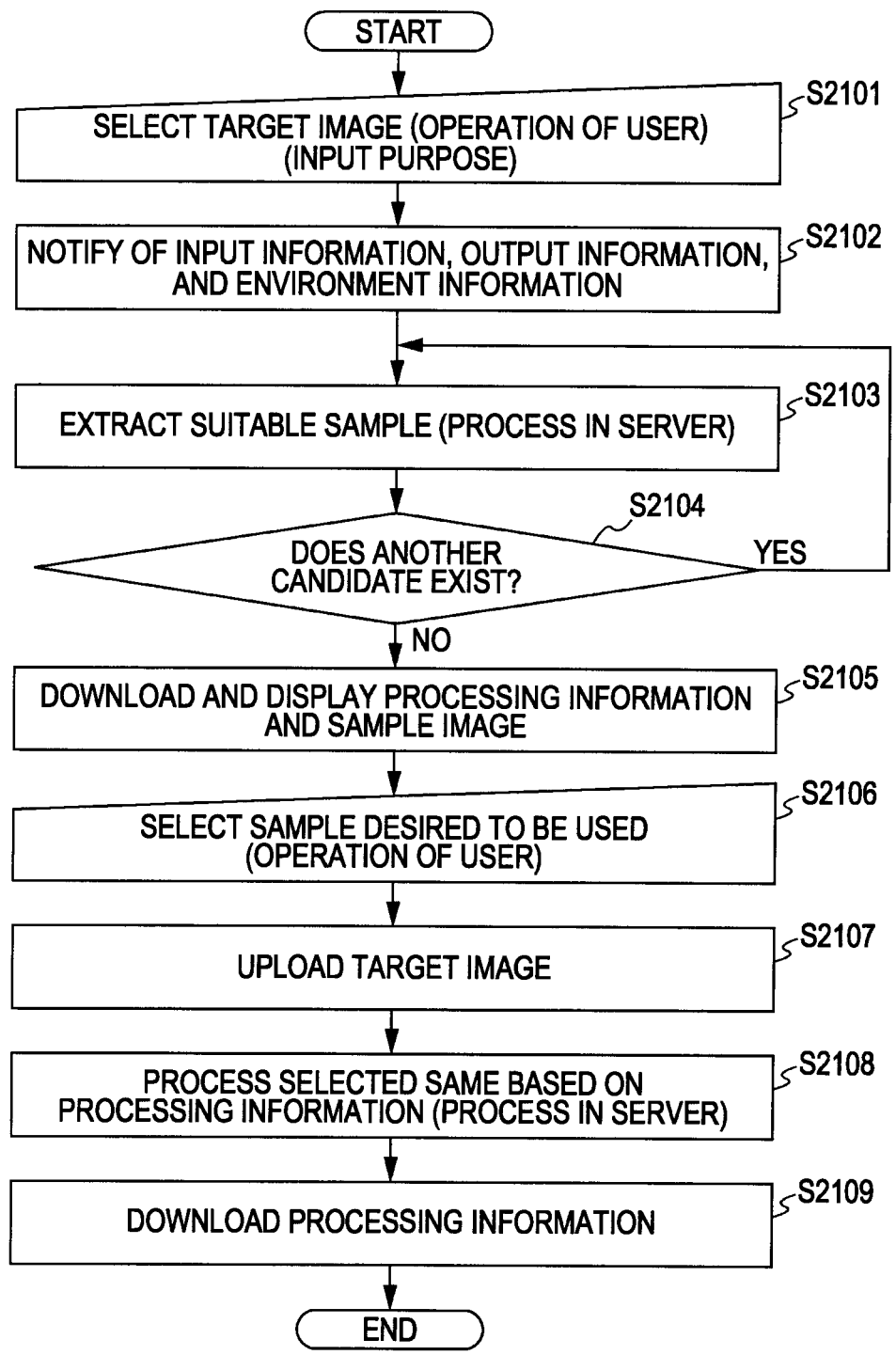
FIG. 21 is a flowchart illustrating the process of introducing the samples on the screen by the control application.

FIG. 21 is a flowchart illustrating the process of introducing the samples on the screen 160 by the control application 162. In FIG. 21, the sample introducing process and the application executing process when the sample data registered in the server (the management server 120) is acquired and displayed in the information processing apparatus 100 are shown. Hereinafter, the process of introducing the samples on the screen and the application executing process will be described with reference to FIG. 21.

First, the user of the information processing apparatus 100 activates the image editing application 161 on the information processing apparatus 100 and selects an image to be edited among the images shown in the list (step S2101). When the user of the information processing apparatus 100 selects the image to be edited, the information processing apparatus 100 notifies the management server 120 of input information, output information, and environment information of the information processing apparatus 100 (step S2102). The notification of the information is executed by the control application 162. For example, the input information and the output information have the file format of the image data. For example, the environment information of the information processing apparatus 100 includes the type and model of the information processing apparatus 100, an OS (Operating System), and the version of the OS.

The management server 120 receiving the input information, the output information, and the environment information of the information processing apparatus 100 from the information processing apparatus 100 extracts the sample data suitable for the information (step S2103). After extracting the sample data, the management server 120 determines whether another candidate sample exists (step S2104). When another candidate sample exists, the process returns to step S2103 and the management server 120 continues extracting the sample data. Alternatively, when another candidate sample does not exist, the management server 120 allows the extracted sample to stay downloadable to the information processing apparatus 100. The control application 162 operated from the information processing apparatus 100 downloads the sample data from the management server 120 and displays the downloaded sample data on the screen 160 (step S2105).

When the sample data are displayed on the screen 160, the user of the information processing apparatus 100 selects any sample data which the user desires to use among the displayed sample data (step S2106). When the user of the information processing apparatus 100 selects the sample data, the control application 162 uploads the image data selected in step S2101 to the server (for example, the application providing server 131) (step S2107).

When the image data selected in step S2101 is uploaded to the server, the server processes the uploaded image based on the processing information of the sample data selected in step S2106 by the user of the information processing apparatus 100 (step S2108). When the processing is completed, the server allows the processed image data to stay downloadable. The control application 162 downloads the processed image data from the server to the information processing apparatus 100 and displays the processed image data on the screen 160 of the information processing apparatus 100 (step S2109).

Next, an exemplary process of introducing samples when data uploaded to a server by a user are processed on the server and the samples are introduced to a client will be described.

Figure 22:
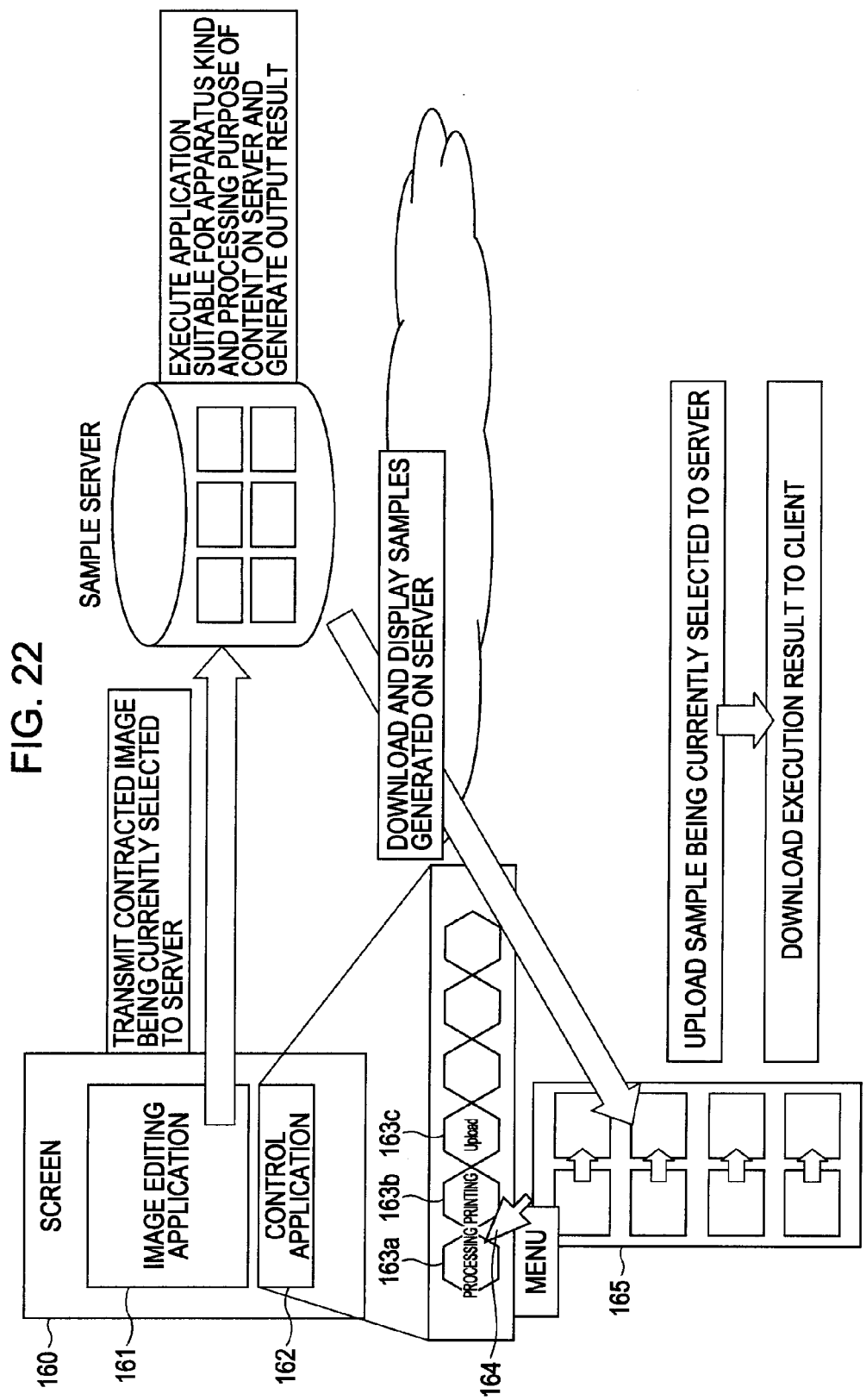
FIG. 22 is an explanatory diagram illustrating an exemplary process of introducing samples on the screen by the control application.

FIG. 22 is an explanatory diagram illustrating the exemplary process of introducing the samples on the screen 160 by the control application 162. In this case, unlike the case shown in FIG. 18 or 20, it is assumed that a user uploads image data to a server, executes an application suitable for the kind or the processing purpose of the data on the server, and introduces the output result as samples to a client. Here, the images uploaded to the server may be original images. However, the original images may be reduced in size in terms of reduction in the sample generation load in the server.

First, a user executes the image editing application 161 on the information processing apparatus 100 and the image editing application 161 selects one (or a plurality) of images among a plurality of images displayed on the screen 160. When the image editing application 161 selects the image, the control application 162 displays icons for activating applications associated with the image editing application 161 being executed on the information processing apparatus 100 on the screen 160 and also transmits the image selected by the user and the environment information of the information processing apparatus 100 to a server (for example, the management server 120).

The server extracts information regarding the suitable sample based on the image transmitted from the information processing apparatus 100 and the environment information of the information processing apparatus 100 and executes an application (for example, which is installed on the application providing server 131 or the like) to generate sample data by using the image transmitted from the information processing apparatus 100. The control application 162 executed on the information processing apparatus 100 downloads and displays the generated sample data on the screen 160. Then, even when the application is not installed on the information processing apparatus 100, the user of the information processing apparatus 100 can confirm the result obtained through the image processing as the sample. Since the applications are executed on the server, the information processing apparatus 100 having a weak processing capability can confirm the sample data for the information processing apparatus 100. Moreover, the user can directly confirm the result obtained by processing the image being currently selected in the information processing apparatus 100.

Figure 23:
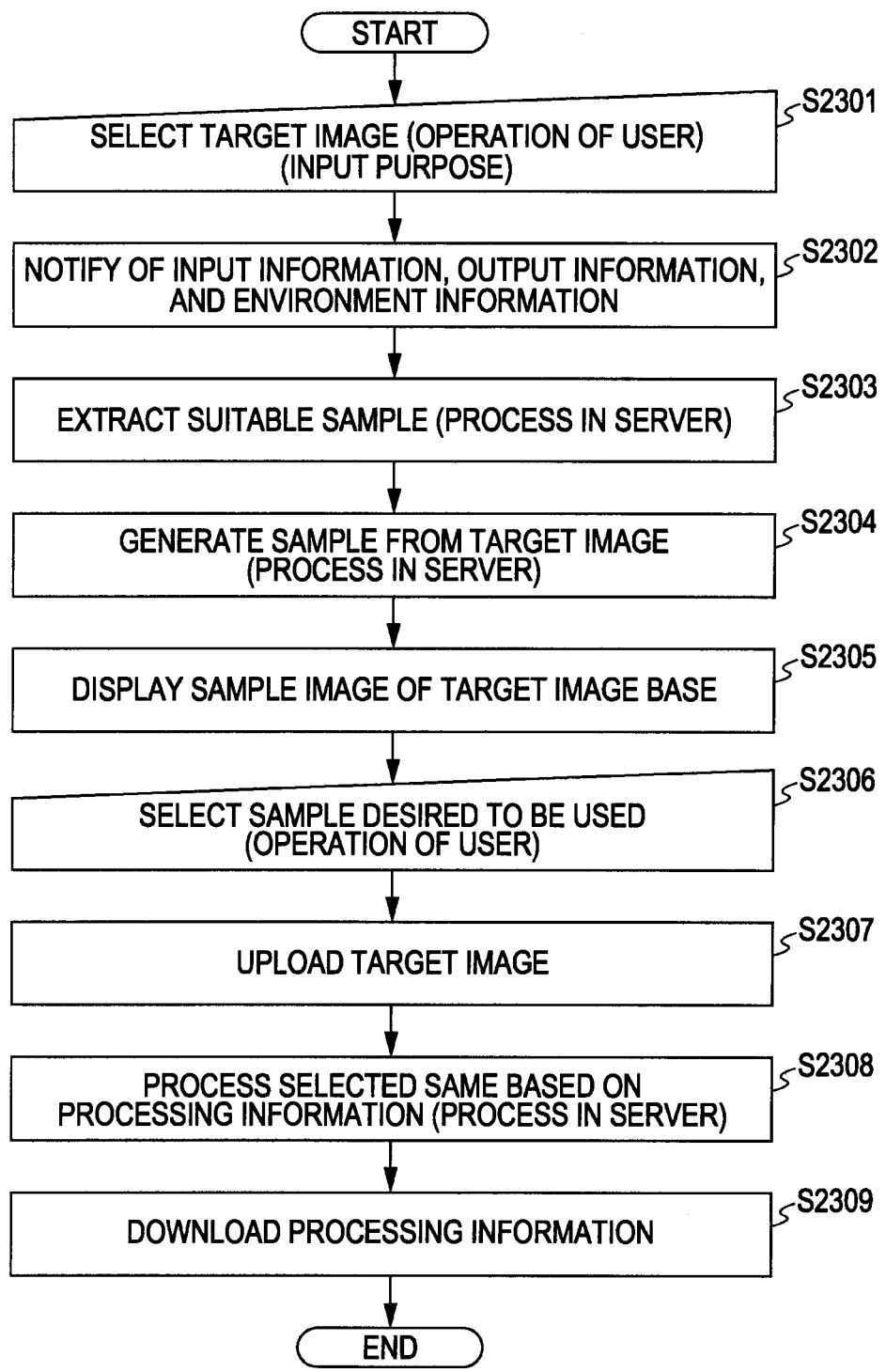
FIG. 23 is a flowchart illustrating the process of introducing the samples on the screen by the control application.

FIG. 23 is a flowchart illustrating the process of introducing the samples on the screen 160 by the control application 162. In FIG. 23, the sample introducing process and the application executing process when data is transmitted from a client to the server (the management server 120), the sample data is generated on the server, and the generated sample data is displayed in the information processing apparatus 100 are shown. Hereinafter, the process of introducing the samples on the screen and the application executing process will be described with reference to FIG. 23.

First, the user of the information processing apparatus 100 activates the image editing application 161 on the information processing apparatus 100 and selects an image to be edited among the images shown in the list (step S2301). When the user of the information processing apparatus 100 selects the image to be edited, the information processing apparatus 100 transmits input information, output information, and the image selected in step S2301 to the management server 120 (step S2302). The image with the size of the original image may be transmitted from the information processing apparatus 100 to the management server 120. However, the image reduced in size may be transmitted in terms of the generation of the sample data.

The management server 120 receiving the input information, the output information, and the environment information of the information processing apparatus 100 from the information processing apparatus 100 extracts at least one suitable sample data from the information (step S2303). The management server 120 extracting the sample data generates samples from the images transmitted from the information processing apparatus 100 in step S2302 using the sample data extracted in step S2303 (step S2304). The samples may be actually generated by the server 131 executing the application. When generating the samples in step S2304, the management server 120 allows the generated samples to stay downloadable. The control application 162 downloads the samples from the management server 120 and displays the samples on the screen 160 (step S2305).

When the sample data are displayed on the screen 160, the user of the information processing apparatus 100 selects any sample data which the user desires to use among the displayed sample data (step S2306). When the user of the information processing apparatus 100 selects the sample data, the control application 162 uploads the image data selected in step S2301 to the server (for example, the management server 120) again (step S2307).

When the image data selected in step S2301 is uploaded to the server, the server processes the uploaded image based on the processing information of the sample data selected in step S2306 by the user of the information processing apparatus 100 (step S2308). When the processing is completed, the server allows the processed image data to stay downloadable. The control application 162 downloads the processed image data from the server to the information processing apparatus 100 and displays the downloaded image data on the screen 160 of the information processing apparatus 100 (step S2309).

Next, an exemplary process of introducing samples when the image data photographed by a digital camera or a portable phone are processed on a server and the processed image data are introduced as the samples to the photographing digital camera or a portable phone will be described.

Figure 24:
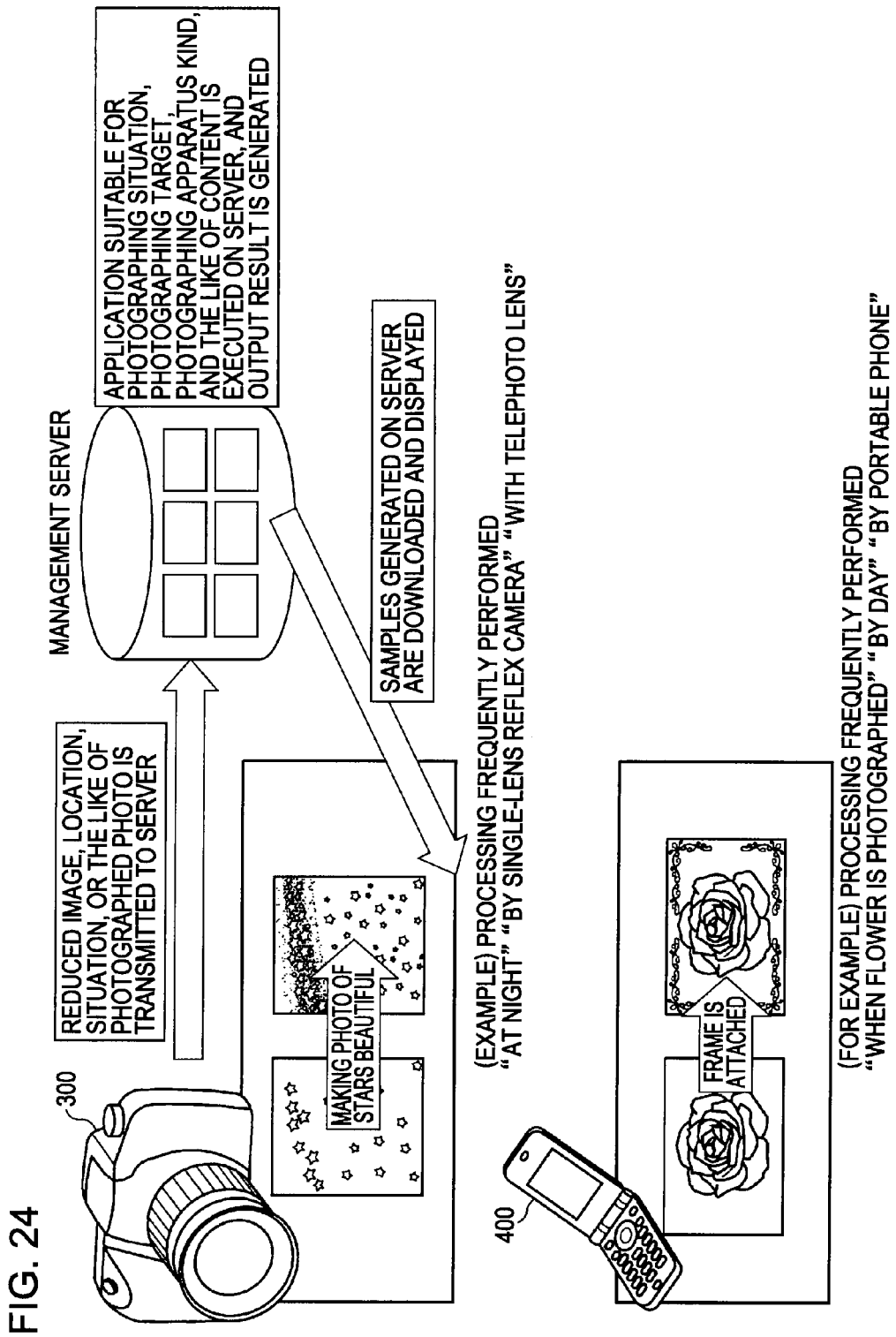
FIG. 24 is an explanatory diagram illustrating an exemplary process of introducing samples on the screen.

FIG. 24 is an explanatory diagram illustrating the exemplary process of introducing the samples on the screen. In this case, it is assumed that a user uploads the image data photographed using a digital camera or a portable phone to a server, an application suitable for the kind of data or the processing purpose is executed on the server, and the output result is introduced as the samples to the digital camera or the portable phone.

First, an image photographed using a digital camera 300 or a portable phone 400 by the user is transmitted to the server (for example, the management server 120) along with environment information of the digital camera 300 or the portable phone 400. Based on the image transmitted from the digital camera 300 or the portable phone 400 or the environment information of the digital camera 300 or the portable phone 400, the server extracts information regarding suitable samples and executes an application (for example, which is installed on the application providing server 131) to generate sample data by using the image transmitted from the digital camera 300 or the portable phone 400.

For example, when the server processes the image photographed by the digital camera 300, the server extracts processing frequently performed on, for example, an image "photographed at night" "using a single-lens reflex camera" "with a telephoto lens" and generates the sample data. For example, when the server processes an image photographed by a portable phone 400, the server extracts processing frequently performed, for example, "when a flower is photographed" "by day" "by a portable phone", and generates the sample data.

The control application 162 executed on the digital camera 300 or the portable phone 400 downloads the generated sample data from the server and displays the sample data on the screen of the digital camera 300 or the portable phone 400. Accordingly, even when the application is not installed on the digital camera 300 or the portable phone 400, the user of the digital camera 300 or the portable phone 400 can confirm the result obtained through the image processing as the samples. Since the application is executed on the server, the digital camera 300 or the portable phone 400 having a weak processing capability can confirm the sample data for the digital camera 300 or the portable phone 400. Moreover, the user can directly confirm the images photographed by the digital camera 300 or the portable phone 400 in the digital camera 300 or the portable phone 400.

Figure 25:
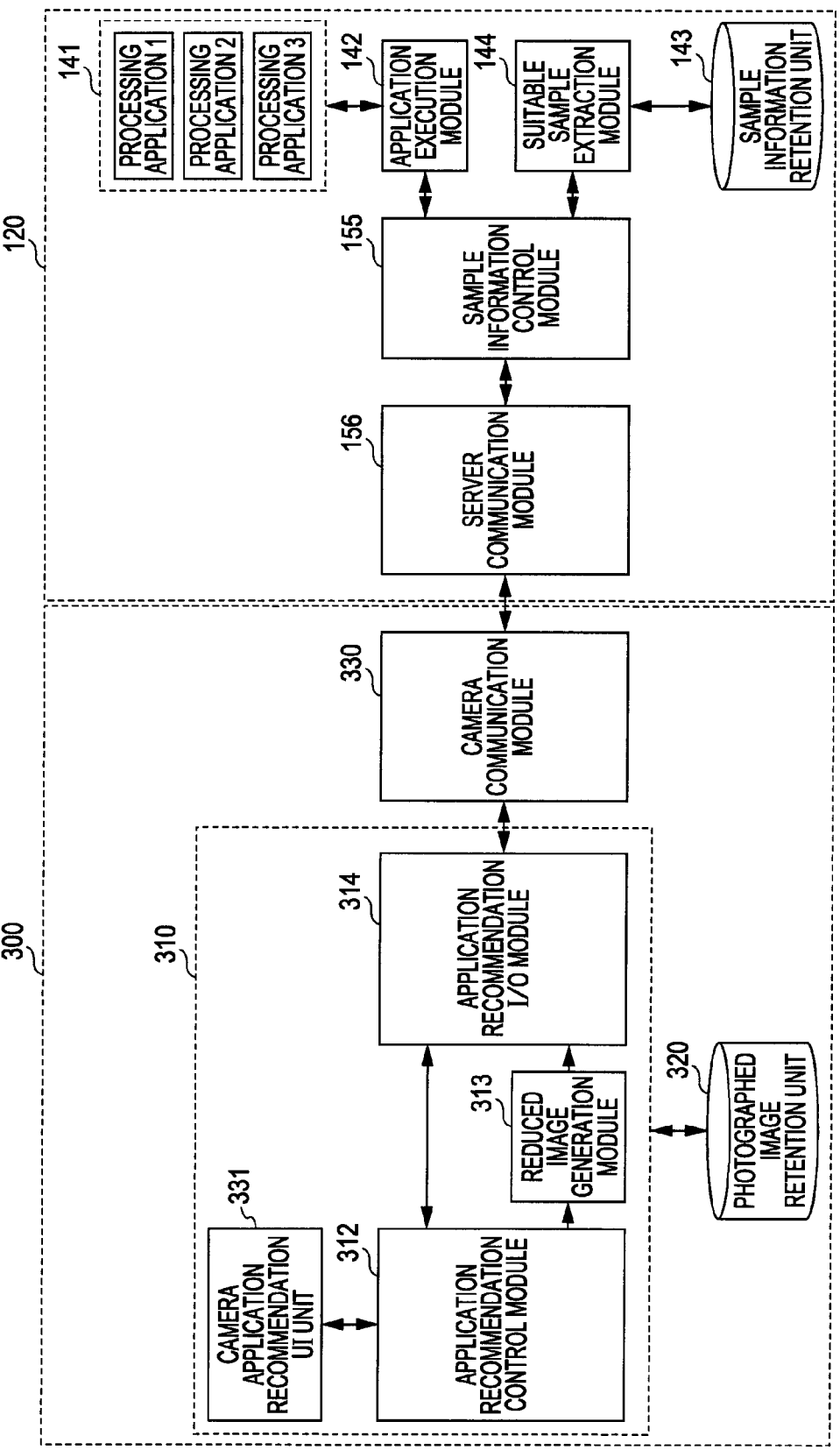
FIG. 25 is an explanatory diagram illustrating the configurations of a digital camera and the management server.

FIG. 25 is an explanatory diagram illustrating the configurations of the digital camera 300 and the management server 120. Hereinafter, the configurations of the digital camera 300 or the management server 120 will be described with reference to FIG. 25.

As shown in FIG. 25, the digital camera 300 includes an application recommendation module 310, a photographed image retaining unit 320, and a camera communication module 330. The management server 120 includes an application retaining unit 141, an application execution module 142, a sample information retaining unit 143, a suitable sample extraction module 144, a sample information control module 145, and a server communication module 146.

The application recommendation module 310 introduces an application suitable for a situation to the user of the digital camera 300. The introduced application is embedded in the digital camera 300 or is selected among the applications managed by the management server 120. As shown in FIG. 25, the application recommendation module 310 includes a camera application recommendation user interface (UI) unit 311, an application recommendation control module 312, a reduced image generation module 313, and an application recommendation I/O module 314.

The camera application recommendation user interface unit 311 is an interface receiving various operations from the user of the digital camera 300. For example, when the user of the digital camera 300 selects a photographed image with an operation button (not shown) or the like, the camera application recommendation user interface unit 311 notifies the application recommendation control module 312 of information regarding the selected image.

The application recommendation control module 312 controls the operation of the application recommendation module 310 and the operation of the application executed in cooperation with the application recommendation module 310. The reduced image generation module 313 generates a reduced image by reducing an image photographed and stored in the digital camera 300 to a predetermined size. The application recommendation I/O module 314 interfaces input and output with an application executed in cooperation with the application recommendation module 310 and the application recommendation module 310.

The photographed image retaining unit 320 stores an image photographed by the digital camera 300. For example, various kinds of flash memories or record media may be used. The camera communication module 330 communicates between the digital camera 300 and the management server 120. For example, the camera communication module 330 transmits the image selected by the user of the digital camera 300 and receives the image subjected to various kinds of processing on the image transmitted from the digital camera 300 from the management server 120.

The application retaining unit 141 stores an application to be executed by the application execution module 142. In the example shown in FIG. 25, the application retaining unit 141 storing an application is included in the management server 120, but the invention is, of course, not limited to this example.

The application execution module 142 reads and executes the application stored by the application retaining unit 141, as necessary. The sample information retaining unit 143 stores information regarding the sample data for using the application stored in the application retaining unit 141. Examples of the information regarding the sample data include input/output information for generating samples, the order in which the samples are generated, and information for the application generating the sample. The sample information retaining unit 143 may store these kinds of information in the format of the metadata shown in FIG. 6.

The suitable sample extraction module 144 extracts the sample data suitable for the information received by notification from the sample information control module 145 among the sample data stored by the sample information retaining unit 143. In the example shown in FIG. 25, examples of the information sent by notification from the sample information control module 145 to the suitable sample extraction module 144 include information regarding the image photographed by the digital camera 300, the model of the photographic apparatus, and a photographing time.

The sample information control module 145 executes various processes to generate the sample data and also control the operation of the application execution module 142 or the suitable sample extraction module 144. The server communication module 146 communicates between the management server 120 and the digital camera 300.

The configurations of the digital camera 300 and the management server 120 have hitherto been described with reference to FIG. 25. Next, the process of introducing the samples on the screen using the digital camera 300 and the management server 120 shown in FIG. 25 will be described.

Figure 26:
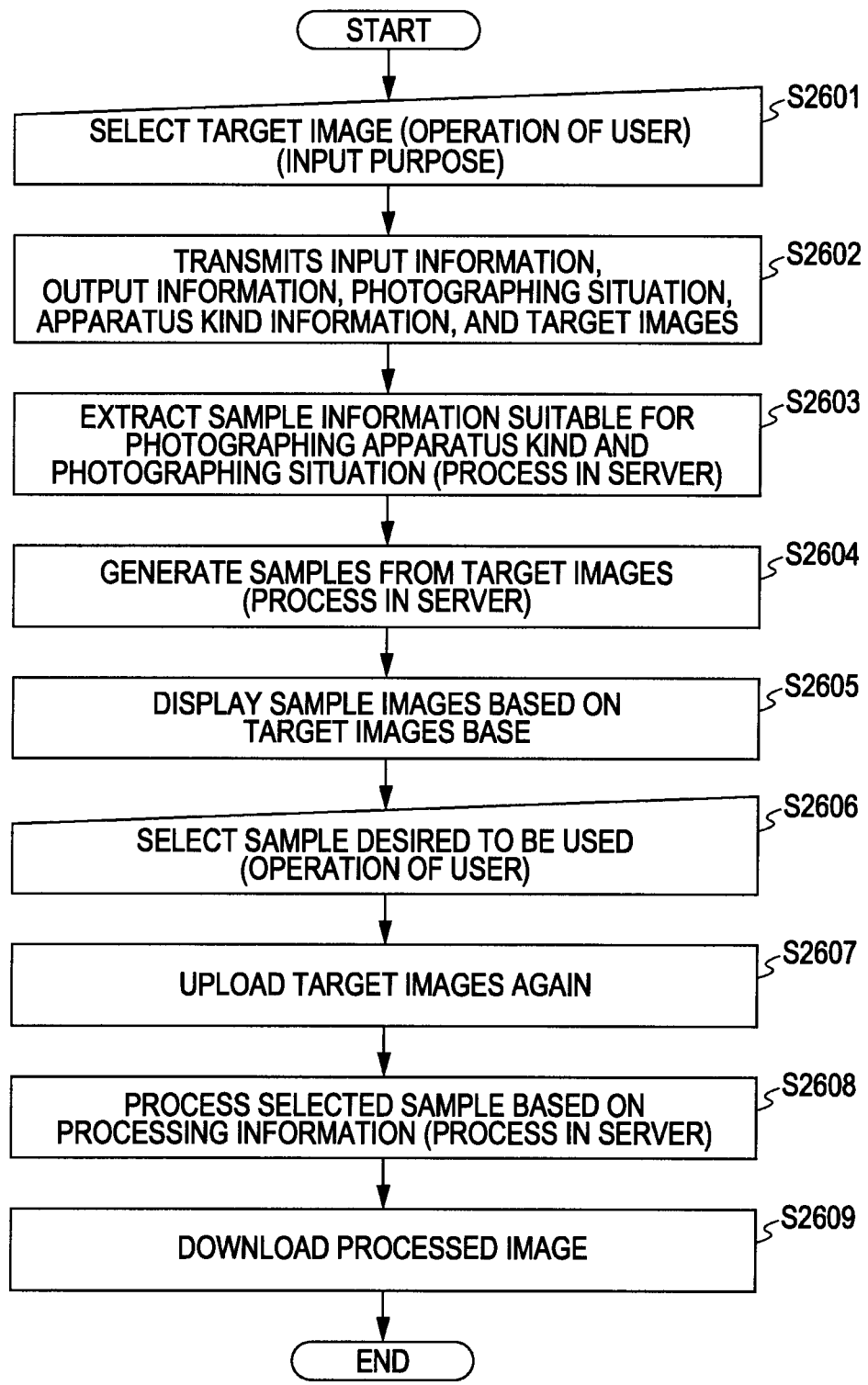
FIG. 26 is a flowchart illustrating a process of introducing samples on a screen and an application execution process.

FIG. 26 is a flowchart illustrating the process of introducing the samples on the screen and an application execution process. In FIG. 26, the process of introducing the samples to the digital camera 300 and the application execution process using the digital camera 300 and the management server 120 shown in FIG. 25 are shown. Hereinafter, the process of introducing the samples on the screen and the application execution process will be described with reference to FIG. 26.

First, the user of the digital camera 300 selects a photographed image to be edited among the photographed images recorded in the photographed image retaining unit 320 of the digital camera 300 (step S2601). Information regarding the selected photographed image is detected by the camera application recommendation user interface unit 311 and is transmitted from the camera application recommendation user interface unit 311 to the application recommendation control module 312.

When the photographed image is selected by the user of the digital camera 300, the application recommendation control module 312 transmits photographing information (for example, information regarding environments, such as a photographing time or a photographing location, at the photographing time) regarding the selected photographed image or information regarding the photographic apparatus model to the application recommendation I/O module 314, and also transmits the information regarding the selected photographed image to the reduced image generation module 313. The reduced image generation module 313 acquires the image data from the photographed image retaining unit 320 based on the information of the photographed image selected in step S2601, reduces the size of the photographed image to a predetermined size, and transmits the image data subjected to the reducing process to the application recommendation I/O module 314.

The application recommendation I/O module 314 transmits the photographing information transmitted from the application recommendation control module 312 or the image data reduced by the reduced image generation module 313 to the management server 120 via the camera communication module 330 (step S2602).

The management server 120 receiving the photographing information or the image data from the digital camera 300 transmits the received photographing information from the sample information control module 145 to the suitable sample extraction module 144. Based on the received photographing information, the suitable sample extraction module 144 extracts at least one of sample information suitable for the model or photographing situation of the digital camera 300 from the sample information retaining unit 143 (step S2603).

When the suitable sample extraction module 144 extracts the sample information suitable for the model or photographing situation of the digital camera 300 from the sample information retaining unit 143, the suitable sample extraction module 144 transmits the extracted sample information to the sample information control module 145. The sample information control module 145 receiving the sample information transmits the image data transmitted from the digital camera 300 and information of the used application described in the extracted sample information to the application execution module 142. The application execution module 142 reads an application from the application retaining unit 141 (or another server in which the application is embedded) based on the information on the application transmitted from the sample information control module 145 and generates the sample images based on the sample information (step S2604).

The application execution module 142 transmits the generated sample images to the sample information control module 145. The sample information control module 145 transmits the sample images generated by the application execution module 142 to the digital camera 300 via the server communication module 146. The digital camera 300 receiving the sample images from the management server 120 via the camera communication module 330 displays the sample images generated by the management server 120 on a screen (not shown) through the application recommendation I/O module 313, the application recommendation control module 312, and the camera application recommendation user interface unit 311 (step S2605).

When the sample images generated by the management server 120 are displayed on the screen of the digital camera 300, the user of the digital camera 300 can select a sample image which the user desires to use from among the displayed sample images (step S2606). When the camera application recommendation user interface unit 311 detects the fact that the user of the digital camera 300 has selected one sample image from among the sample images displayed on the screen, the camera application recommendation user interface unit 311 acquires the image data selected in step S2601 again from the photographed image retaining unit 320 and uploads the acquired image data and the information regarding the sample image selected in step S2606 to the management server 120 (step S2607).

The management server 120 receiving the information regarding the sample image selected by the user and the image data selected by the user from the digital camera 300 processes the image data transmitted from the digital camera 300 based on the processing information of the sample image selected in the digital camera 300 (step S2608). Specifically, the sample information control module 145 receives the image data received by the server communication module 146 and the information regarding the sample image, and the sample information control module 145 instructs the application execution module 142 to process the image data. The application execution module 142 reads the application from the application retaining unit 141 (or another server in which the application is embedded) based on the information of the application transmitted from the sample information control module 145, and processes the image data.

When the application execution module 142 completes the processing, the image data subjected to the processing stay downloadable to the digital camera 300. The digital camera 300 downloads the image data subjected to the processing from the management server 120 (step S2609). The image data downloaded to the digital camera 300 are displayed on the screen by the camera application recommendation user interface unit 311. The image data downloaded to the digital camera 300 may be stored in the photographed information retaining unit 320 by the application recommendation control module 312.

The sample introducing process and the application executing process performed by the digital camera 300 and the management server 120 have hitherto been described with reference to FIG. 26.

Figure 27:
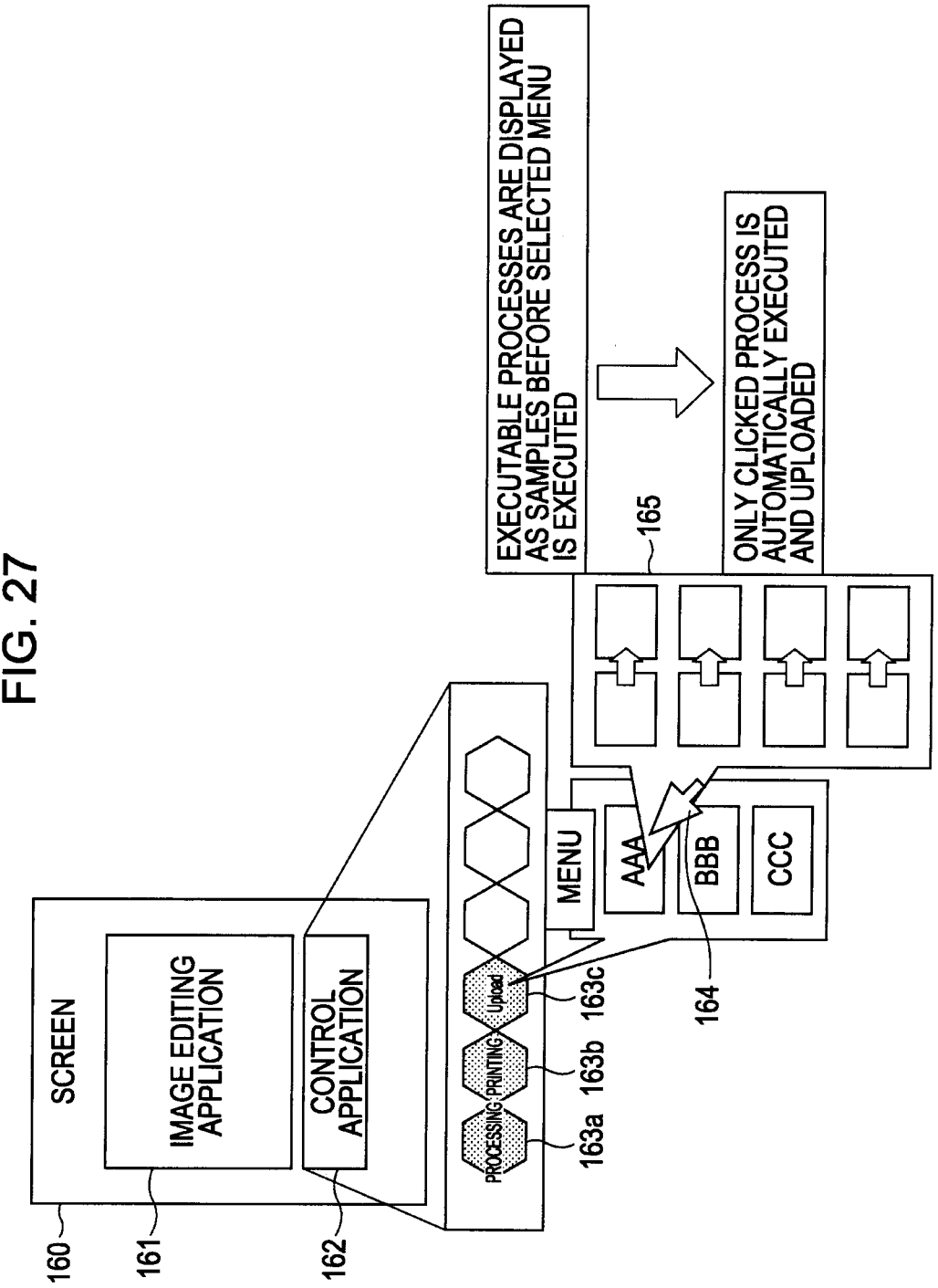
FIG. 27 is an explanatory diagram illustrating an applied example of the function recommending process and the sample introducing process.

Next, an applied example of the function recommending process and the sample introducing process described above will be described. FIG. 27 is an explanatory diagram illustrating an applied example of the function recommending process and the sample introducing process.

In the example shown in FIG. 27, when the user of the information processing apparatus 100 selects an existing function from among the functions introduced on the screen 160 by the control application 162, executable processes before execution of the function are displayed along with the samples. In the example shown in FIG. 27, when the user of the information processing apparatus 100 selects the "Upload" from among the functions introduced on the screen 160 by the control application 162 in order to execute a process of uploading images to a predetermined server, samples of the executable processes (for example, various processes on the image to be uploaded) before the process of uploading the images is executed are displayed. When the user of the information processing apparatus 100 selects the displayed sample, the information processing apparatus 100 or the management server 120 processes the image to be uploaded, in a process similar to the process performed on the selected sample. When the image processing is completed, the processed image is uploaded to the predetermined server.

When the user of the information processing apparatus 100 selects a function, for example, the information processing apparatus 100 or the management server 120 may store a log in every process and use the log in order to extract the executable processes before the execution of the function. For example, by extracting the processes highly likely to be executed after execution of a process from the log, the executable processes can be picked out before the execution of the function when the user of the information processing apparatus 100 selects a function.

When the user of the information processing apparatus 100 selects a function from among the functions introduced on the screen 160, it is possible to obtain the advantage that the user of the information processing apparatus 100 can recognize the executable functions along with a function by introducing the executable processes before the execution of the function together with the samples.

Figure 28:
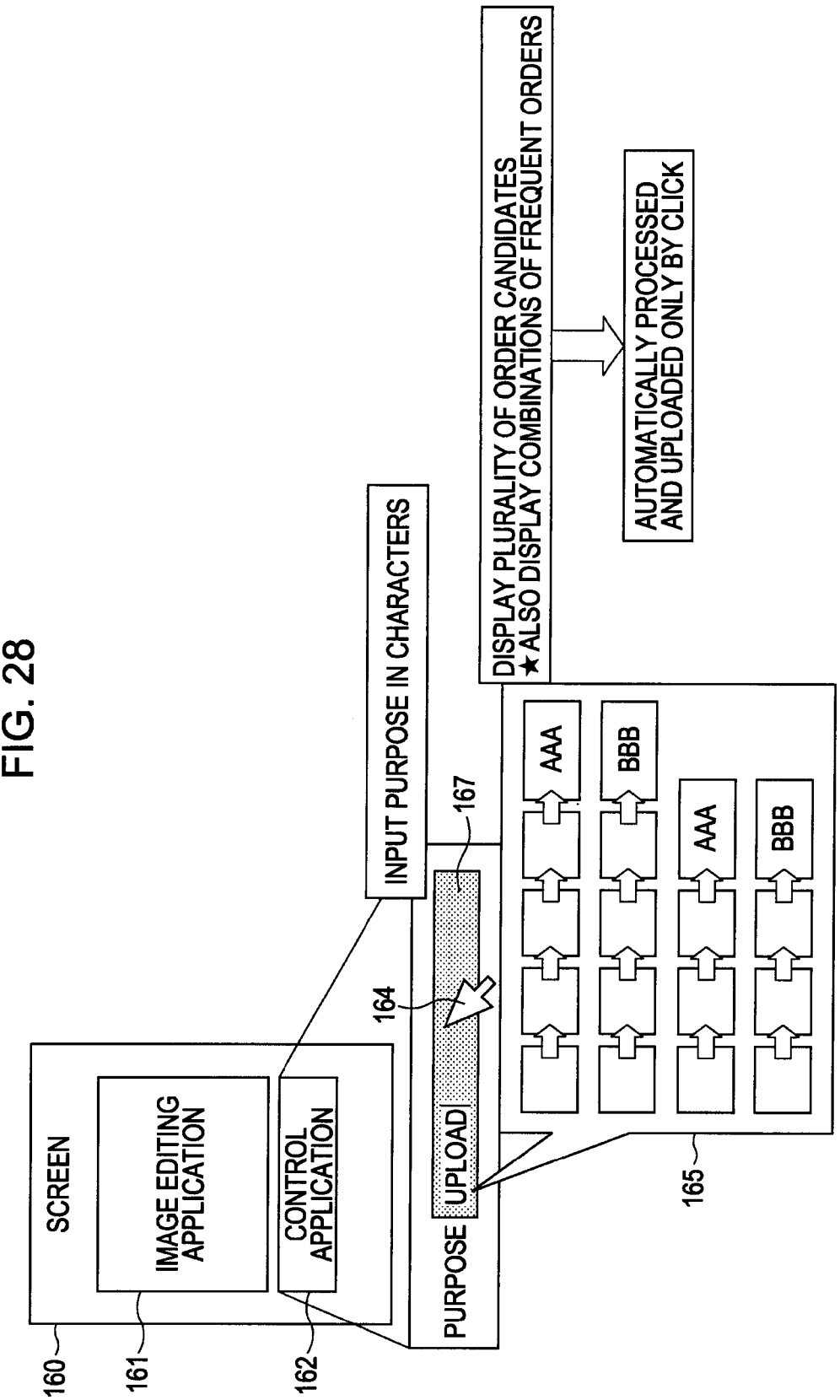
FIG. 28 is an explanatory diagram illustrating another applied example of the function recommending process and the sample introducing process.

FIG. 28 is an explanatory diagram illustrating another applied example of the function recommending process and the sample introducing process.

In the example shown in FIG. 28, when a text box 167 is displayed on the screen 160 by the control application 162, details desired to be processed are input by the user of the information processing apparatus 100.

When the user of the information processing apparatus 100 inputs "upload" into the text box 167, the control application 162 recognizes the processing purpose of the user of the information processing apparatus 100 by analyzing the characters input into the text box 167. The control application 162 recognizing the processing purpose of the user of the information processing apparatus 100 extracts application operation samples matched with the processing purpose from the information processing apparatus 100 or the management server 120 and displays the application operation samples and a processing order matched with the processing purpose of the user of the information processing apparatus 100 on the screen 160. In the example shown in FIG. 28, the control application 162 extracts the application operation samples in quadruplicate when the image data are uploaded to the predetermined server. When the user of the information processing apparatus 100 selects the sample data displayed on the screen 160 by the control application 162, the control application 162 collectively executes the processes from the process of processing the images to the process of uploading the processed image data to the server.

By linking and displaying the input and output of the plurality of application operation samples, the advantage can be obtained that the user of the information processing apparatus 100 can grasp the process being executed midway through execution.

Figure 29:
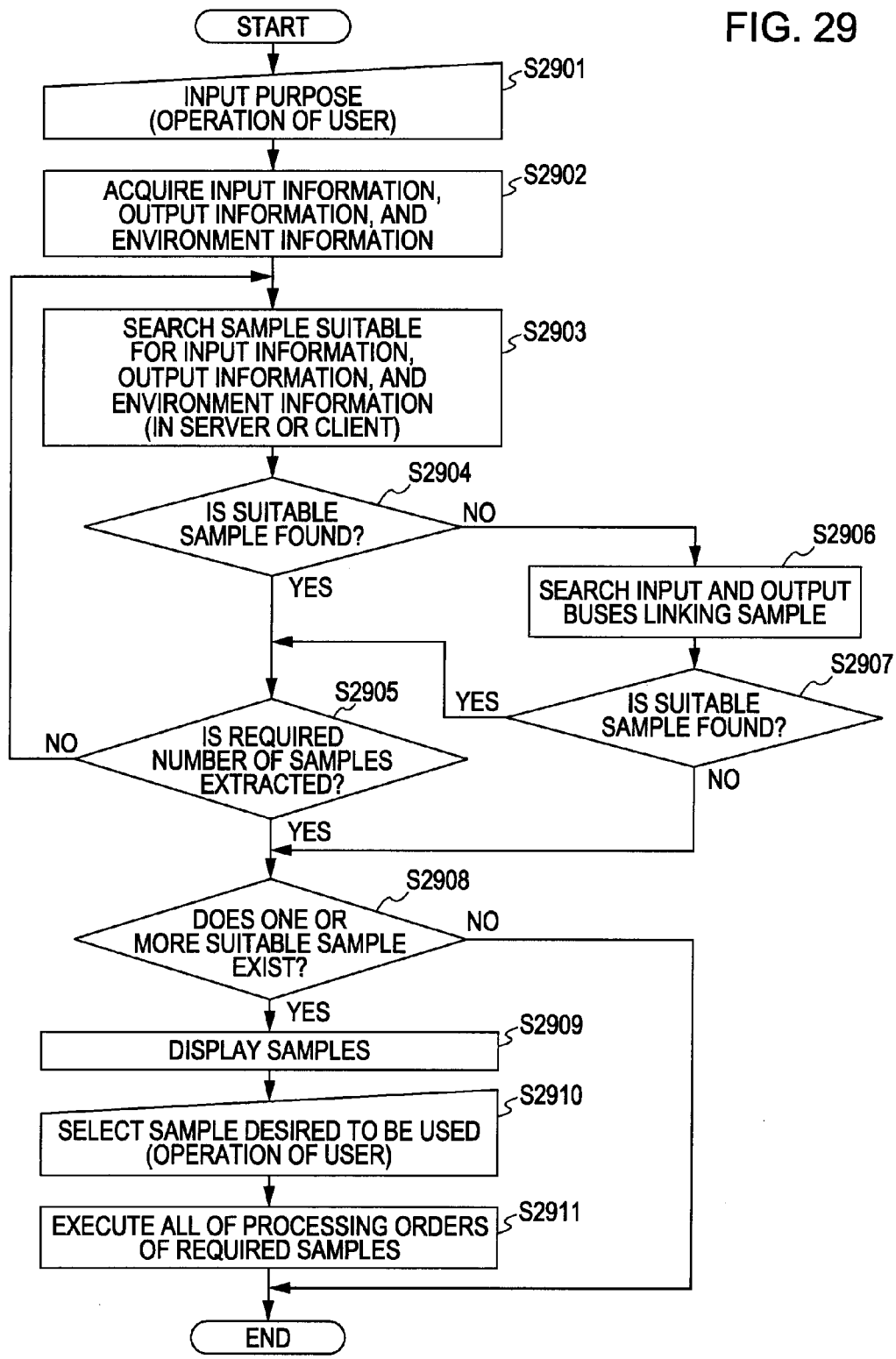
FIG. 29 is a flowchart illustrating the sample displaying process shown in FIG. 28.

FIG. 29 is a flowchart illustrating the sample displaying process shown in FIG. 28. Hereinafter, the sample displaying process of displaying the samples by linking the input and output of the plurality of application operation samples shown in FIG. 28 will be described with reference to FIG. 29.

When the control application 162 displays the text box 167 on the screen 160 of the information processing apparatus 100, characters can be input from the user of the information processing apparatus 100. In this state, when the user of the information processing apparatus 100 inputs the processing purpose into the text box 167 (step S2901), the control application 162 analyzes the processing purpose of the user input into the text box 167 and acquires the input information and the output information matched with the processing purpose of the user and the environment information of the information processing apparatus 100 (step S2902). The information acquired by the control application 162 or the information of the processing purpose input into the text box 167 by the user may be transmitted to the management server 120.

The control application 162 or the management server 120 receiving the respective information acquired by the control application 162 starts searching for the sample data suitable for the respective information (step S2903). For example, the sample information control module 145 shown in FIG. 25 may search for the sample data in the management server 120. In the following description, the sample information control module 145 extracts the sample data, but the control application 162 of the information processing apparatus 100 may, of course, extract the sample data. The sample information control module 145 determines the result of the searching in step S2903, that is, whether there is a sample suitable for the processing purpose of the user, the input information and the output information, or the like (step S2904).

When the sample information control module 145 determines that there is a sample suitable for the processing purpose of the user, the input information and the output information, or the like, the sample information control module 145 determines whether the necessary number of samples to be displayed in the information processing apparatus 100 is extracted (step S2905). Alternatively, when the sample information control module 145 determines that there is no sample suitable for the processing purpose of the user, the input information and the output information, or the like, the sample information control module 145 searches to find whether there is an input and output pass suitable for the processing purpose of the user, the input information and the output information, or the like by linking the plurality of samples (step S2906). Then, the sample information control module 145 determines whether there is a suitable input and output pass (step S2907). When there is a suitable input and output pass, the process proceeds to step S2905 and the sample information control module 145 determines whether the necessary number of samples to be displayed in the information processing apparatus 100 is extracted. Alternatively, when there is no suitable input and output pass, the sample information control module 145 determines whether there are one or more suitable samples (step S2908). When there are one or more suitable samples, the process proceeds to step S2909 described below. Alternatively, when there is no suitable sample, the process ends.

Figure 30:
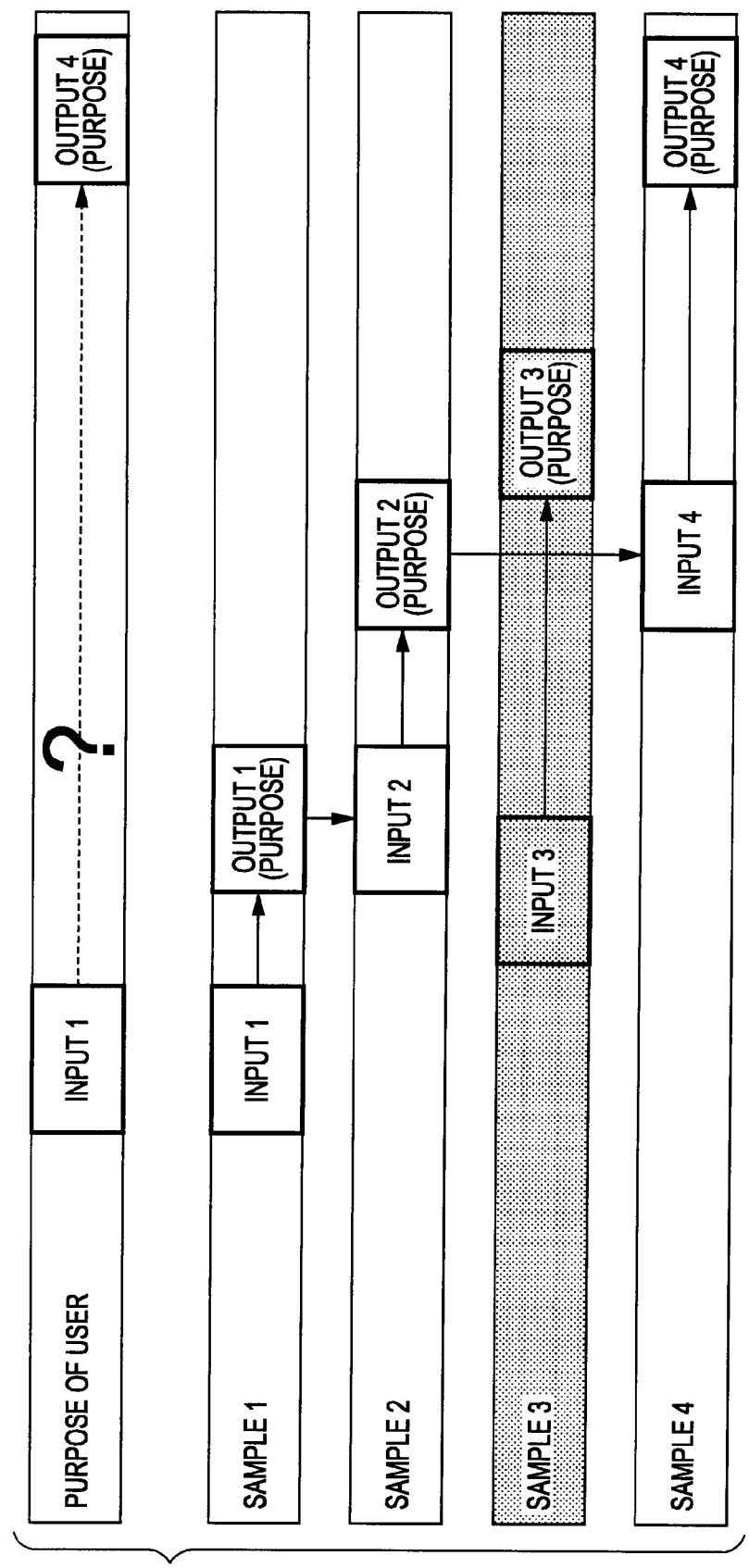
FIG. 30 is an explanatory diagram illustrating an overview of a process of searching for the input and output passes suitable for the processing purpose of the user of the information processing apparatus, the input information and the output information, or the like by linking the plurality of samples.

FIG. 30 is an explanatory diagram illustrating the overview of the process of searching for the input and output passes suitable for the processing purpose of the user of the information processing apparatus 100, the input information and the output information, or the like by linking the plurality of samples. In FIG. 30, the input and output passes suitable for the processing purpose of the user of the information processing apparatus 100, the input information and the output information, or the like, are searched for by linking the plurality of samples of four samples from Sample 1 to Sample 4.

The input and output suitable for the processing purpose of the user of the information processing apparatus 100, the input information and the output information, or the like are performed by inputting "Input 1" and outputting "Output 4". However, since there is no process of inputting "Input 1" and outputting "Output 4" among Sample 1 to Sample 4, the sample information control module 145 may not extract the sample in this way.

The sample information control module 145 finds whether there are input and output passes suitable for the processing purpose of the user of the information processing apparatus 100, the input information and the output information, or the like from the four samples from Sample 1 to Sample 4. In the example shown in FIG. 30, when linking Sample 1→Sample 2→Sample 4, a pass obtained by inputting "Input 1" and outputting "Output 4" is completed. Accordingly, the sample information control module 145 can extract the pass obtained through the linking of Sample 1→Sample 2→Sample 4 as the input and output pass suitable for the processing purpose of the user of the information processing apparatus 100, the input information and the output information, or the like.

When the necessary number of samples to be displayed in the information processing apparatus 100 is not extracted as the determination result of step S2905, the process returns to step S2903 and the sample information control module 145 continues searching for the suitable sample data. Alternatively, when the necessary number of samples to be displayed in the information processing apparatus 100 is completely extracted as the determination result of step S2905, the extracted samples are downloaded to the information processing apparatus 100 and the downloaded samples are displayed on the screen 160 of the information processing apparatus 100 by the control application 162 (step S2909).

When the samples downloaded from the management server 120 are displayed on the screen 160, the user of the information processing apparatus 100 selects the displayed sample so that the information processing apparatus 100 (the management server 120, or the like) follows the same processing order as that of the sample. When the user of the information processing apparatus 100 selects the sample displayed on the screen 160 (step S2910), the control application 162 detects the selected sample and follows the same processing order as that of the sample selected by the user (step S2911).

The control application 162 can recommend the applications while introducing the processing order of the data to the user of the information processing apparatus 100 by extracting the samples when there are samples suitable for the processing purpose of the user of the information processing apparatus 100, the input information and the output information, or the like or extracting the samples, in which the input and output are linked, when there is no suitable sample.

Figure 31:
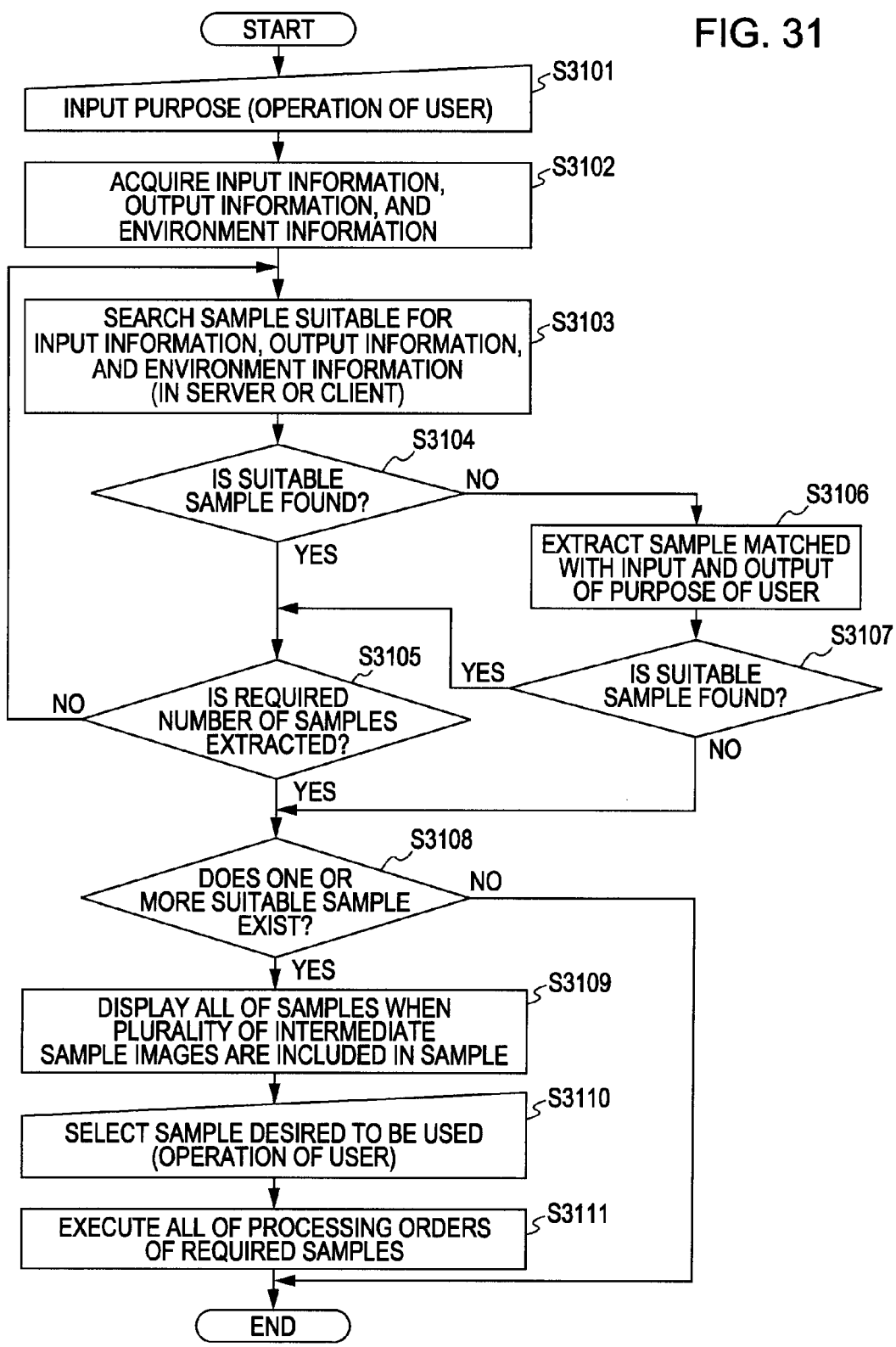
FIG. 31 is a flowchart illustrating a process of displaying the samples when intermediate samples are introduced on the screen.

When there are intermediate samples (intermediate products) in the case where the samples suitable for the processing purpose of the user of the information processing apparatus 100, the input information and the output information, or the like are generated by a plurality of processes, the control application 162 may also display the intermediate samples on the screen 160. FIG. 31 is a flowchart illustrating a process of displaying the samples when the intermediate samples are introduced on the screen 160.

When the control application 162 displays the text box 167 on the screen 160 of the information processing apparatus 100, characters can be input from the user of the information processing apparatus 100. In this state, when the user of the information processing apparatus 100 inputs the processing purpose into the text box 167 (step S3101), the control application 162 analyzes the processing purpose of the user input into the text box 167 and acquires the input information and the output information matched with the processing purpose of the user and the environment information of the information processing apparatus 100 (step S3102). The information acquired by the control application 162 or the information of the processing purpose input into the text box 167 by the user may be transmitted to the management server 120.

The control application 162 or the management server 120 receiving the respective information acquired by the control application 162 starts searching for the sample data suitable for the respective information (step S3103). For example, the sample information control module 145 shown in FIG. 25 may search for the sample data in the management server 120.

In the following description, the sample information control module 145 extracts the sample data, but the control application 162 of the information processing apparatus 100 may, of course, extract the sample data. The sample information control module 145 determines the result of the searching in step S3103, that is, whether there is a sample suitable for the processing purpose of the user, the input information and the output information, or the like (step S3104).

When the sample information control module 145 determines that there is a sample suitable for the processing purpose of the user, the input information and the output information, or the like, the sample information control module 145 determines whether the necessary number of samples to be displayed in the information processing apparatus 100 is extracted (step S3105). Alternatively, when the sample information control module 145 determines that there is no sample suitable for the processing purpose of the user, the input information and the output information, or the like, the sample information control module 145 searches to find whether there is an input and output pass suitable for the processing purpose of the user, the input information and the output information, or the like by linking the plurality of samples (step S3106). Then, the sample information control module 145 determines whether there are a suitable input and output pass (step S3107). When there is a suitable input and output pass, the process proceeds to step S3105 and the sample information control module 145 determines whether the necessary number of samples to be displayed in the information processing apparatus 100 is extracted. Alternatively, when there is no suitable input and output pass, the sample information control module 145 determines whether there are one or more suitable samples (step S3108). When there are one or more suitable samples, the process proceeds to step S3109 described below. Alternatively, when there is no suitable sample, the process ends.

When the necessary number of samples to be displayed in the information processing apparatus 100 is not extracted as the determination result of step S3105, the process returns to step S3103 and the sample information control module 145 continues searching for the suitable sample data. Alternatively, when the necessary number of samples to be displayed in the information processing apparatus 100 is completely extracted as the determination result of step S3105, the extracted samples are downloaded to the information processing apparatus 100 and the downloaded samples are displayed on the screen 160 of the information processing apparatus 100 by the control application 162 (step S3109). When the intermediate samples are included in the downloaded samples, the control application 162 also displays the intermediate samples on the screen 160. When the samples downloaded from the management server 120 are displayed on the screen 160, the user of the information processing apparatus 100 selects the displayed sample so that the information processing apparatus 100 (the management server 120, or the like) follows the same processing order as that of the sample. When the user of the information processing apparatus 100 selects the sample displayed on the screen 160 (step S3110), the control application 162 detects the selected sample and follows the same processing order as that of the sample selected by the user (step S3111).

Figure 32:
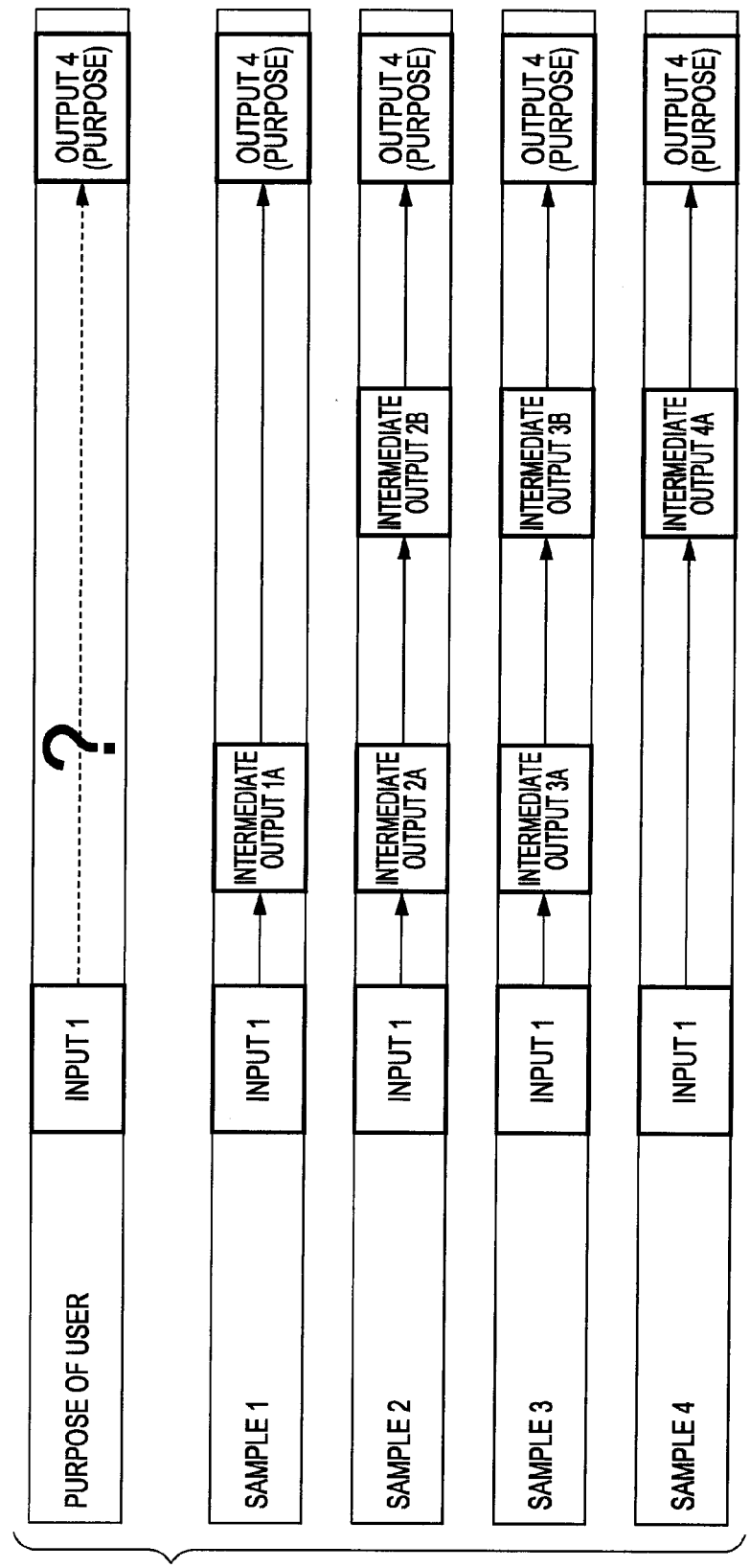
FIG. 32 is an explanatory diagram illustrating an example of the sample data including the intermediate samples.

FIG. 32 is an explanatory diagram illustrating an example of the sample data including the intermediate samples. In FIG. 32, input and output suitable for the processing purpose of the user of the information processing apparatus 100, the input information and the output information, or the like, and input and output of Sample 1 to Sample 4 are shown.

The input and output suitable for the processing purpose of the user of the information processing apparatus 100, the input information and the output information, or the like are performed by inputting "Input 1" and outputting "Output 4". In all of Sample 1 to Sample 4 shown in FIG. 32, "Input 1" is input and "Output 4" is output. Sample 1 to Sample 4 are all suitable for the processing purpose of the user of the information processing apparatus 100, the input information and the output information, or the like.

As shown in FIG. 32, Sample 1 outputs "Intermediate Output 1A" as an intermediate sample. Sample 2 outputs "Intermediate Output 2A" and "Intermediate Output 2B" as intermediate samples. Sample 3 outputs "Intermediate Output 3A" and "Intermediate Output 3B" as intermediate samples. Sample 4 outputs "Intermediate Output 4A" as an intermediate sample.

The control application 162 also downloads these intermediate samples from the management server 120 and also displays the downloaded intermediate samples on the screen 160. Since the control application 162 displays not only the sample data before and after the process but also downloads the intermediate samples from the management server 120 and displays the intermediate samples on the screen 160, the advantage can be obtained that the user of the information processing apparatus 100 can grasp the process being executed.

Figure 33:
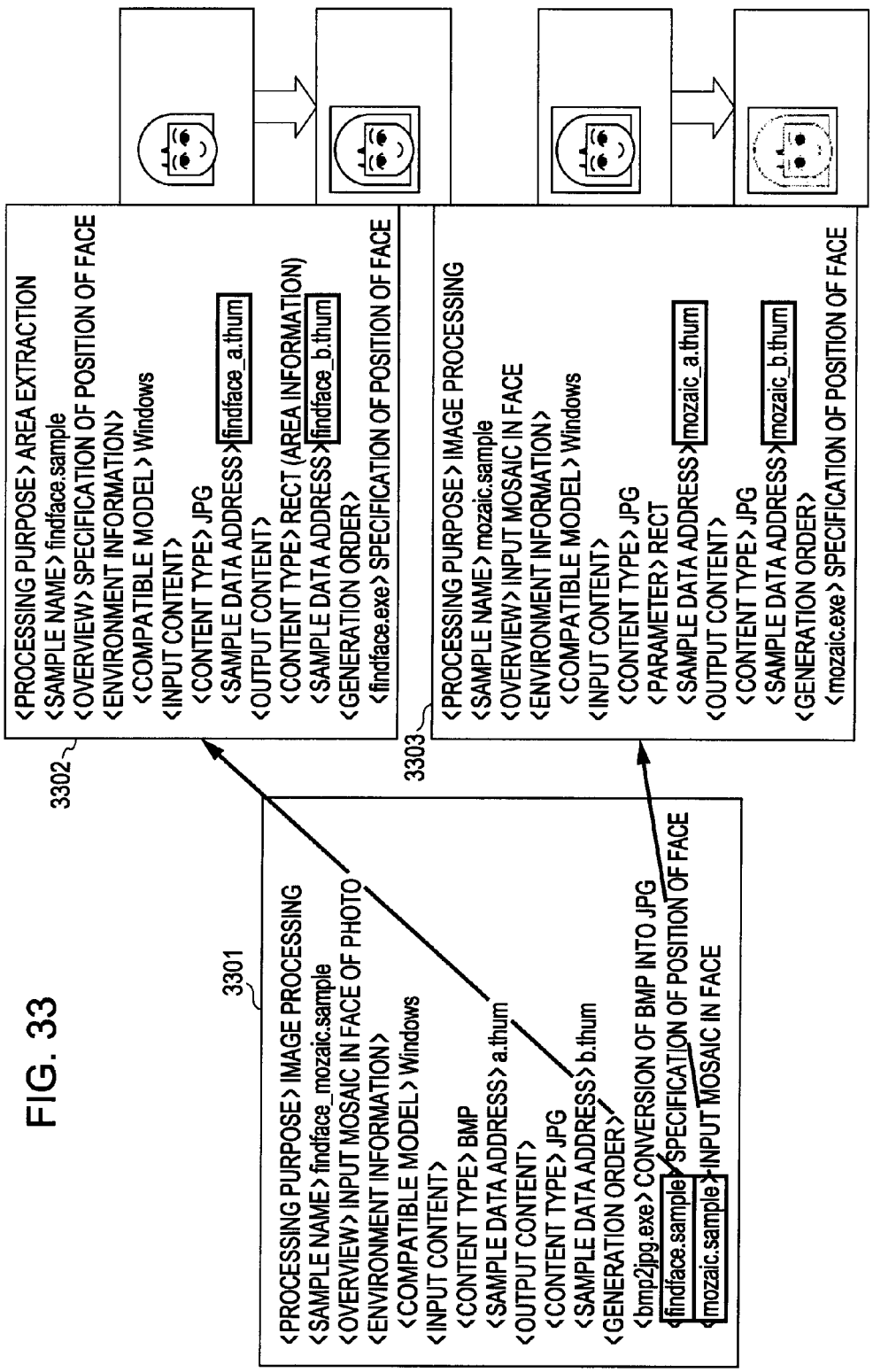
FIG. 33 is an explanatory diagram illustrating an example of the data structure of an environment and processing information file to be used when the control application displays the intermediate samples on the screen.

FIG. 33 is an explanatory diagram illustrating an example of the data structure of an environment and processing information file to be used when the control application 162 displays the intermediate samples on the screen 160.

As described above, the environment and processing information file describes the information (the title of the application or the file name of the application) regarding the application in the sample generation order. Therefore, by executing the application described in the environment and processing information file, the samples can be processed without change. Instead of the information regarding the application, information regarding the samples may be described in the environment and processing information file in order to allow treatment of the samples as one application.

In FIG. 33, an environment and processing information file 3301 describing the information regarding the sample to be subjected to image processing is shown. The environment and processing information file 3301 describes processing order of the samples where mosaic is inserted into a face in a photo. In the example shown in FIG. 33, the environment and processing information file 3301 describes a sample where the position of a face is specified and a sample where an image is subjected to a mosaic process in a "<generation order>" tag.

In FIG. 33, an environment and processing information file 3302 describing information on the sample to specify the position of the face is shown, and an environment and processing information file 3303 describing information on the sample to subject the image to the mosaic process is shown. The environment and processing information file 3301 can be linked to the environment and processing information files 3302 and 3303 by sample name (information described in "<sample name>" tags of the environment and processing information files 3302 and 3302).

When the control application 162 displays the intermediate samples on the screen 160, the control application 162 acquires the sample data from the addresses of the sample data described in the environment and processing information files 3302 and 3303 and displays the acquired sample data on the screen 160. Accordingly, by downloading the intermediate samples from the management server 120 and displaying the downloaded intermediate samples on the screen 160, it is possible to obtain the advantage that the user of the information processing apparatus 100 can grasp a process being executed.

The example in which the control application 162 displays the applications and the sample data on the screen 160 when the control application 162 displays the text box 167 on the screen 160 and the user of the information processing apparatus 100 inputs the processing details into the text box 167 has hitherto been described. Next, an applied example in which when the user of the information processing apparatus 100 inputs processing details into the text box 167, the control application 162 displays applications and sample data on the screen 160 will be described.

Figure 34:
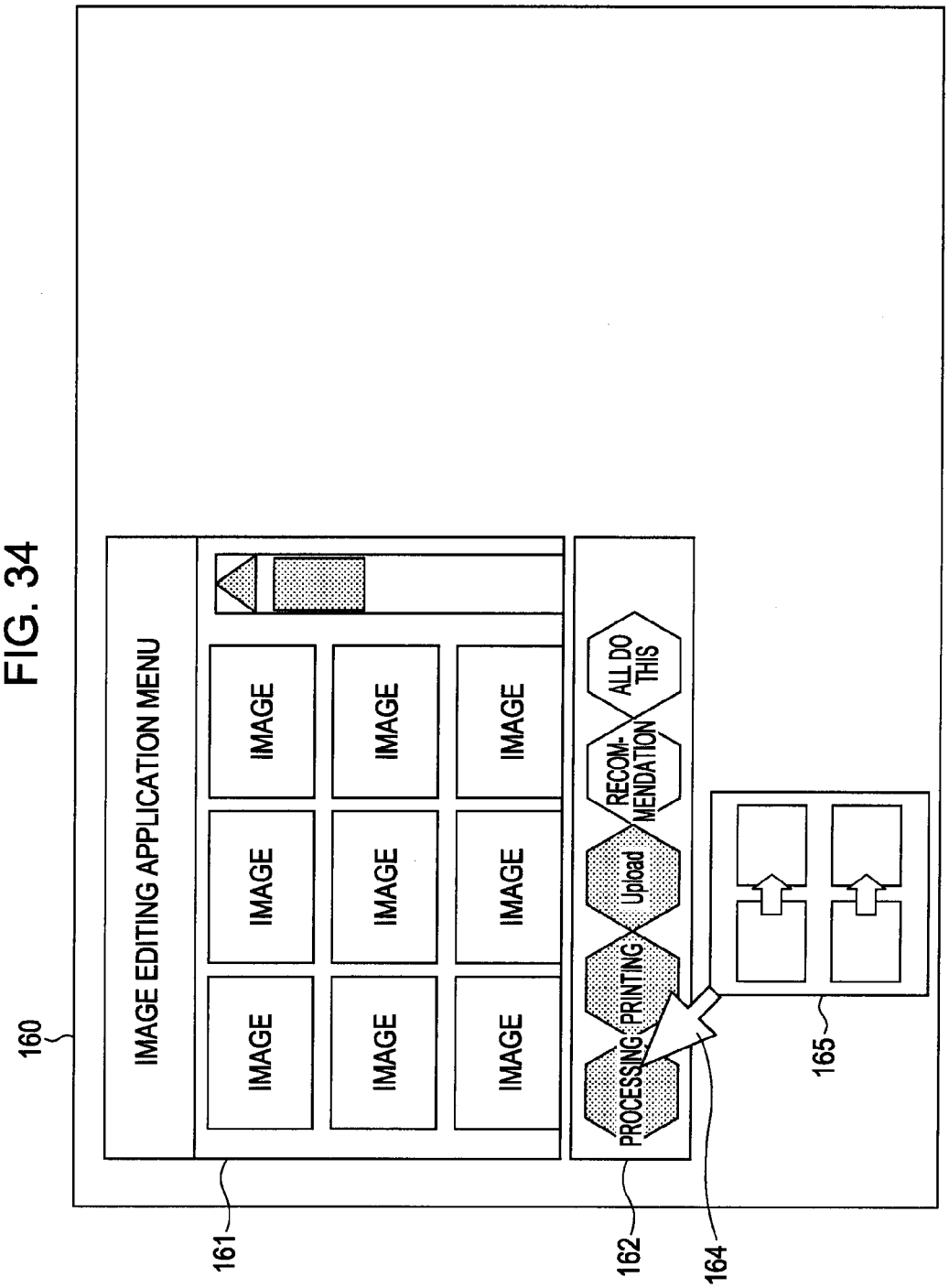
FIG. 34 is an explanatory diagram illustrating a display example when the control application displays the applications and the sample data on the screen.

FIG. 34 is an explanatory diagram illustrating a display example when the control application 162 displays the applications and the sample data on the screen 160. When the user of the information processing apparatus 100 selects one function from among the functions displayed on the screen 160 by the control application 162, the control application 162 displays a sample display area 165 and displays the sample data.

Figure 35:
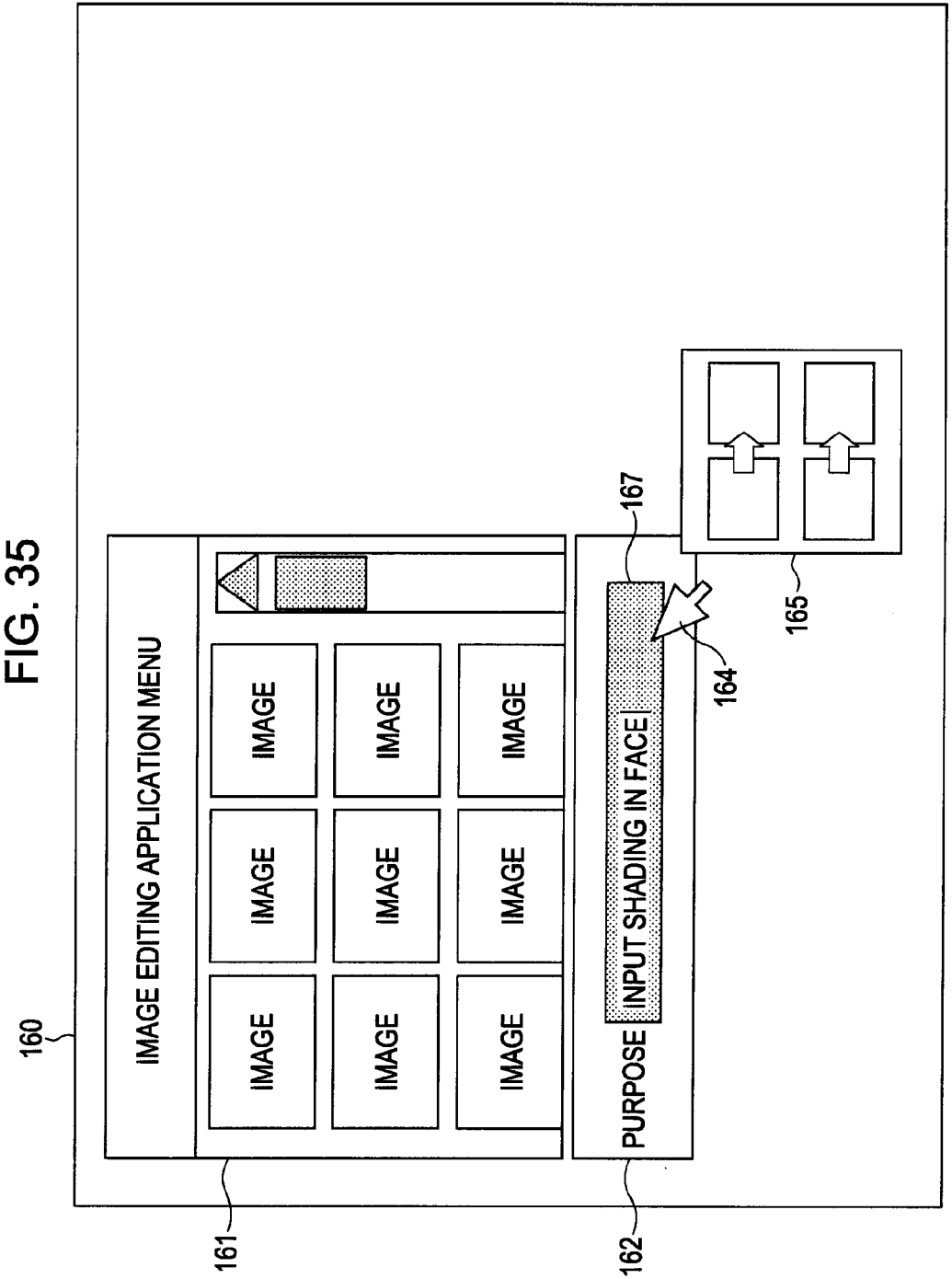
FIG. 35 is an explanatory diagram illustrating another display example when the control application displays the applications and the sample data on the screen.

On the other hand, FIG. 35 is an explanatory diagram illustrating another display example when the control application 162 displays the applications and the sample data on the screen 160. In the example shown in FIG. 35, the control application 162 displays the text box 167 on the screen 160, and the control application 162 displays the sample display area 165 based on the details input into the text box 167 by the user of the information processing apparatus 100 to display the sample data. In FIG. 35, the control application 162 analyzes a sentence "input shading in a face" input into the text box 167, extracts a process of inputting shading in the face, and displays the process as the sample data in the sample display area 165. By analyzing the sentence input into the text box 167 and extracting the applications and the sample data matched with the details input into the text box 167 by the user of the information processing apparatus 100 by the control application 162, the process which the user of the information processing apparatus 100 desires can be introduced to the user.

Figure 36:
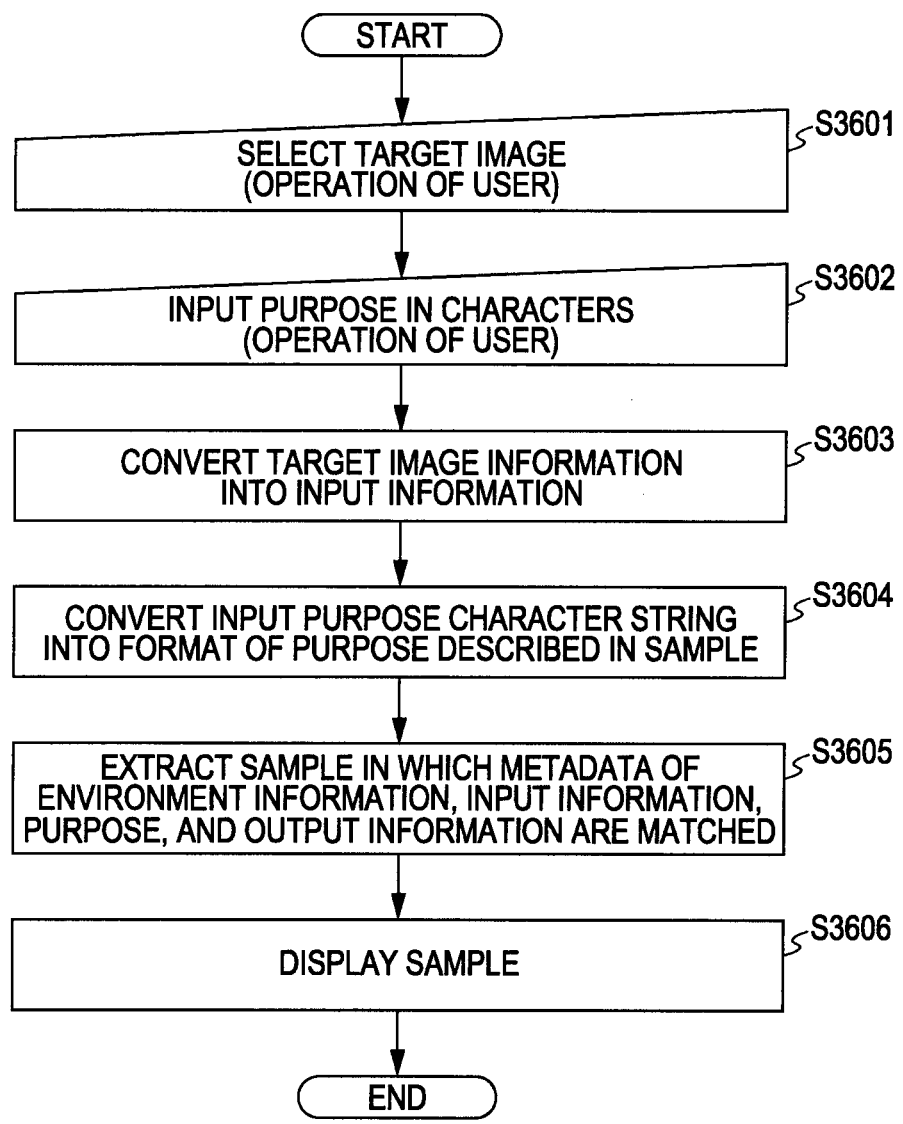
FIG. 36 is a flowchart illustrating an exemplary process of extracting the sample data from the details input into the text box by the user of the information processing apparatus by the control application.

FIG. 36 is a flowchart illustrating an exemplary process of extracting the sample data from the details input into the text box 167 by the user of the information processing apparatus 100 by the control application 162. Hereinafter, the exemplary process of extracting the sample data from the details input into the text box 167 by the user of the information processing apparatus 100 by the control application 162 will be described with reference to FIG. 36.

First, the user of the information processing apparatus 100 activates the image editing application 161 in the information processing apparatus 100, and selects an image to be processed from among the images displayed in the image editing application 161 (step S3601). When the user of the information processing apparatus 100 selects the image to be processed, the control application 162 displays the text box 167 on the screen 160. When the user of the information processing apparatus 100 inputs a processing purpose in characters into the text box 167 (step S3602), the control application 162 converts information on the image selected in step S3601 by the user of the information processing apparatus 100 into input information (step S3603), and then converts a purpose character line input into the text box 167 in step S3602 by the user of the information processing apparatus 100 into a format of the purpose written in the sample (step S3604).

The conversion from the purpose character line into the format of the purpose written in the sample in step S3604 may be performed with reference to a dictionary, for example, which is prepared to clear ambiguity of the sentence up, by the control application 162. For example, when the user of the information processing apparatus 100 inputs a character line "input shading in a face", as in FIG. 35, into the text box 167, the control application 162 converts the expression "input shading" into a process (for example, a mosaic process or a process of inputting an eye line) of processing the image data, and extracts the samples stored in the information processing apparatus 100 or the management server 120.

When the conversion from the purpose character line into the format of the purpose written in the sample in step S3604 is completed, the control application 162 extracts the suitable sample based on the environment information, the input information, the output information of the information processing apparatus 100, or the purpose information (step S3605). When the extraction of the suitable sample is completed, the control application 162 displays the sample display area 165 on the screen 160 to displays the extracted samples (step S3606).

The exemplary process of extracting the sample data from the details input into the text box 167 by the user of the information processing apparatus 100 by the control application 162 has hitherto been described with reference to FIG. 36.

When the processes in FIGS. 35 and 36 are applied, the control application 162 may analyze the received syntax associated with the input sentence to introduce the samples linked and matched with the plurality of processes on the screen 160. Hereinafter, an exemplary process of analyzing the input sentence to introduce the samples linked and matched with the plurality of processes on the screen 160 will be described.

Figure 37:
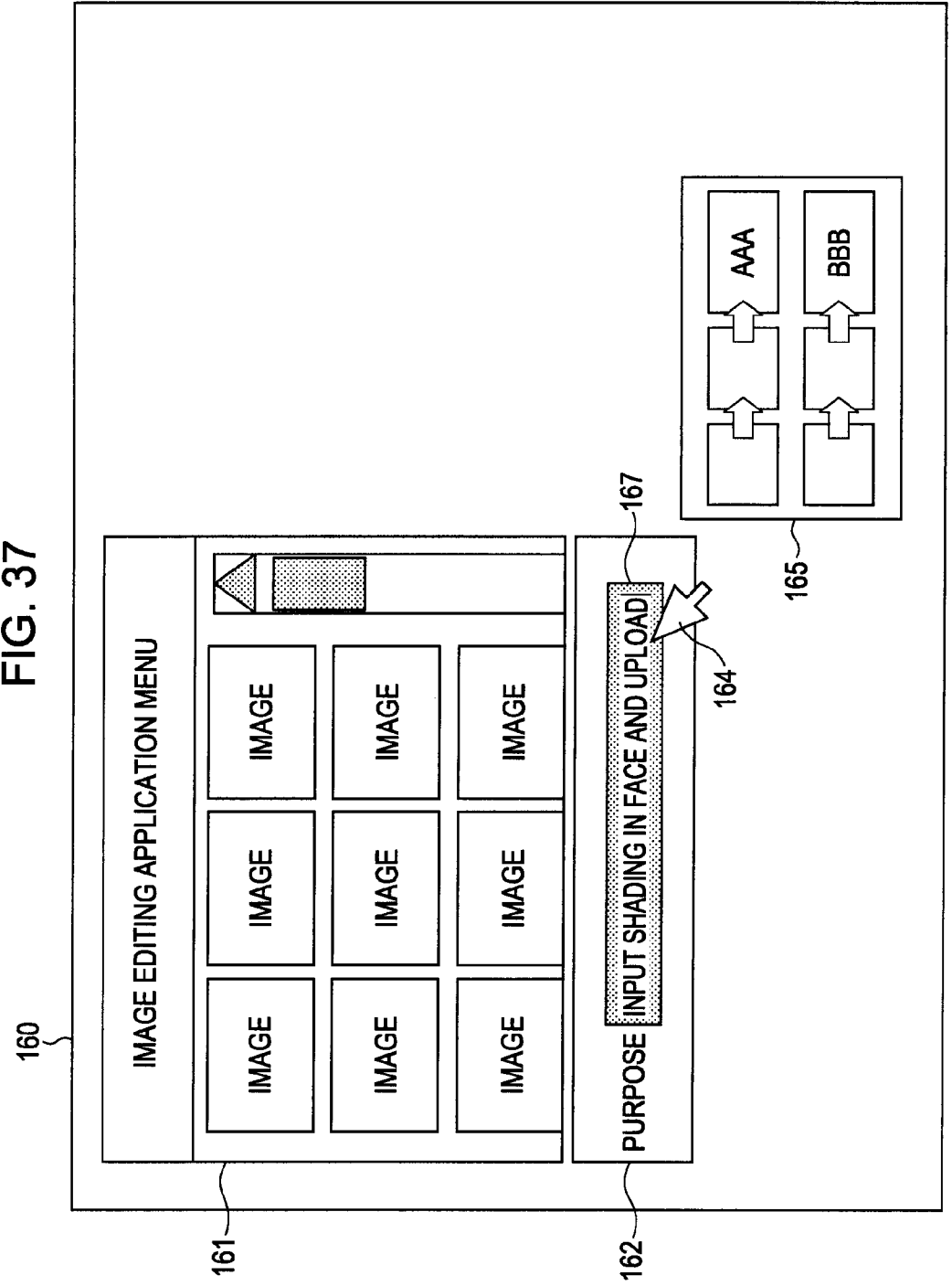
FIG. 37 is an explanatory diagram illustrating another display example when the control application displays the applications and the sample data on the screen.

FIG. 37 is an explanatory diagram illustrating another display example when the control application 162 displays the applications and the sample data on the screen 160. In the example shown in FIG. 37, like the example shown in FIG. 35, the control application 162 displays the text box 167 on the screen 160, and the control application 162 displays the sample display area 165 based on the details input into the text box 167 by the user of the information processing apparatus 100 to display the sample data. In FIG. 37, the control application 162 analyzes a sentence "input shading in a face and upload it" input into the text box 167, extracts a process of inputting shading in the face and a process of uploading the images to a predetermined server, and displays the processes as the sample data in the sample display area 165. By analyzing the received syntax associated with the sentence input into the text box 167 and extracting the applications and the sample data matched with the details input into the text box 167 by the user of the information processing apparatus 100 by the control application 162, the process which the user of the information processing apparatus 100 desires can be introduced to the user.

Figure 38:
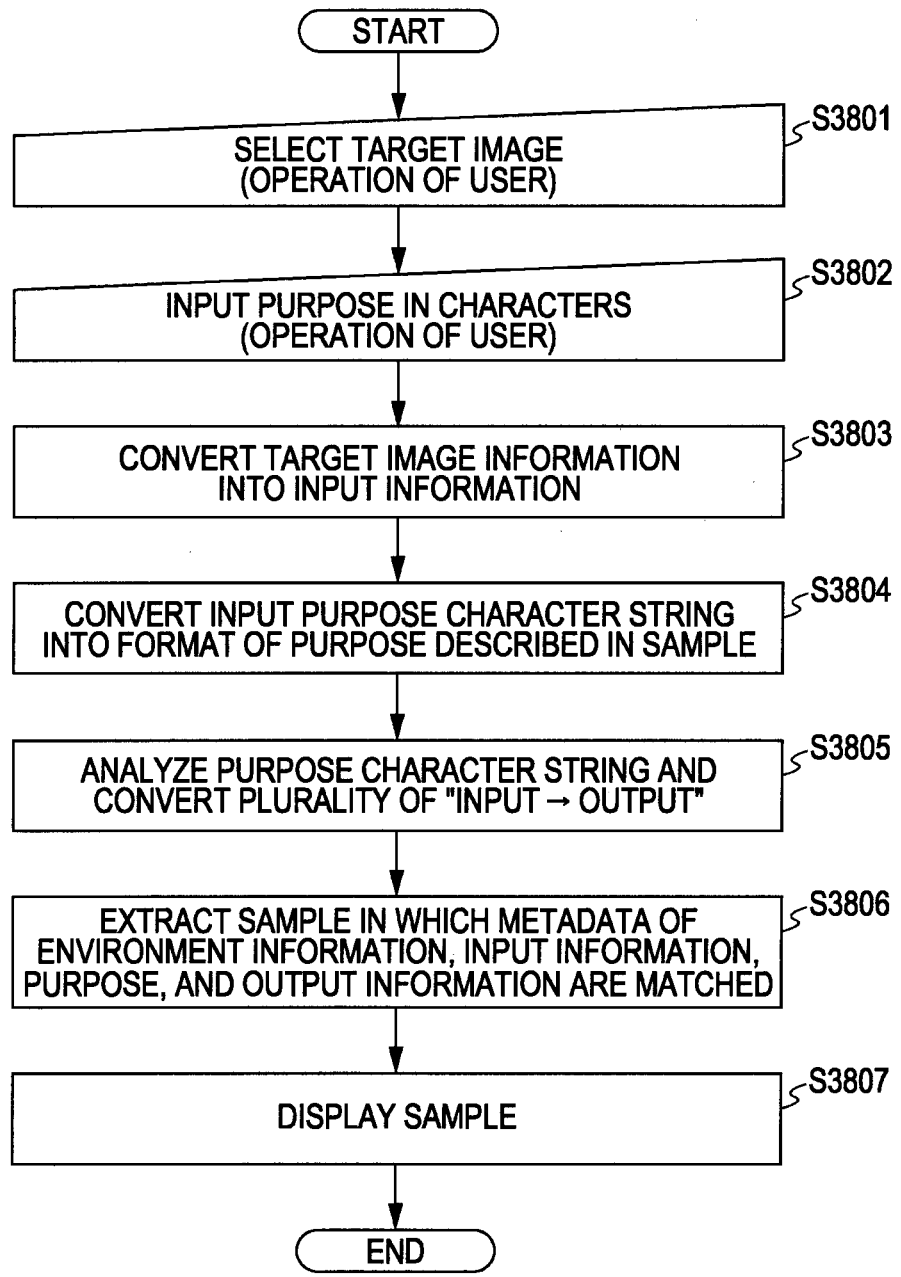
FIG. 38 is a flowchart illustrating an exemplary process of extracting the sample data from the details input into the text box by the user of the information processing apparatus by the control application.

FIG. 38 is a flowchart illustrating an exemplary process of extracting the sample data from the details input into the text box 167 by the user of the information processing apparatus 100 by the control application 162. Hereinafter, the exemplary process of extracting the sample data from the details input into the text box 167 by the user of the information processing apparatus 100 by the control application 162 will be described with reference to FIG. 38.

First, the user of the information processing apparatus 100 activates the image editing application 161 in the information processing apparatus 100, and selects an image to be processed from among the images displayed in the image editing application 161 (step S3801). When the user of the information processing apparatus 100 selects the image to be processed, the control application 162 displays the text box 167 on the screen 160. When the user of the information processing apparatus 100 inputs a processing purpose in characters into the text box 167 (step S3802), the control application 162 converts information of the image selected in step S3801 by the user of the information processing apparatus 100 into input information (step S3803), and then converts a purpose character line input into the text box 167 in step S3802 by the user of the information processing apparatus 100 into a format of the purpose written in the sample (step S3804).

Then, the control application 162 analyzes the received syntax associated with the character line input into the text box 167 by the user of the information processing apparatus 100 and converts the syntax into a plurality of input and output (step S3805). The conversion into the plurality of input and output in step S3805 may be performed with reference to the dictionary, for example, which is prepared, recording the received syntax associated with the sentence by the control application 162.

The control application 162 determines 5W1H (Who, What, When, Where, Why, and How) by analyzing the syntax. However, when there is lack information, an interface for asking the user of the information processing apparatus 100 about the lack of information may be prepared. For example, when information regarding Where among 5W1H is lack as the analysis result of the syntax, the control application 162 may display a message "Where uploaded?" on the screen 160 and then may display a new text box. For example, when information regarding Where among 5W1H is missing in the analysis result of the syntax, the control application 162 may display a message "upload to ox?" on the screen 160. When the control application 162 displays the text box or the message and receives the input from the user of the information processing apparatus 100 in this way, the control application 162 can display an interactive application.

When the conversion from the purpose character line to the plurality of input and output in step S3805 is completed, the control application 162 extracts the suitable sample based on the environment information of the information processing apparatus 100, the input information, or the output information and the purpose information (step S3806). When the extraction of the suitable sample is completed, the control application 162 displays the sample display area 165 on the screen 160 to display the extracted samples (step S3807).

The exemplary process of extracting the sample data from the details input into the text box 167 by the user of the information processing apparatus 100 by the control application 162 has hitherto been described with reference to FIG. 38.

In the examples shown in FIGS. 35 to 38, the control application 162 displays the text box 167 on the screen 160 and receives the purpose process from the user of the information processing apparatus 100, but the invention is not limited to this examples. For example, when the sample introducing process described hitherto is performed by a device, such as a portable phone, by performing a voice input rather than simply the input of character, the voice of the user is converted into a sentence in a portable phone 400, the sentence is analyzed, and then the suitable sample may be extracted, as shown in FIG. 39. In FIG. 39, the above-described sample displaying process is performed using the portable phone 400.

2. Overview

According to the above-described embodiment of the invention, the samples are introduced together to readily understand the states before and after the execution of the application, when the application executed in cooperation with the application being executed on the information processing apparatus 100 is recommended on the screen. Since the samples indicating the states before and after the execution of the application are introduced on the screen, it is possible to obtain the advantage of readily understanding the reason for recommending the application to the user of the information processing apparatus 100 and the work which can be done when the application is executed.

The invention is not necessarily limited to the application installed on the information processing apparatus 100. The sample data obtained by an application which is not installed may be introduced on the screen. Since sample data obtained by an application which is not installed are introduced, it is possible to obtain the advantage that the user of the information processing apparatus 100 can grasp executable processes to be executed before the user buys and installs the application.

The present application contains subject matter related to that disclosed in Japanese Priority Patent Application JP 2009-270587 filed in the Japan Patent Office on Nov. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
 a processor configured to execute one or more instructions that, when executed by the processor, define:
 an output unit configured to output one or more execution sample images each of which includes a sample image of image content and processed image content,
 wherein the processed image content is related to the image content stored in a storage unit, the storage unit configured to store application IDs uniquely specifying applications, the image content, and the processed image content,
 wherein the processed image content is obtained by applying an execution result to the sample image of the image content using one of the applications; and
 a selection unit configured to select the execution sample image output unit and to select an application ID of the application used to obtain the processed image content based on the selected execution sample image.

2. The information processing apparatus according to claim 1, further comprising:
 an application recommendation unit configured to recommend a plurality of recommended applications based on the image content selected by the selection unit,
 wherein the output unit is configured to output information indicating at least one of the recommended plurality of applications.

3. The information processing apparatus according to claim 2,
 wherein the output unit is configured to display the plurality of applications by category, and
 wherein when the selection unit selects the category, the output unit is configured to output content before and after processing.

4. The information processing apparatus according to claim 2, wherein the selection unit is configured to confirm whether the application corresponding to the selected application ID is executable in the information processing apparatus, and request download from another information processing apparatus when the application is not executable.

5. The information processing apparatus according to claim 1, further comprising:
 a content processing unit configured to generate content before and after processing based on the image content selected by the selection unit.

6. The information processing apparatus according to claim 5, wherein the image content selected by the selection unit for the content processing unit to process the content is a reduced image with a reduced size of an original image.

7. The information processing apparatus according to claim 5, wherein the output unit is configured to output the image content and the processed image content related to the image content based on environment information regarding an environment under which the content is generated.

8. The information processing apparatus according to claim 1, wherein the output unit is configured to output at least one of the image content regarding a process performed before execution of the application and the processed image content related to the image content.

9. The information processing apparatus according to claim 1, wherein the output unit is configured to output at least one of the image content and the processed image content suitable for designated input and output by linking a plurality of image content and the processed image content.

10. The information processing apparatus according to claim 9, wherein when there is neither image content nor processed image content suitable for the designated input and output, the output unit searches the image content and the processed image content suitable for the designated input and output by linking the plurality of image content and the processed image content.

11. The information processing apparatus according to claim 9, wherein the output unit is configured to output all of the processed image content.

12. An information processing method comprising the steps of:
 outputting one or more execution sample images each of which includes a sample image of image content and processed image content,
 wherein the processed image content is related to the image content in a storage unit that stores application IDs uniquely specifying applications, the image content, and the processed image content,
 wherein the processed image content is obtained by applying an execution result to the sample image of the image content using one of the applications; and
 selecting the execution sample image output by the outputting step and selecting an application ID of the application used to obtain the processed image content based on the selected execution sample image.

13. A non-transitory computer readable medium having stored thereon instructions that, when executed on a computer, cause the computer to execute the steps of:
 outputting one or more execution sample images each of which includes a sample image of image content and processed image content,
 wherein the processed image content is related to the image content in a storage unit that stores application IDs uniquely specifying applications, the image content, and the processed image content,
 wherein the processed image content is obtained by applying an execution result to the sample image of the image content using one of the applications; and
 selecting the execution sample image output by the outputting step and selecting an application ID of the application used to obtain the processed image content based on the selected execution sample image.

14. An information processing server comprising:
a storage unit configured to store application IDs uniquely specifying applications, image content, and processed image content,
wherein the processed image content is obtained by applying an execution result to a sample image of the image content with a processor using one of the applications;
the processor configured to execute one or more instructions that, when executed by the processor, define:
an output unit configured to output, to another apparatus, one or more execution sample images each of which includes a sample image of the image content and the processed image content; and
a selection unit configured to select an application ID of the application used to obtain the processed image content from the sample image, in an event the execution sample image is selected by the other apparatus from the one or more execution sample images output by the output unit.

15. The information processing server according to claim 14, wherein the output unit is configured to output the processed image content related to the image content based on environment information regarding environment under which content is generated.

* * * * *